United States Patent [19]
Komiya et al.

[11] Patent Number: 5,717,605
[45] Date of Patent: Feb. 10, 1998

[54] COLOR CLASSIFICATION APPARATUS

[75] Inventors: Yasuhiro Komiya, Hachioji; Yasushi Hibi, Kokubunji; Tohru Wada, Niza; Kensuke Ishii, Tokyo; Susumu Kikuchi, Hachioji, all of Japan

[73] Assignee: Olympus Optical Co., Ltd., Tokyo, Japan

[21] Appl. No.: 321,667

[22] Filed: Oct. 12, 1994

[30] Foreign Application Priority Data

| Oct. 14, 1993 | [JP] | Japan | 5-257001 |
| Oct. 22, 1993 | [JP] | Japan | 5-264781 |
| Oct. 5, 1994 | [JP] | Japan | 6-241614 |

[51] Int. Cl.$^6$ ............................................. G01J 3/51
[52] U.S. Cl. ................. 364/526; 250/578.1; 356/402; 356/406; 356/423
[58] Field of Search ............................ 364/525, 526, 364/497, 498, 550; 250/252.1, 227.11, 227.14, 226, 578.1; 73/53.01, 61.48, 61.49; 356/300, 303, 304, 306, 307, 309, 310, 319, 320, 332, 402, 407, 406, 408, 411, 414, 416, 418, 419, 420, 423, 425

[56] References Cited

U.S. PATENT DOCUMENTS

| 4,884,221 | 11/1989 | Sugiyama et al. | 364/526 |
| 5,115,270 | 5/1992 | Kraft et al. | 355/38 |
| 5,164,795 | 11/1992 | Conway | 356/407 |
| 5,221,959 | 6/1993 | Ohyama et al. | |
| 5,376,962 | 12/1994 | Zortea | 348/222 |

OTHER PUBLICATIONS

Article entitled "*Optical Characteristics of Living Body*", by N. Sato, printed in Medical Electronics and Biotechnology, vol. 24, No. 4., Aug., 1986, pp. 22–27 (In Japanese).

Article entitled "*Spectral Diagnosis by Laser*", by N. Sato et al, printed in Artificial Organ, vol. 16, No. 6, 1987, pp. 1806–1810 (in Japanese).

Article entitled "*Image Classification by the Foley–Sammon Transform*", by Q. Tian et al, printed in Optical Engineering, vol. 25, No. 7, Jul., 1986, pp. 834–840.

Article entitled "PDP Model–Recognition Science and Search for Neural Network", by D.E. Lamelheart, et al, translated by Shunichi Amari, Chapter 8, pp. 324 to 331, Sangyo Tosho Co., Ltd., Japan (1989), Japanese Text.

*Primary Examiner*—James P. Trammell
*Assistant Examiner*—Edward Pipala
*Attorney, Agent, or Firm*—Frishauf, Holtz, Goodman, Langer & Chick

[57] ABSTRACT

The present invention provides a simple, low-cost color classification apparatus having a high resistance to mechanical vibrations and capable of properly performing color classification even if a light source is not specified and its spectrum changes. A color classification apparatus of the present invention is further including an image pickup means for picking up a spectrum of light reflected by a target object, a plurality of bandpass filters having different bands and arranged between the target object and the image pickup means, and a classifying means for calculating a classification spectrum for classification using a statistic technique from a spectrum of light reflected by the target object and picked up by the image pickup means, and classifying the target object using the classification spectrum.

72 Claims, 55 Drawing Sheets

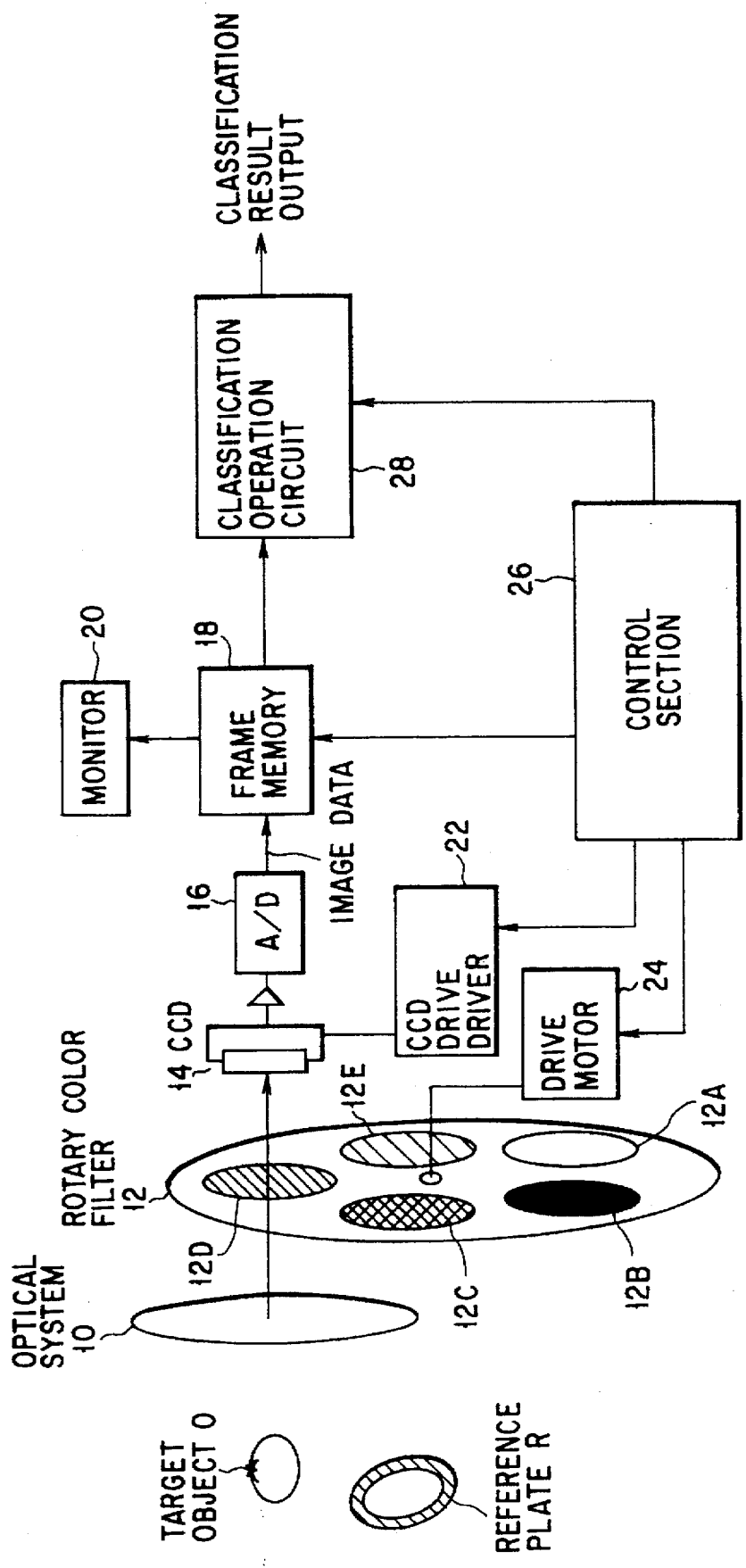
F I G. 14

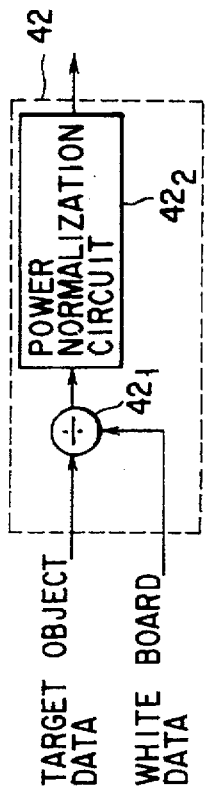
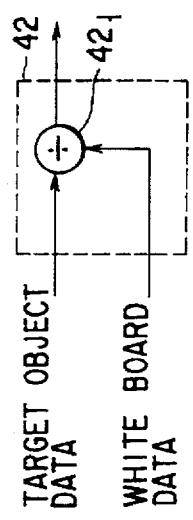
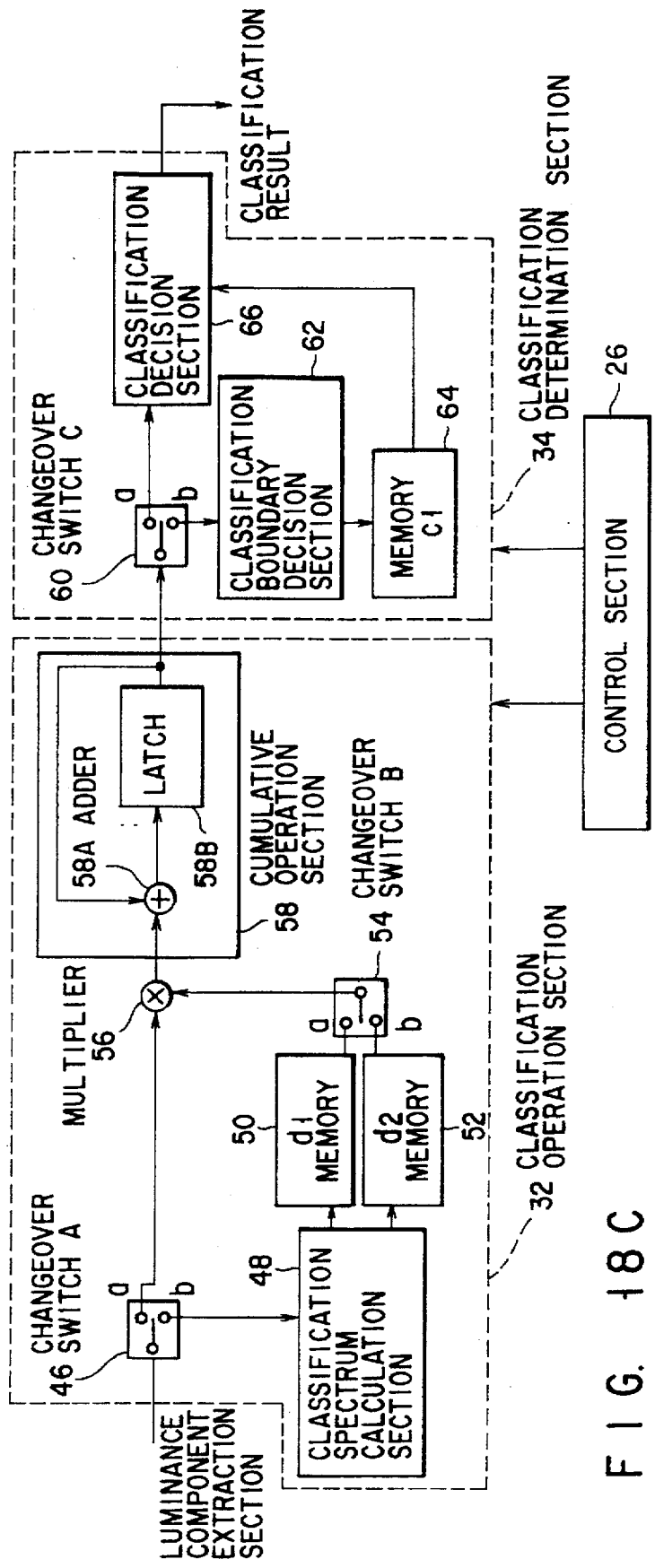
FIG. 18A
FIG. 18B
FIG. 18C

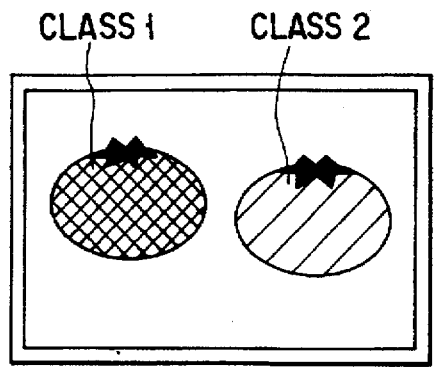
F I G. 19
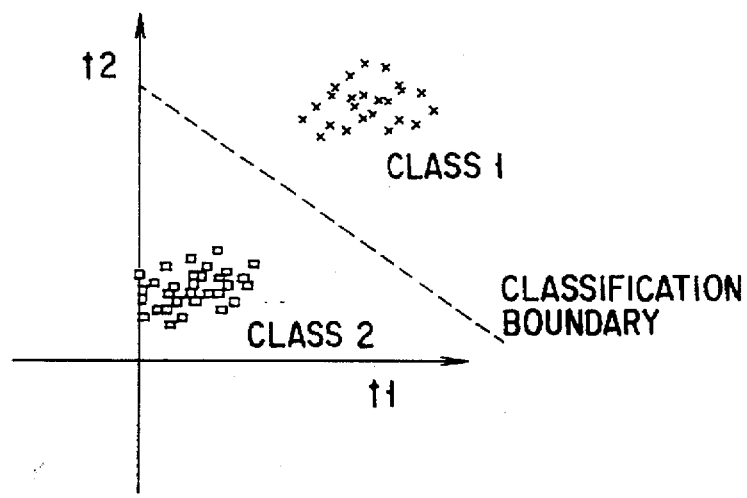
F I G. 20
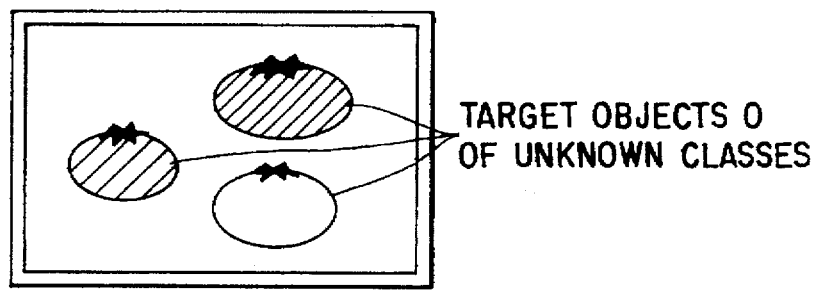
F I G. 21

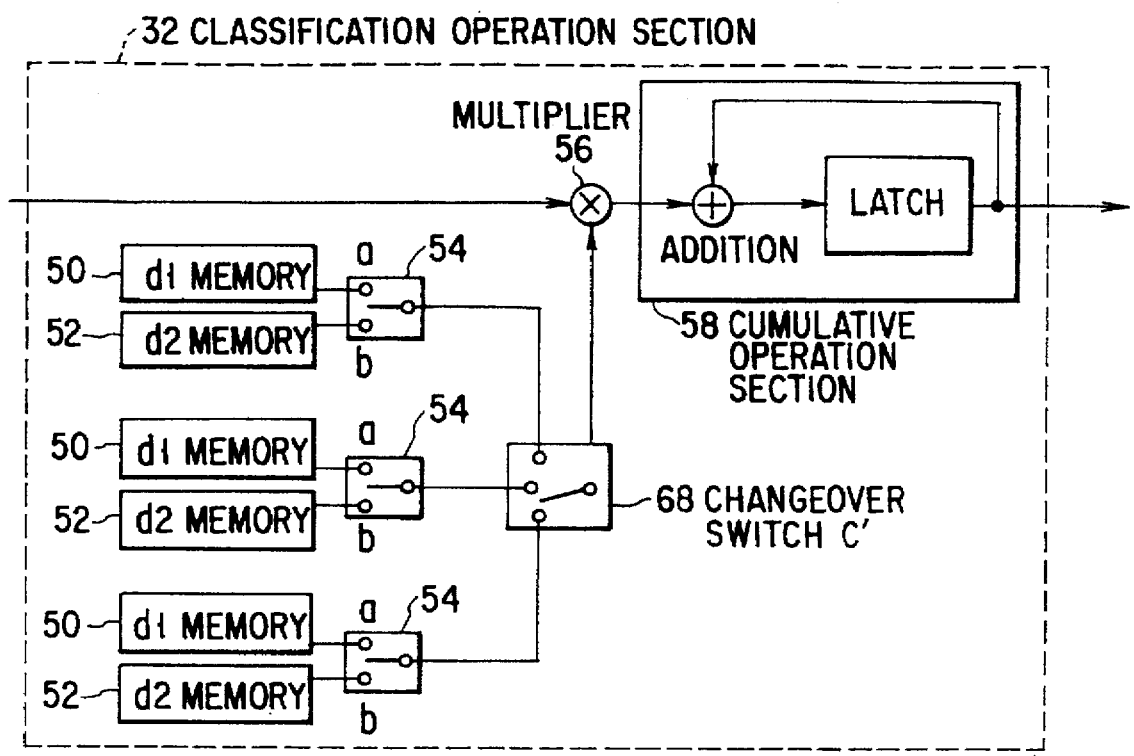
F I G. 22A
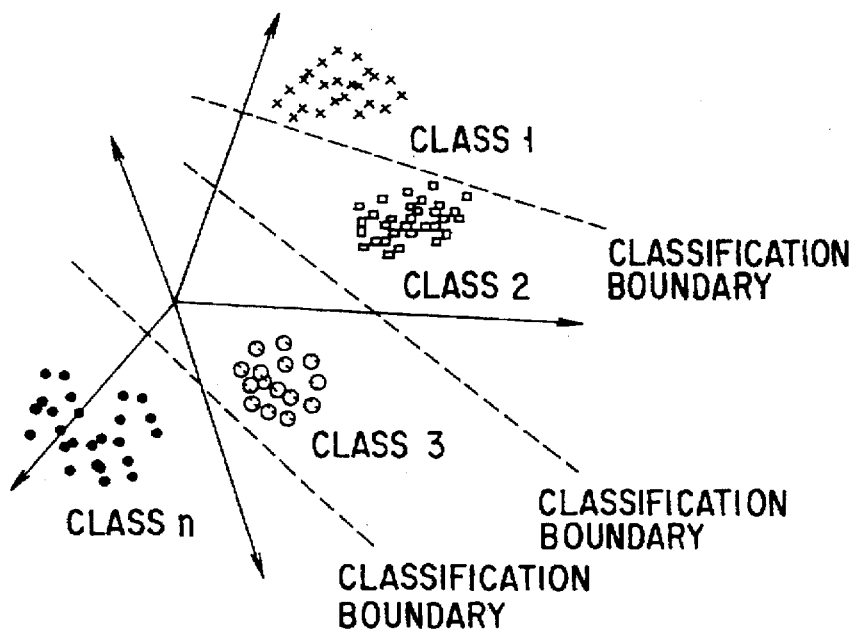
F I G. 22B

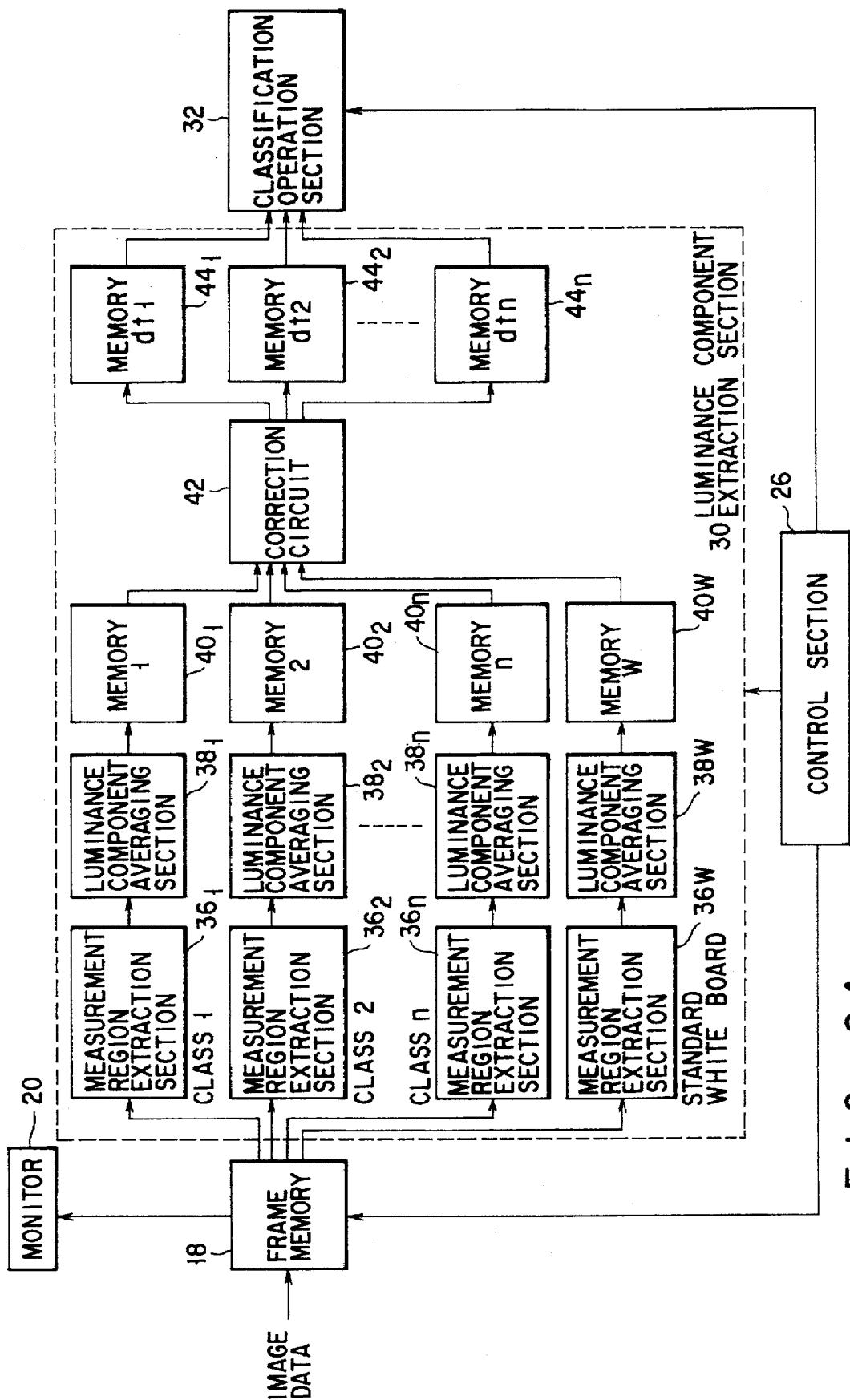
F I G. 24

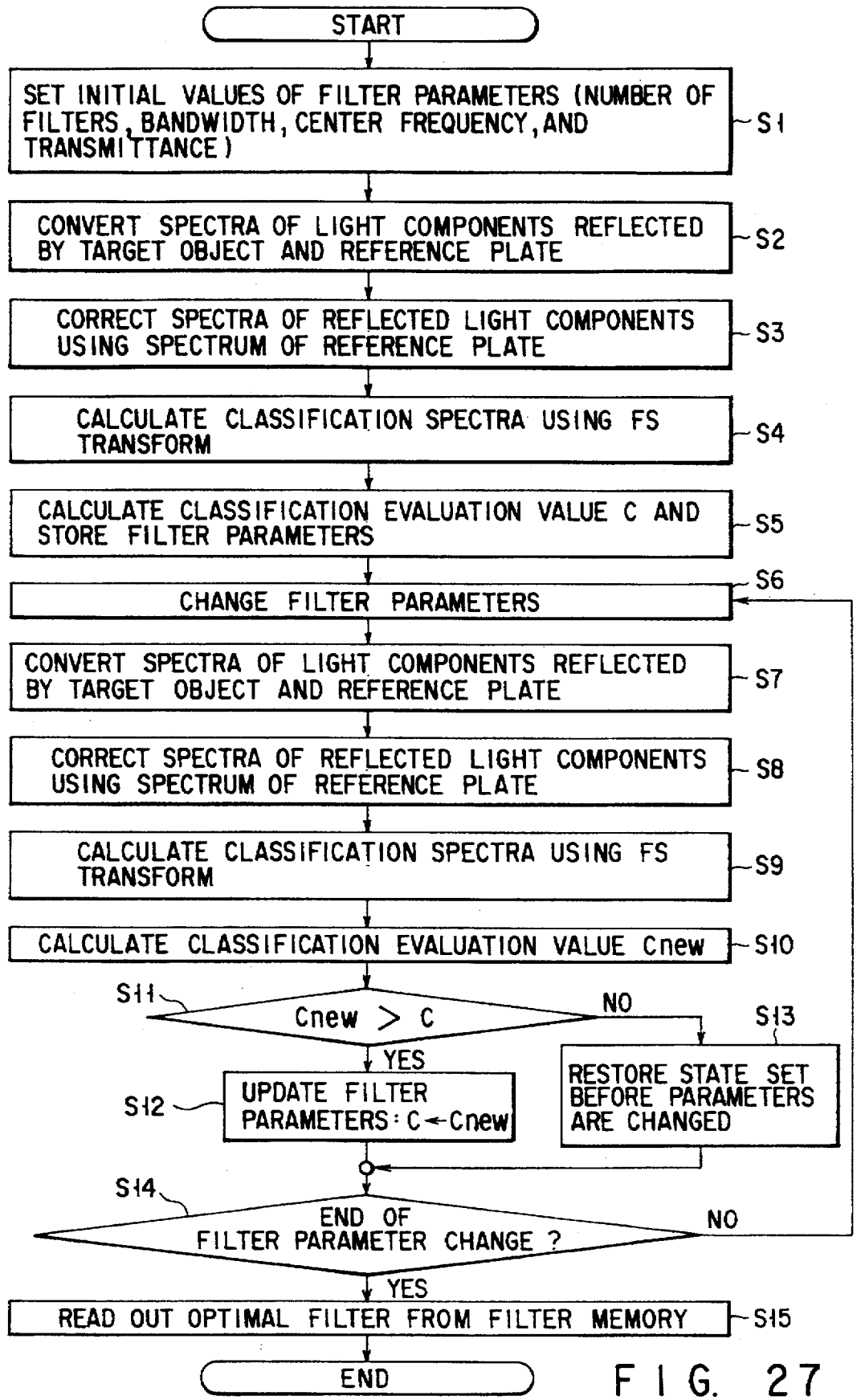
F I G. 27

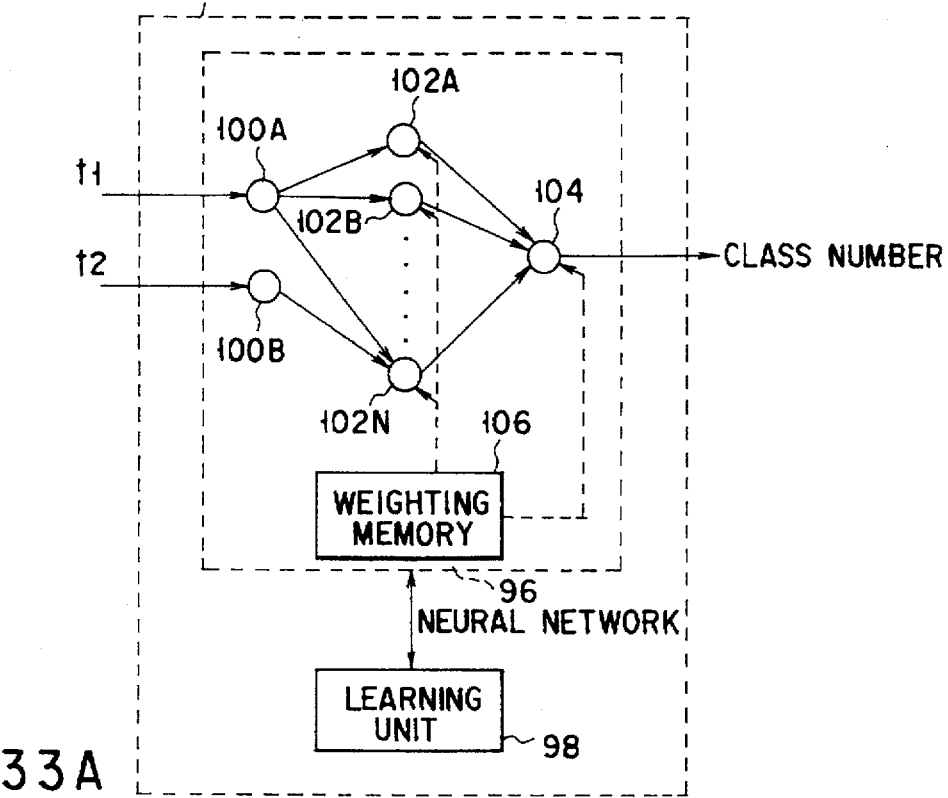
F I G. 33A
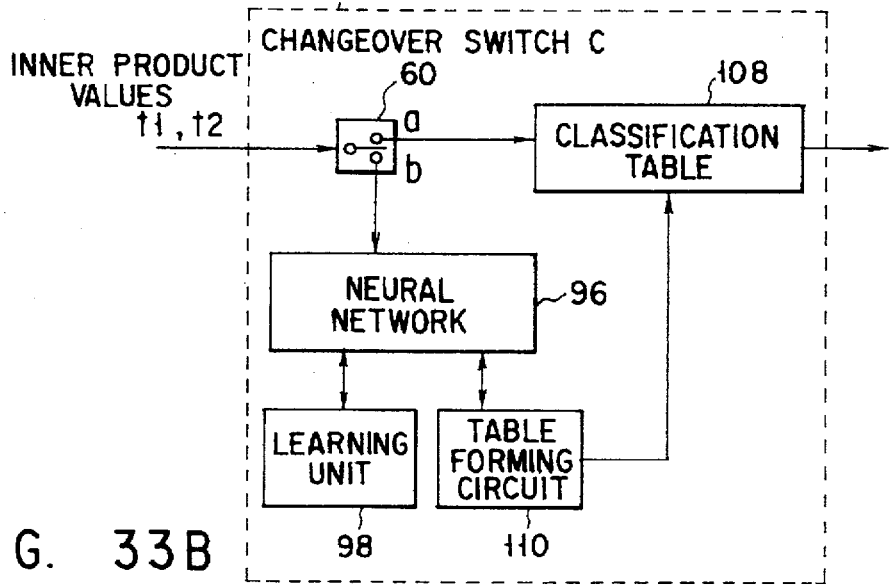
F I G. 33B

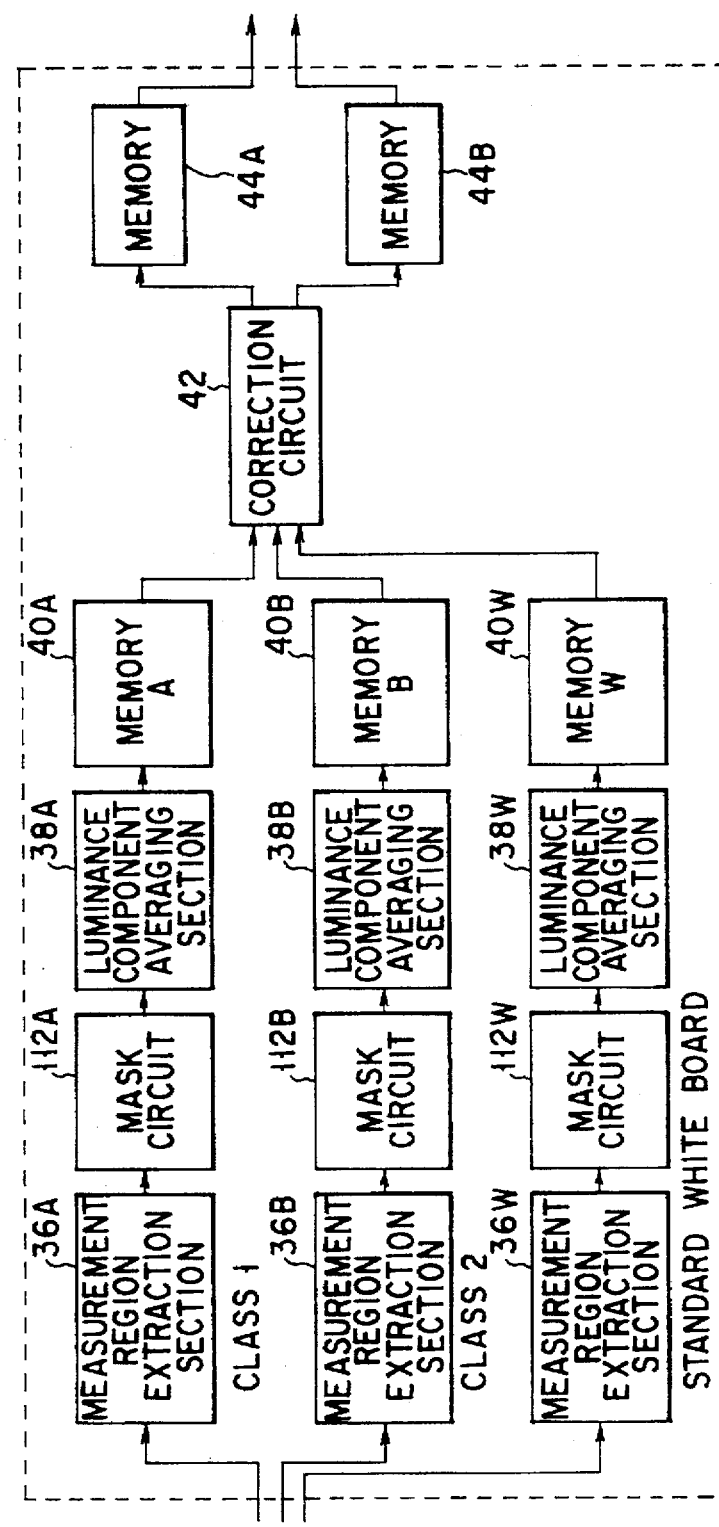
F I G. 34
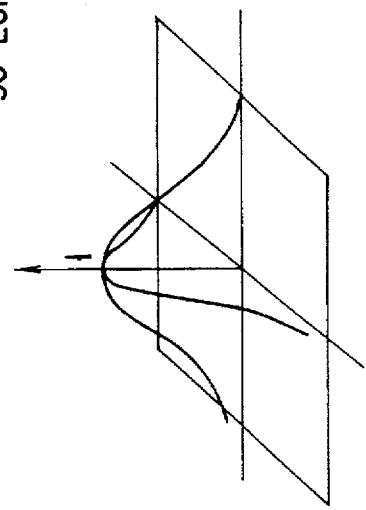
F I G. 35

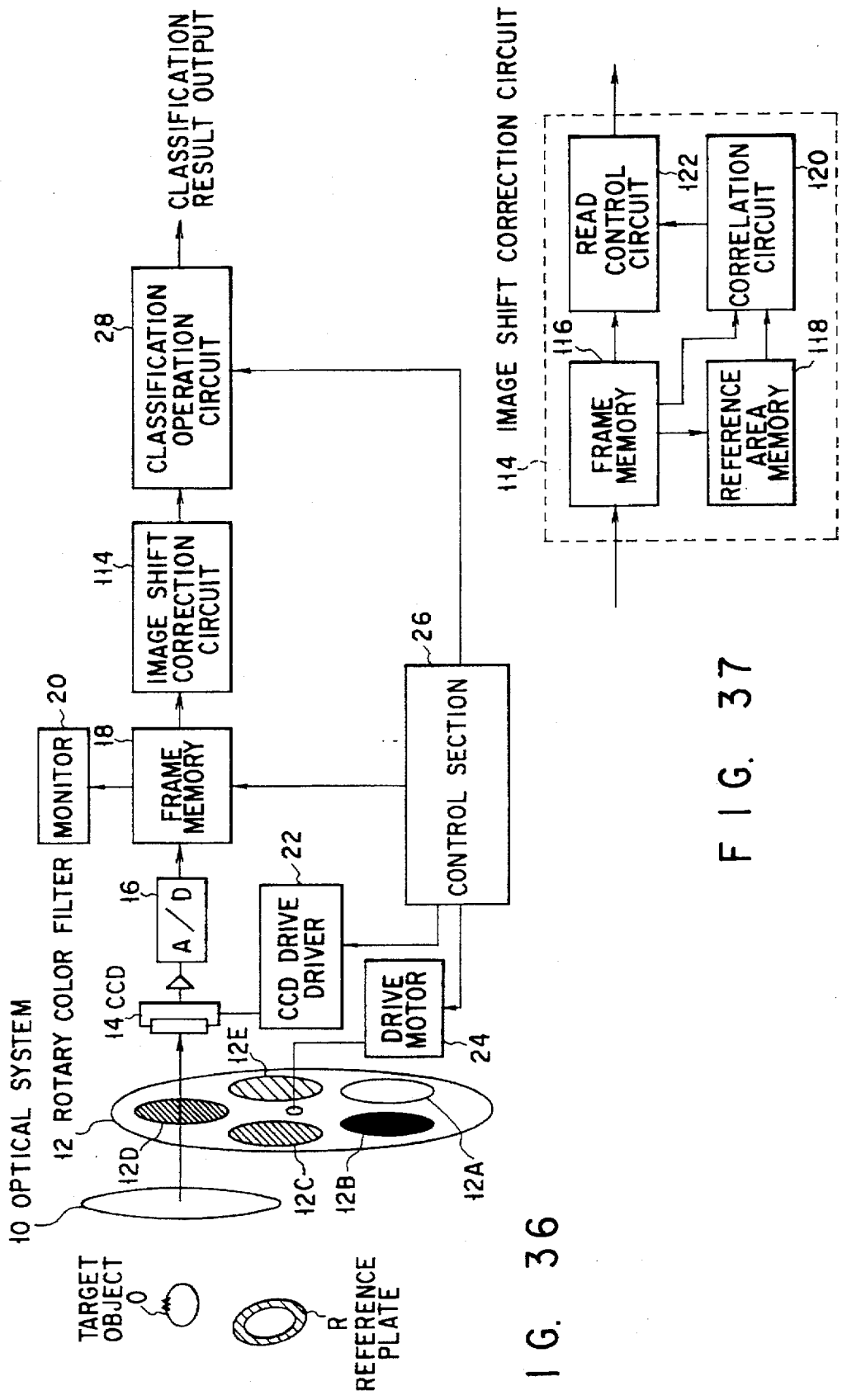
F I G. 36
F I G. 37

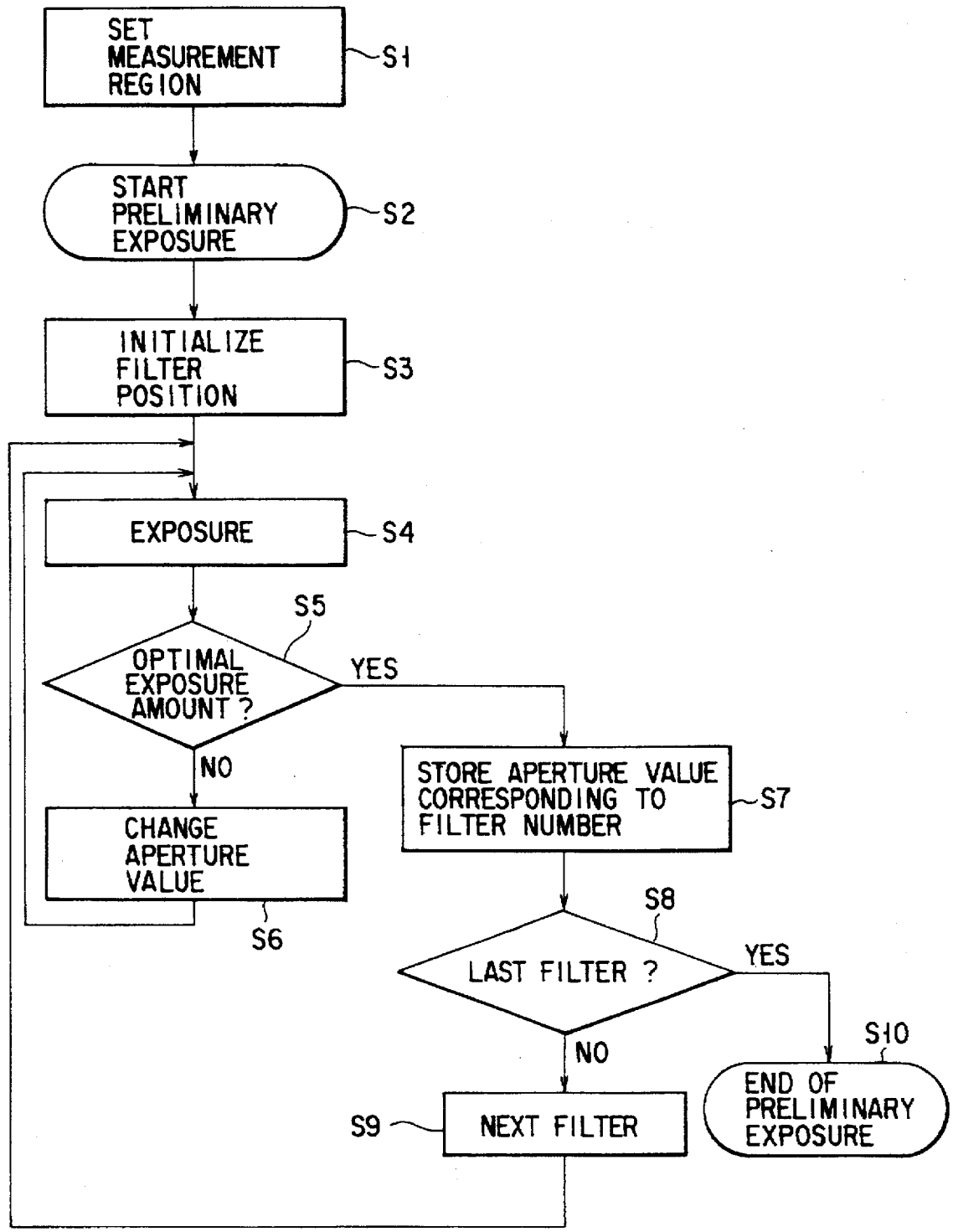
F I G. 40

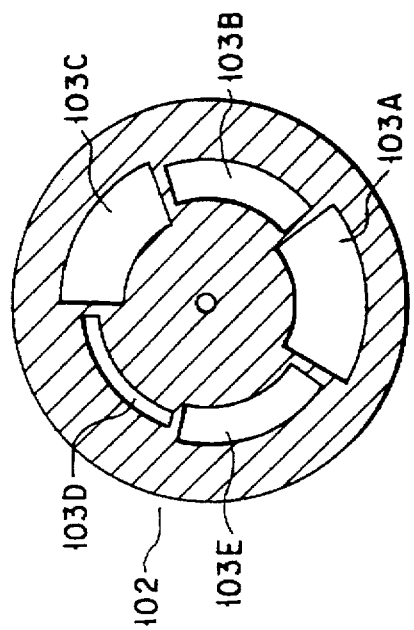
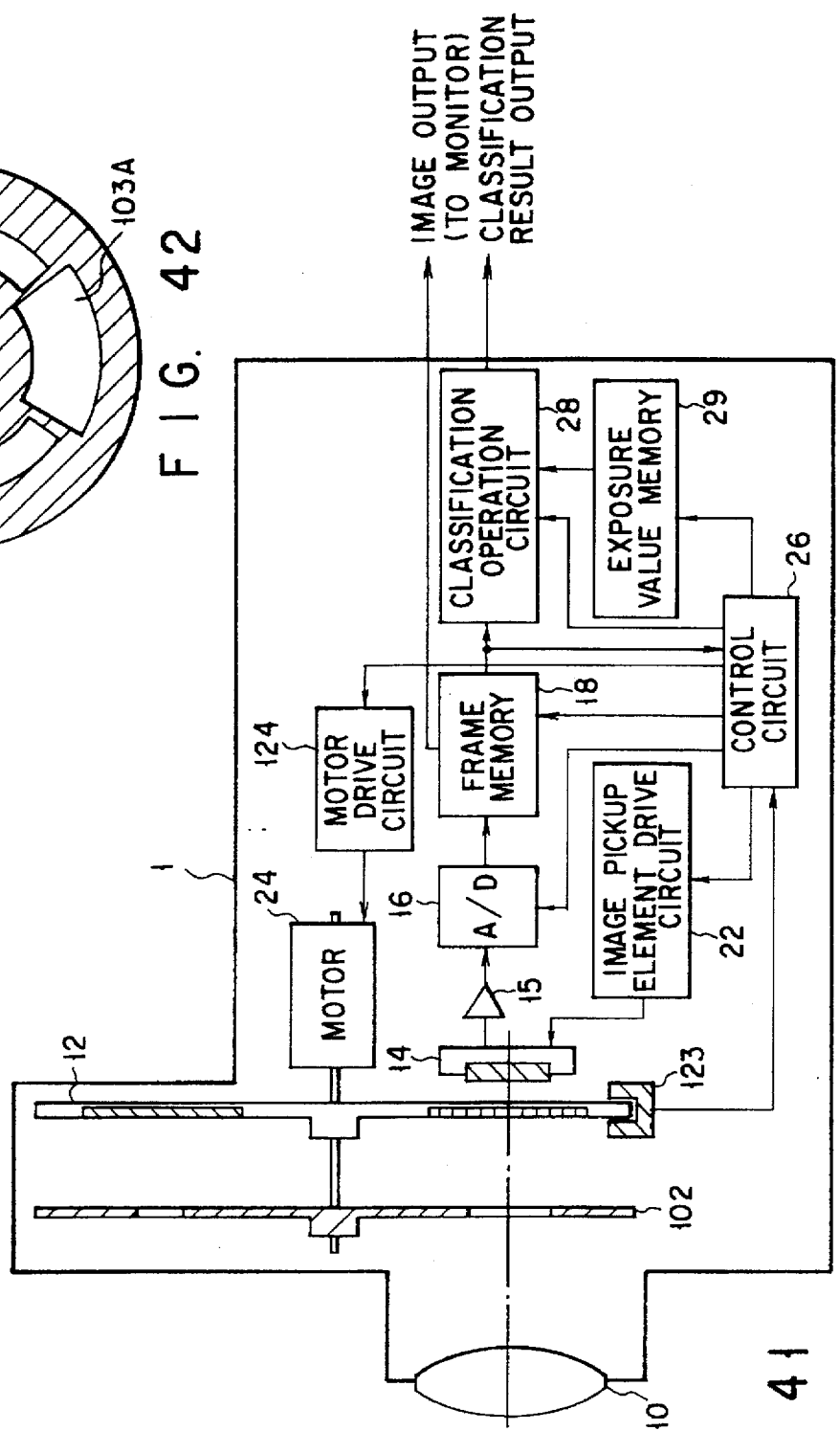

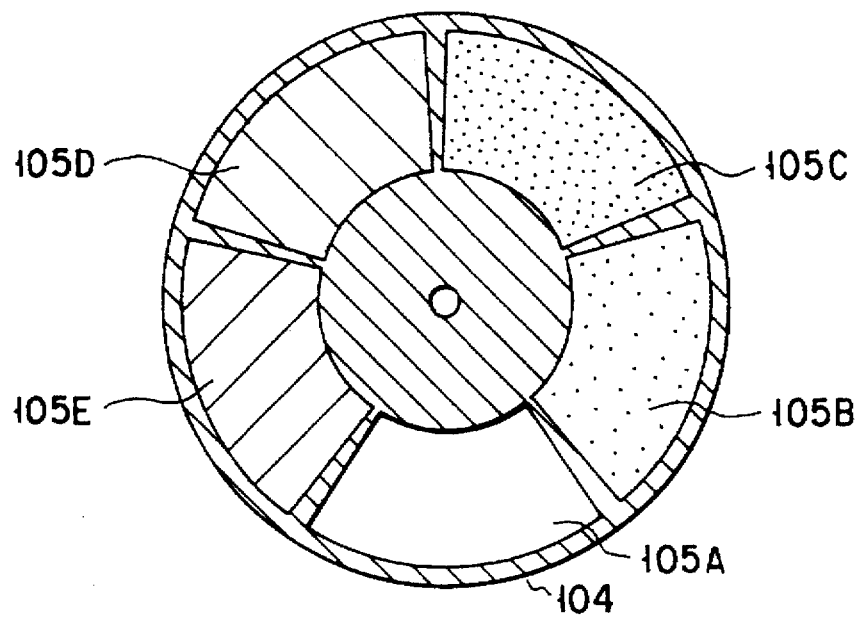
F I G. 44
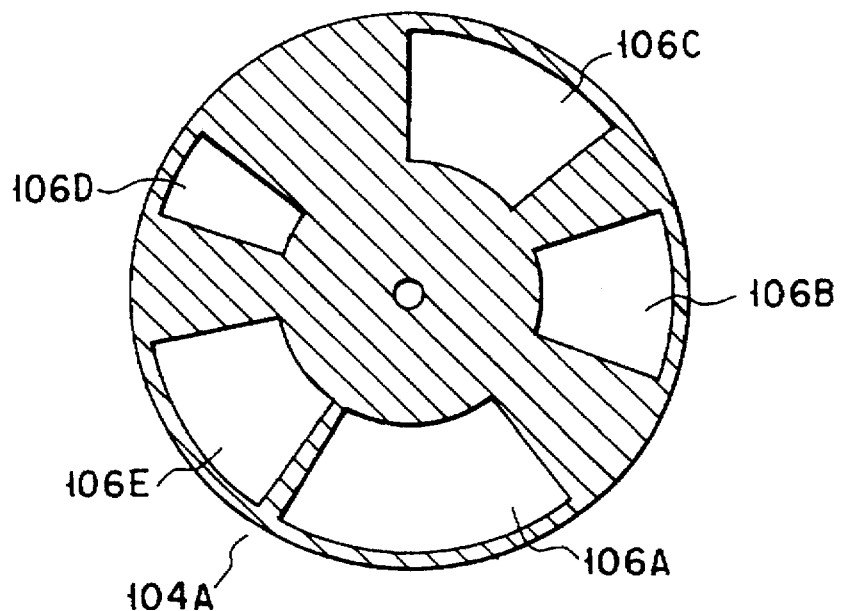
F I G. 45

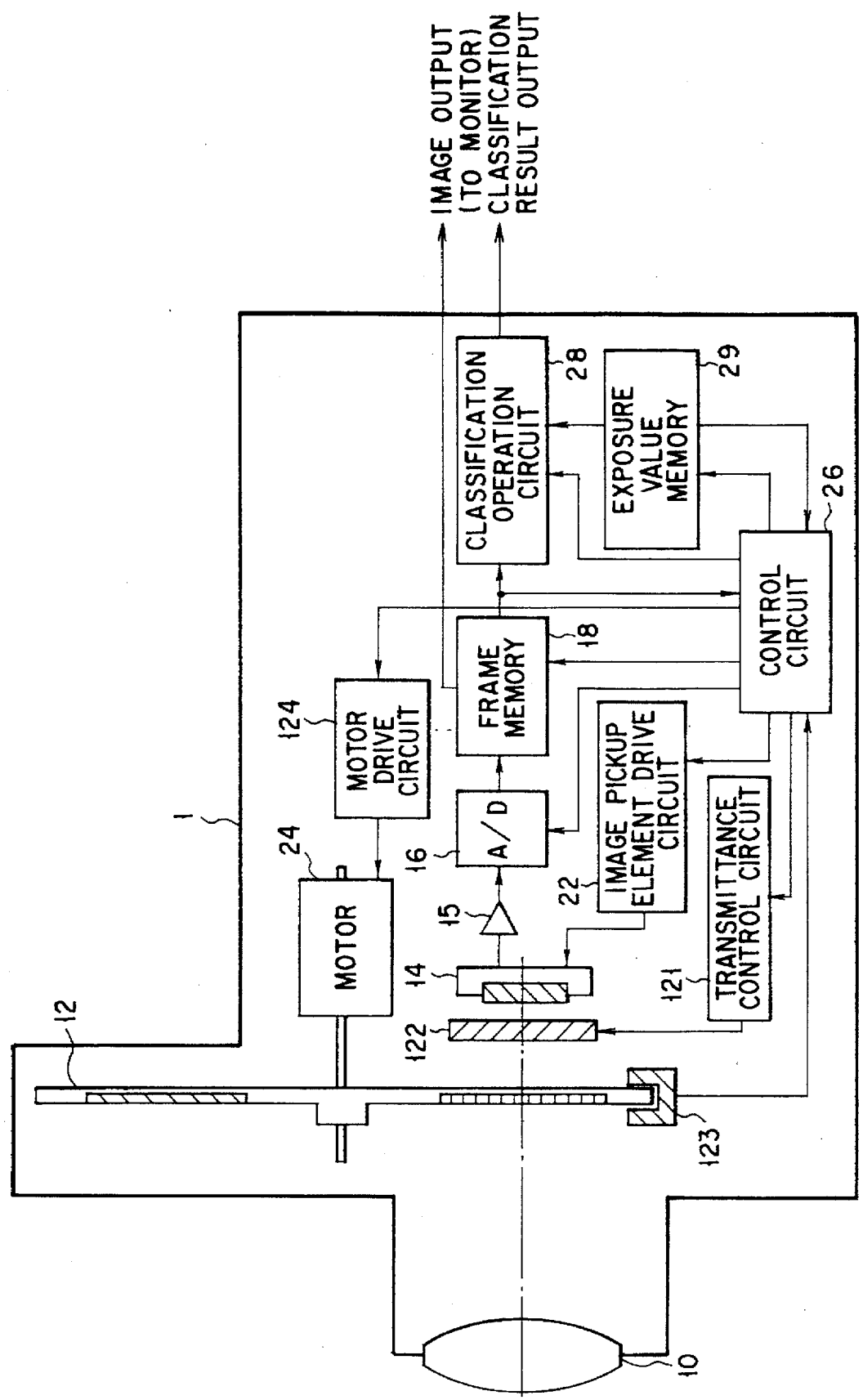
F I G. 46

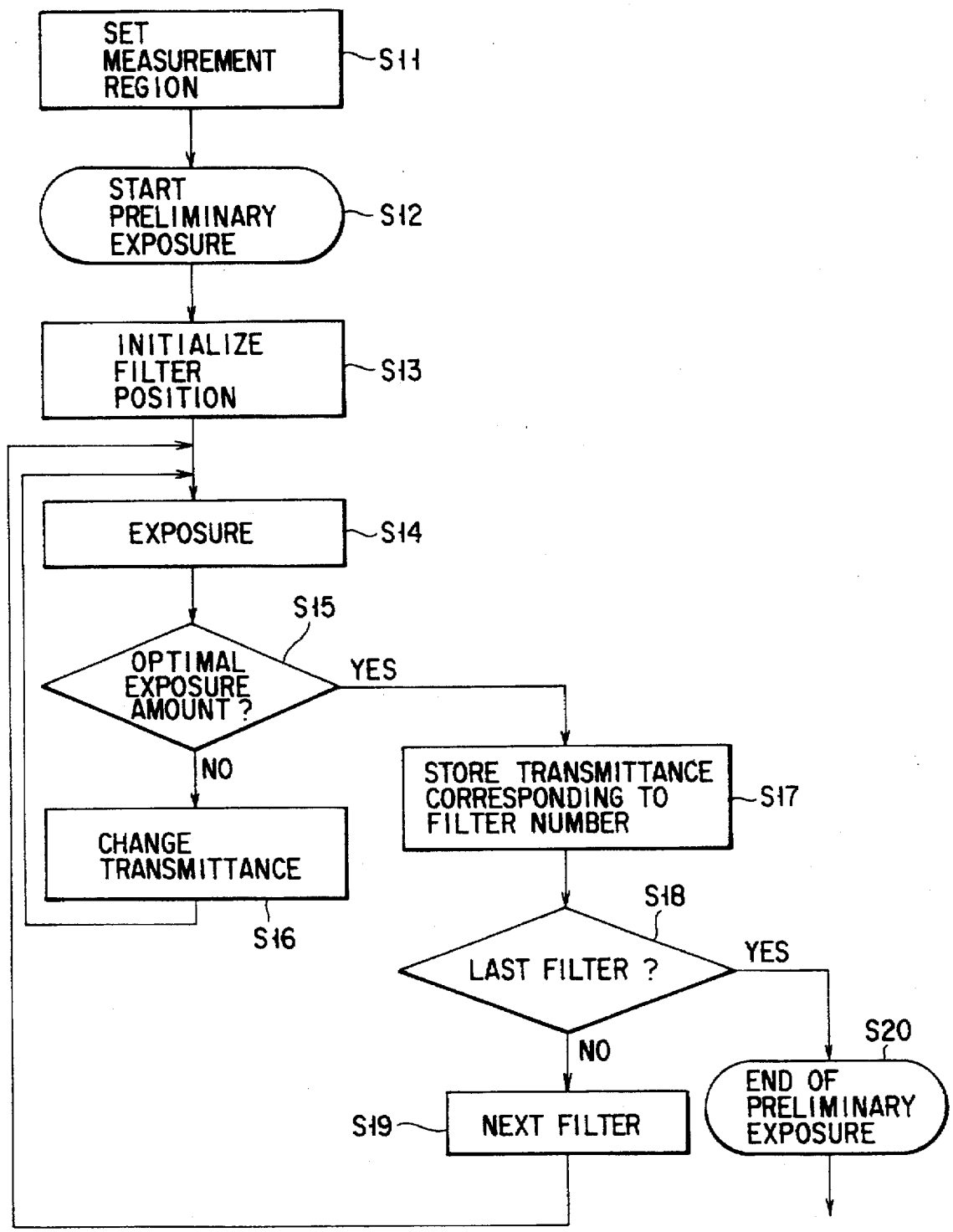
F I G. 47

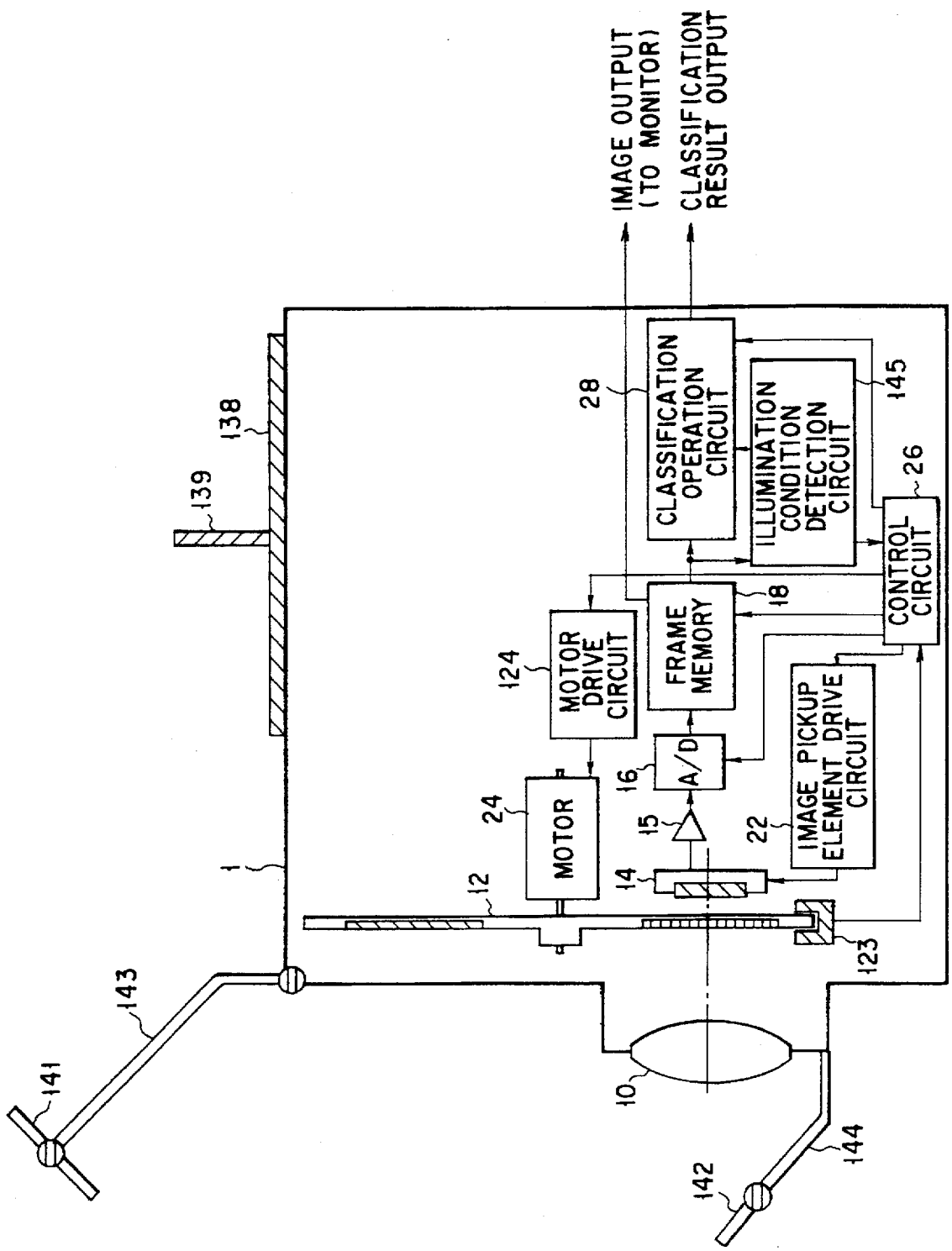
F I G. 51

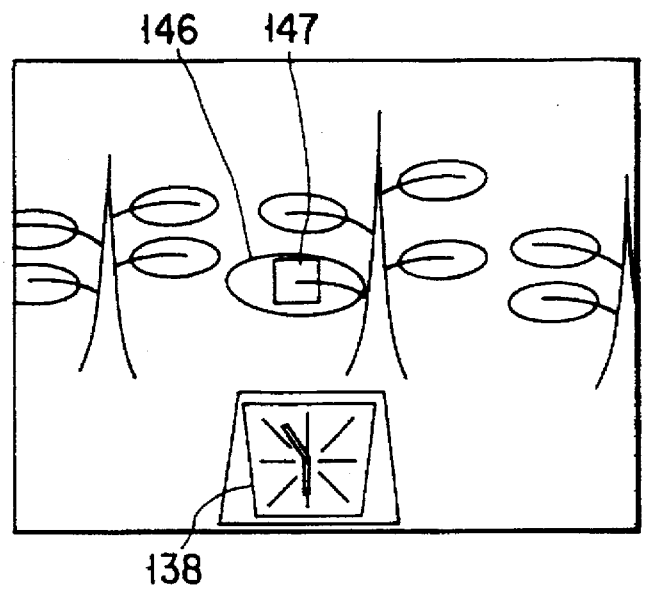
F I G. 52
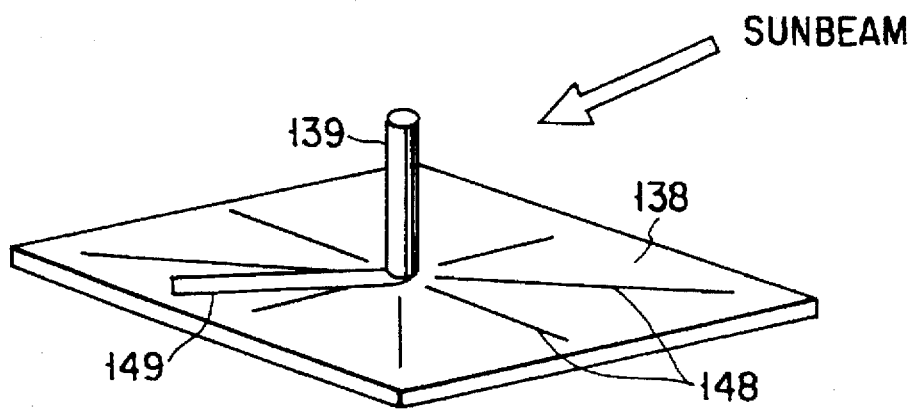
F I G. 53

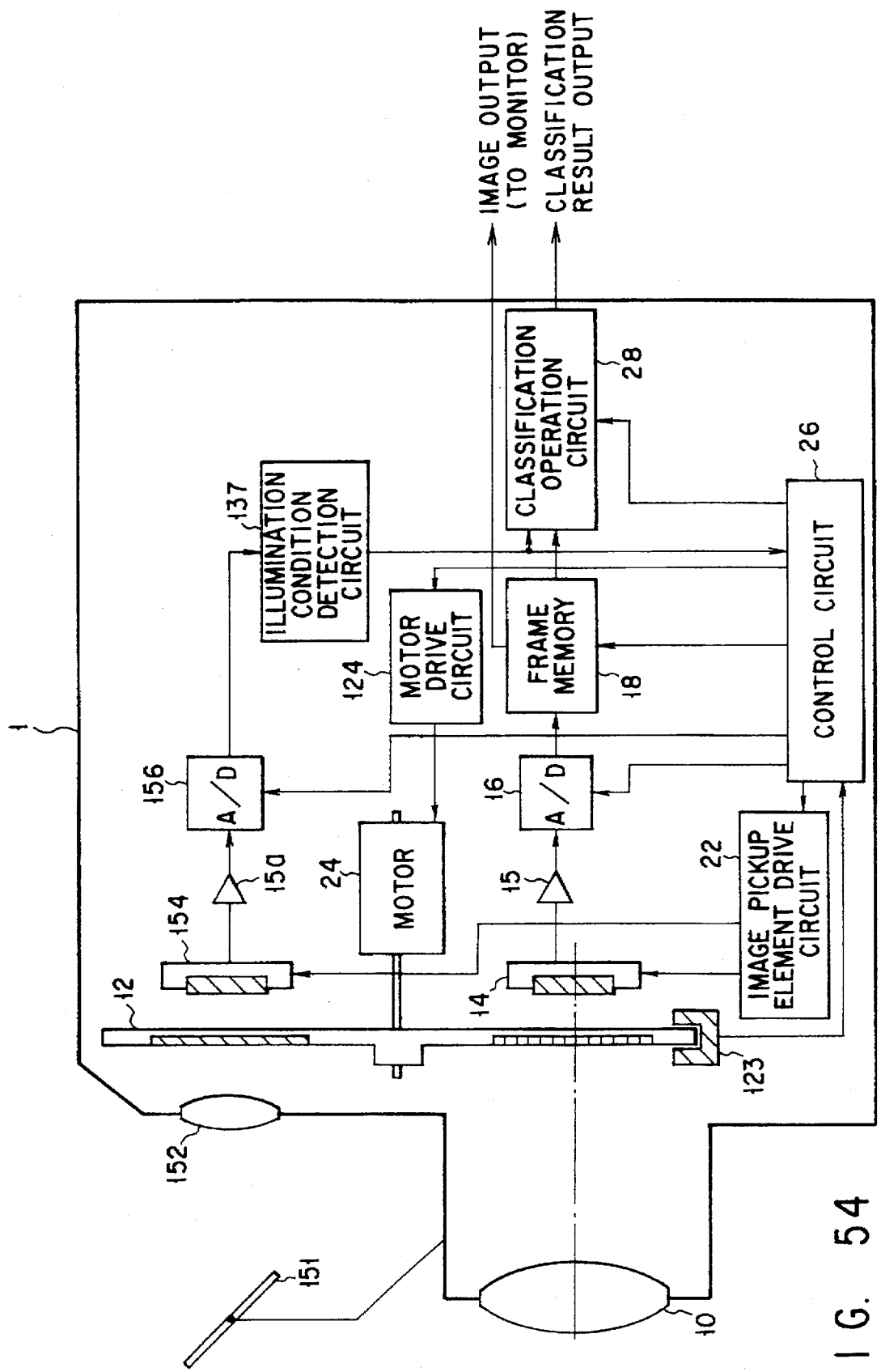
F I G. 54

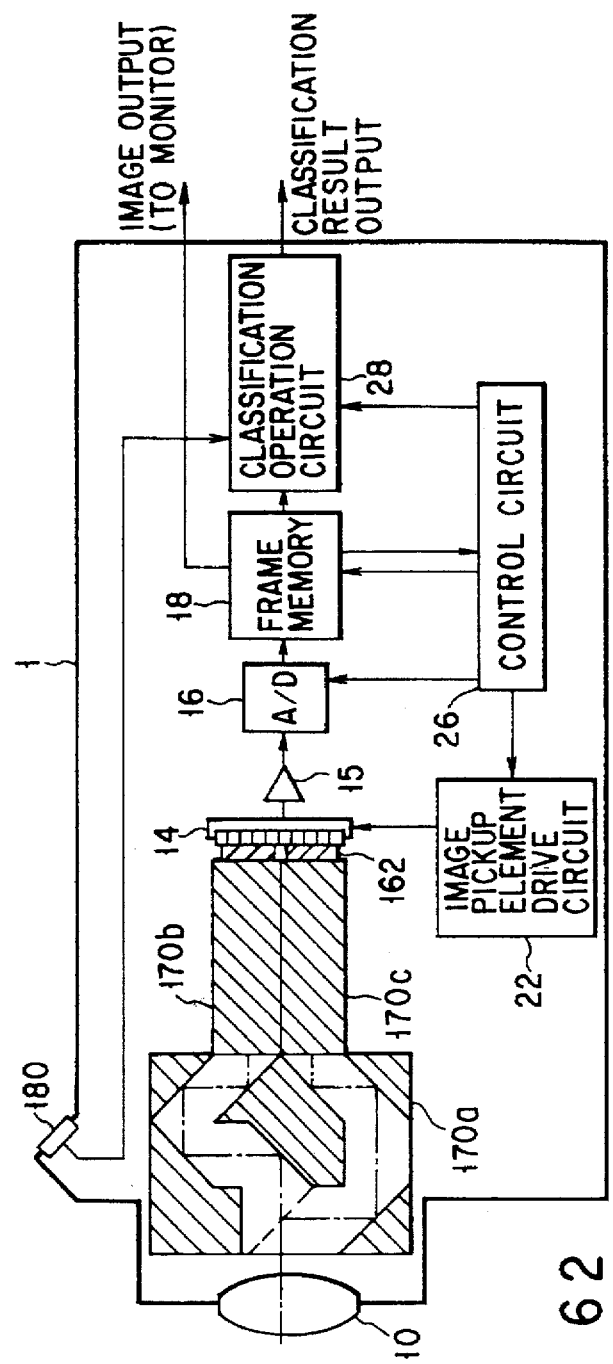
F I G. 62
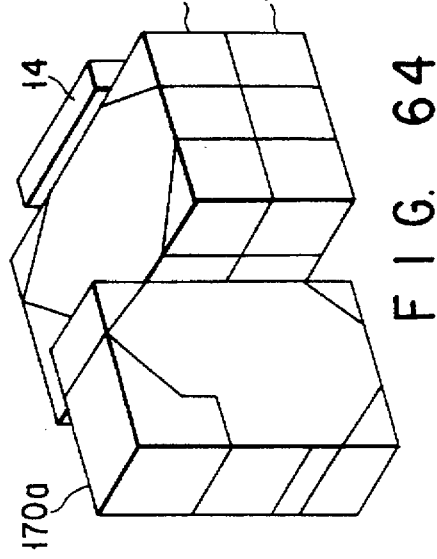
F I G. 64
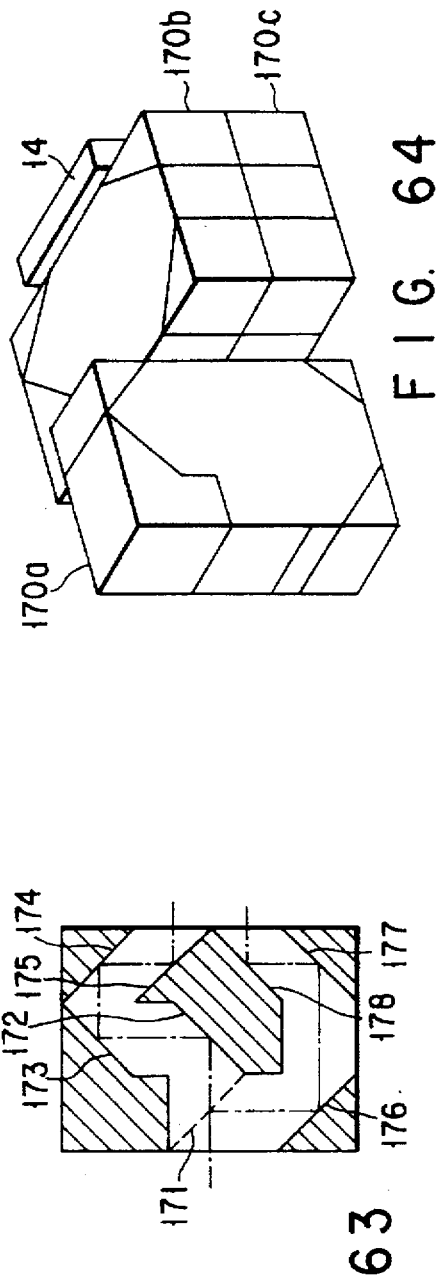
F I G. 63

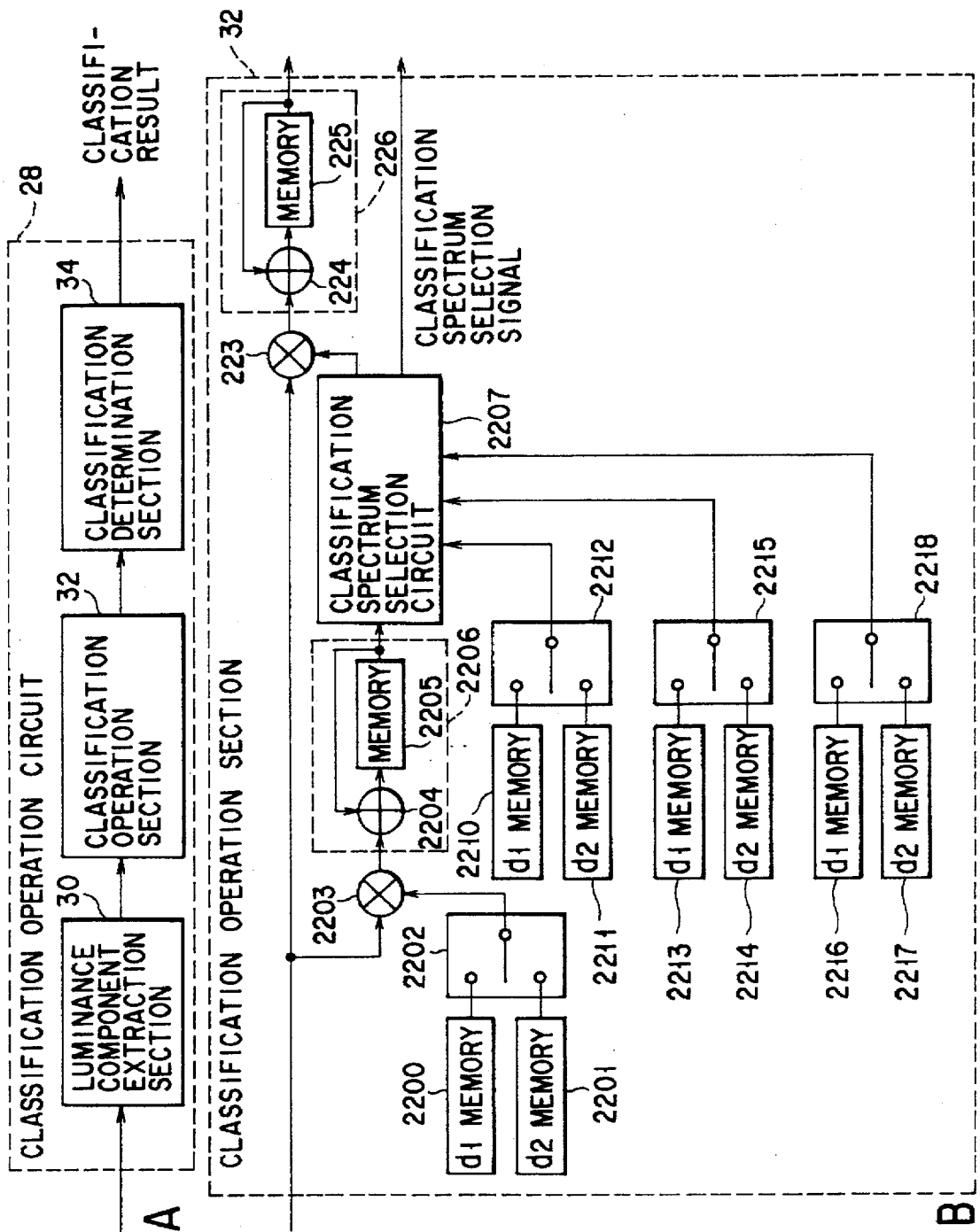

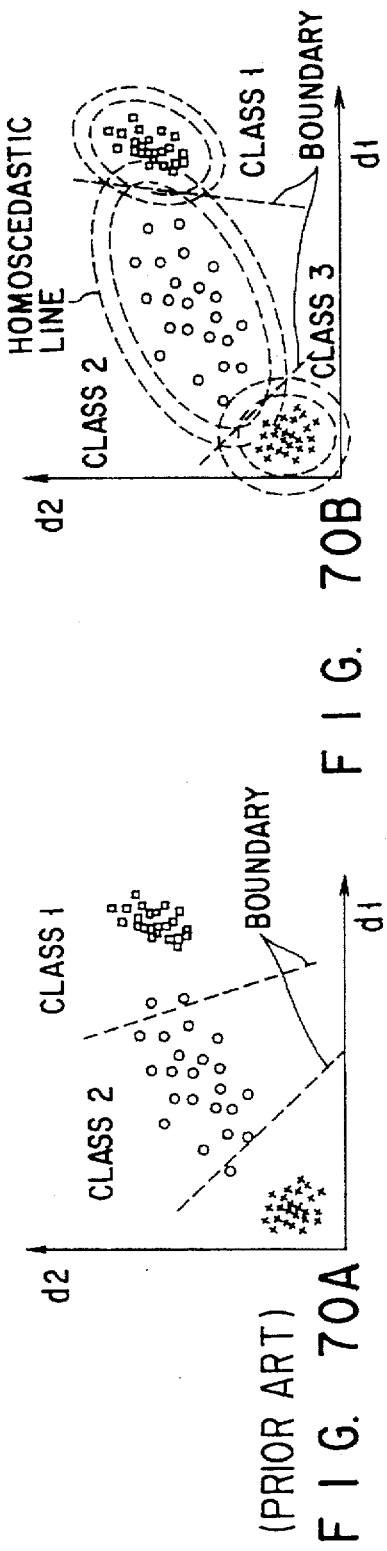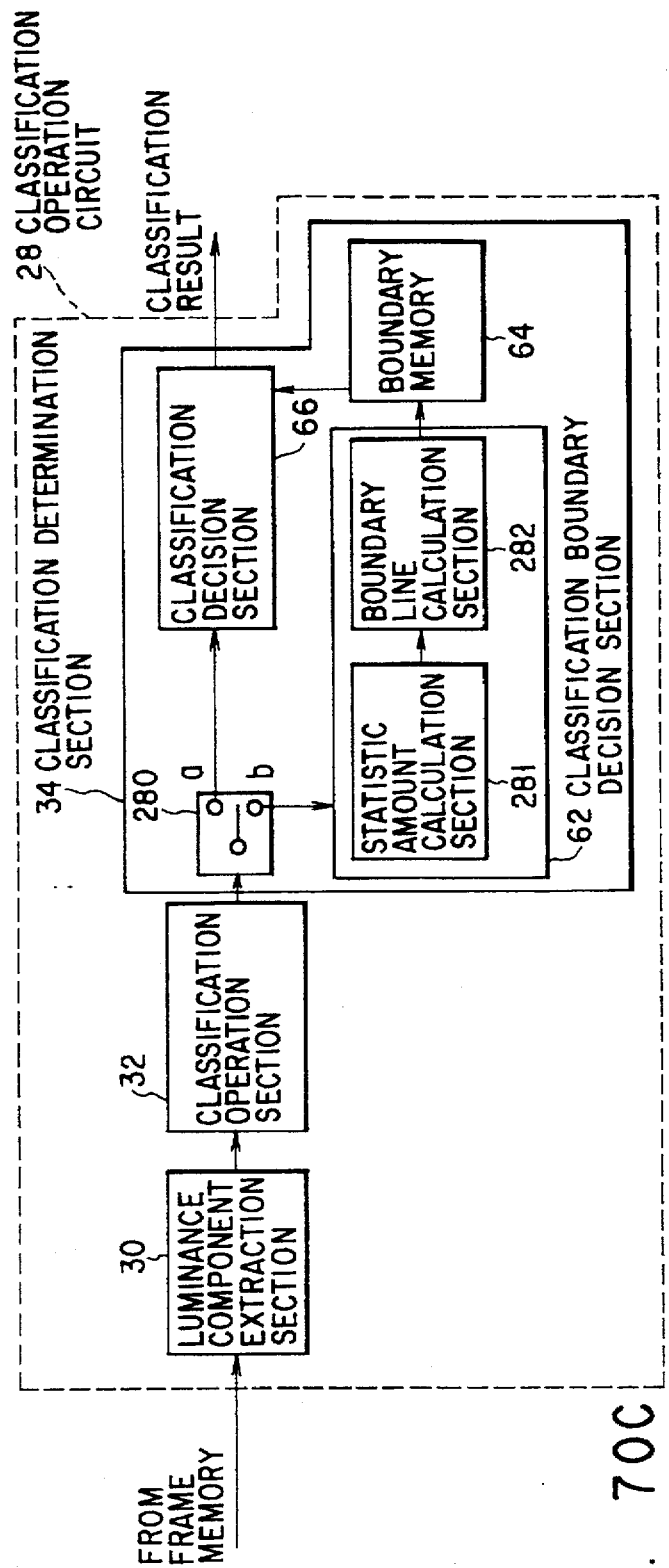
F I G. 70A (PRIOR ART)
F I G. 70B
F I G. 70C

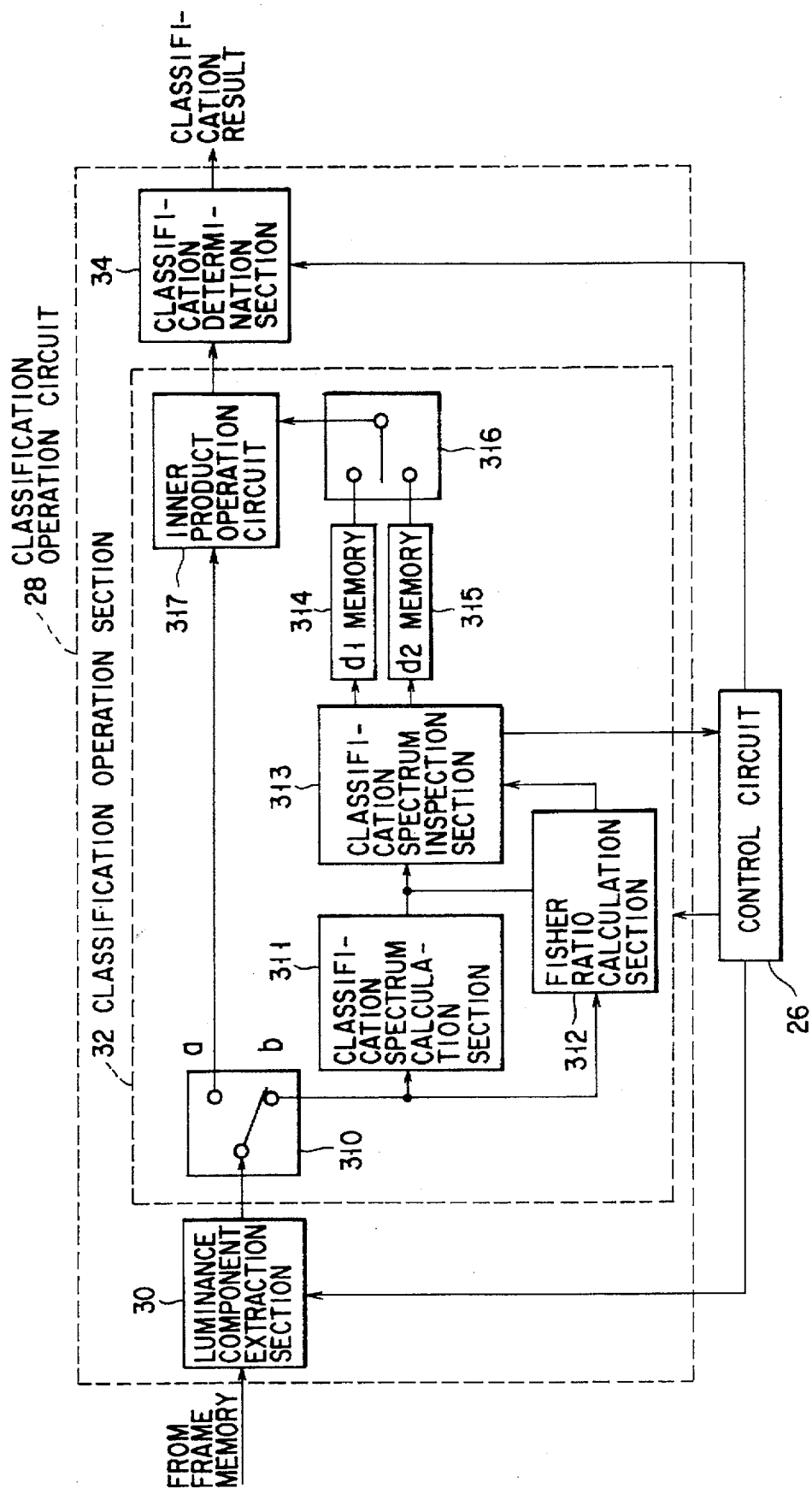
F I G. 72A

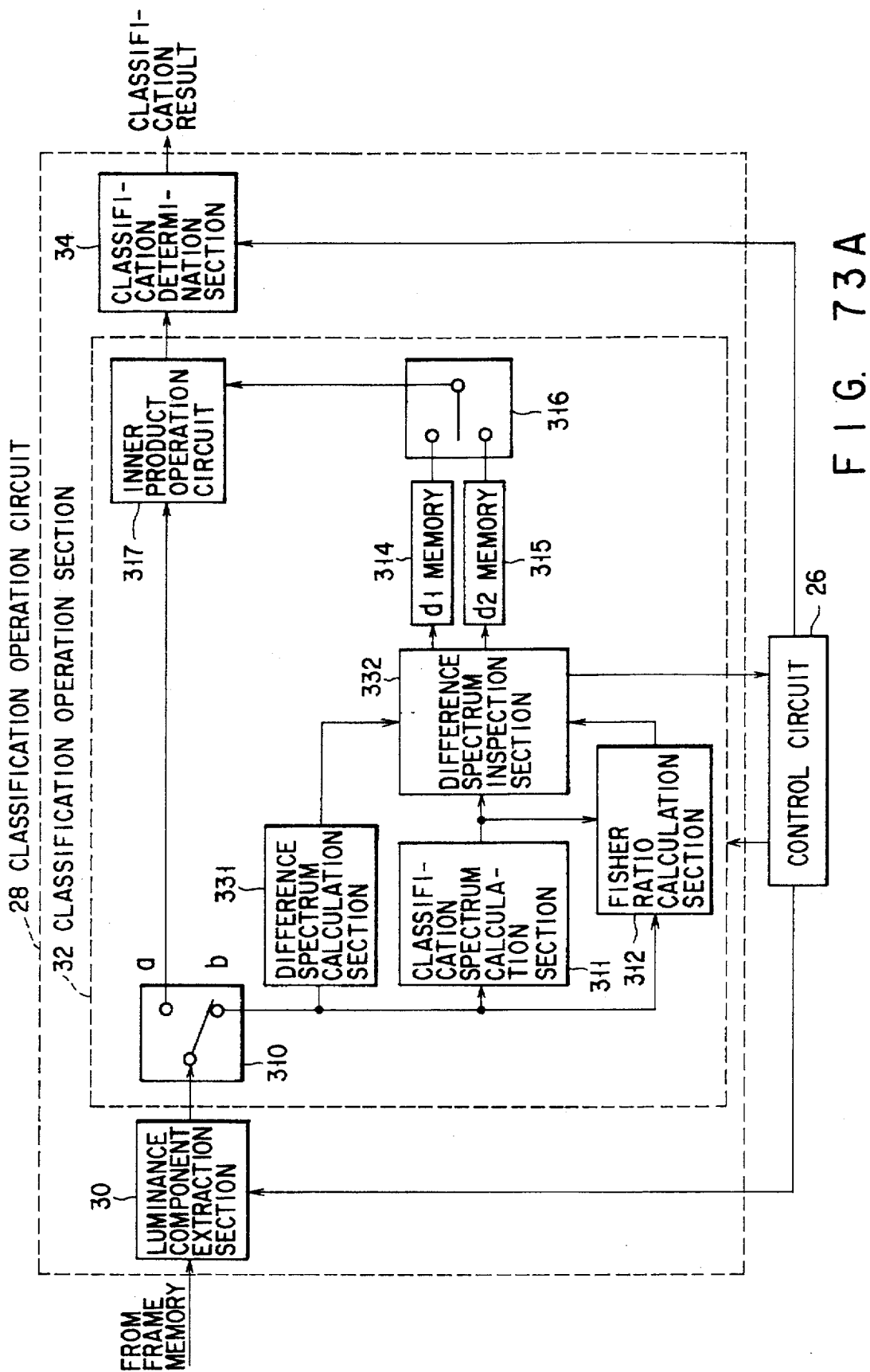

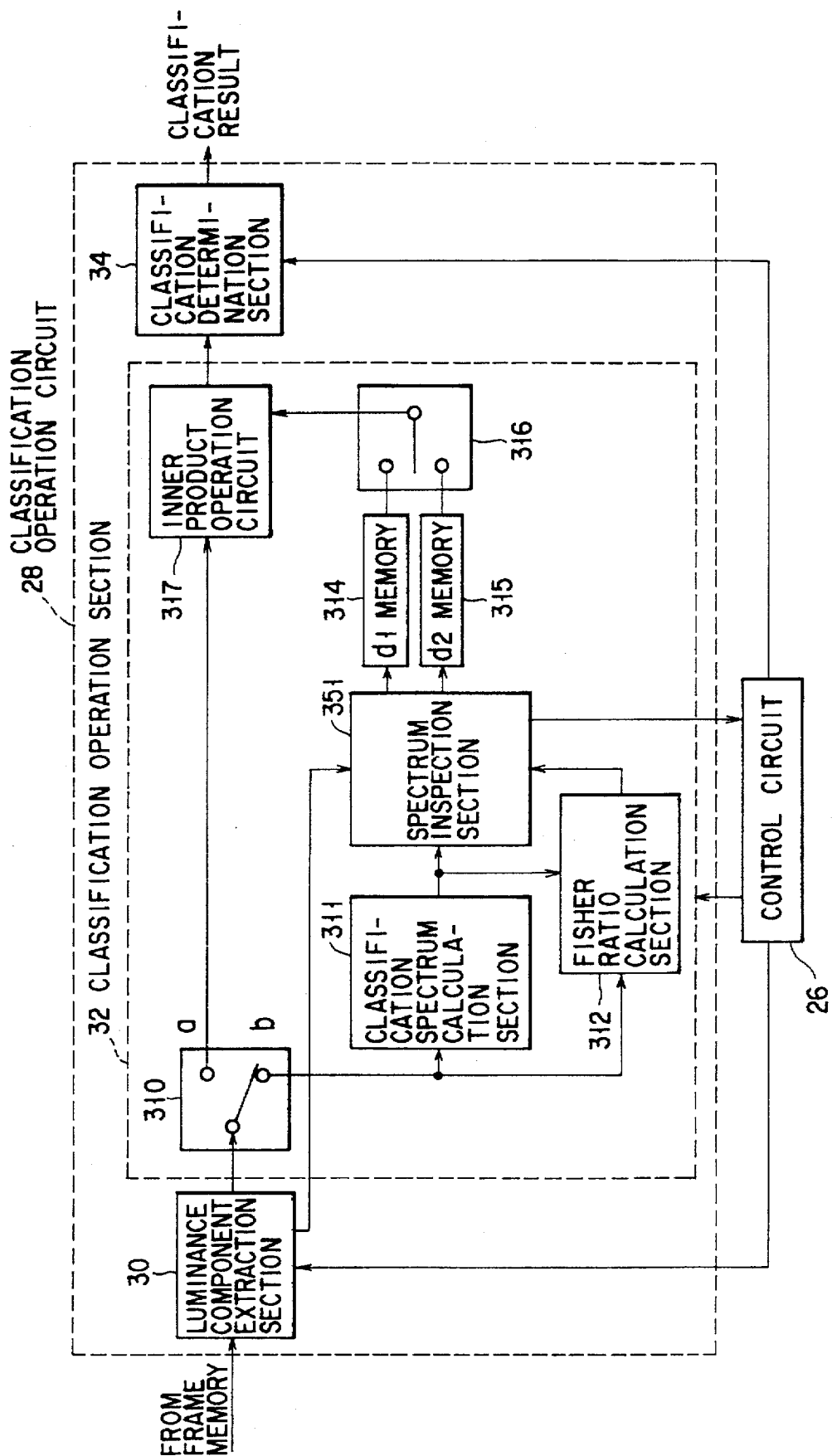
F I G. 74A

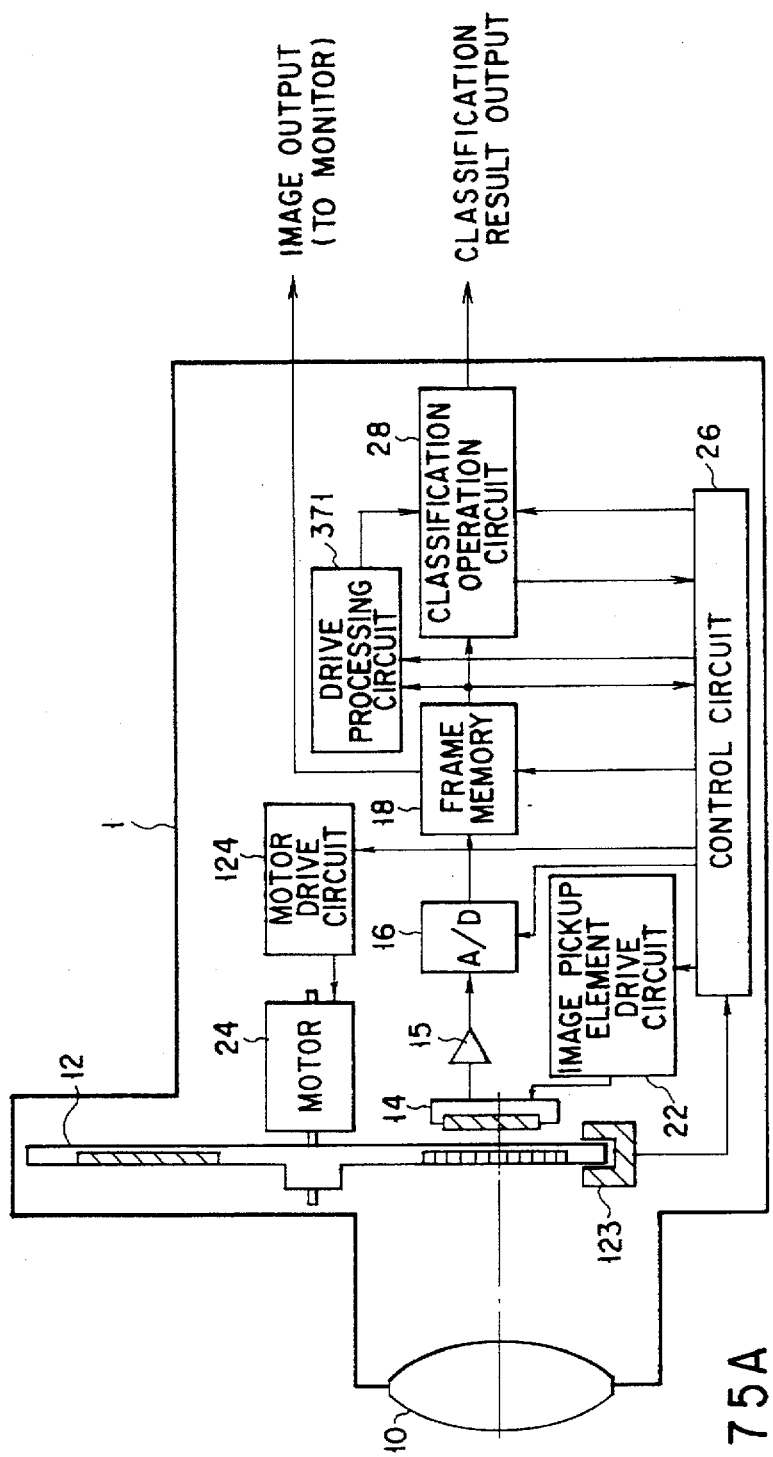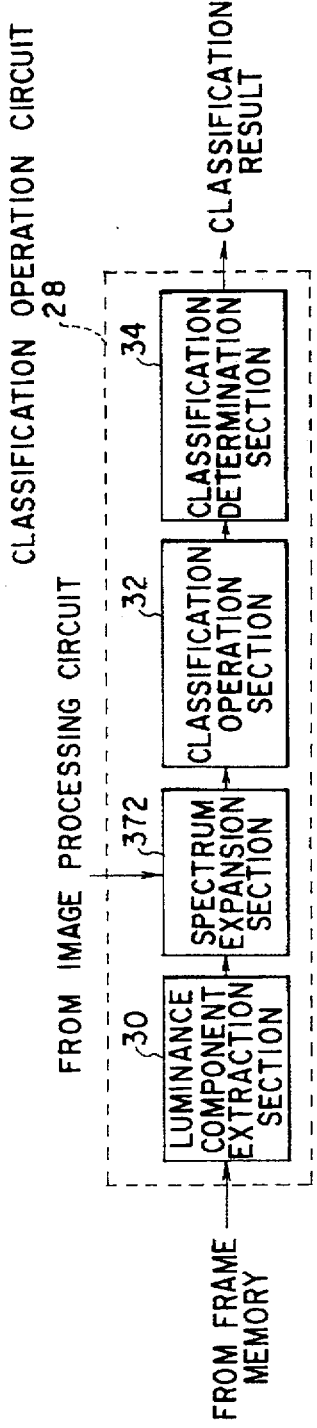
F I G. 75A
F I G. 75B

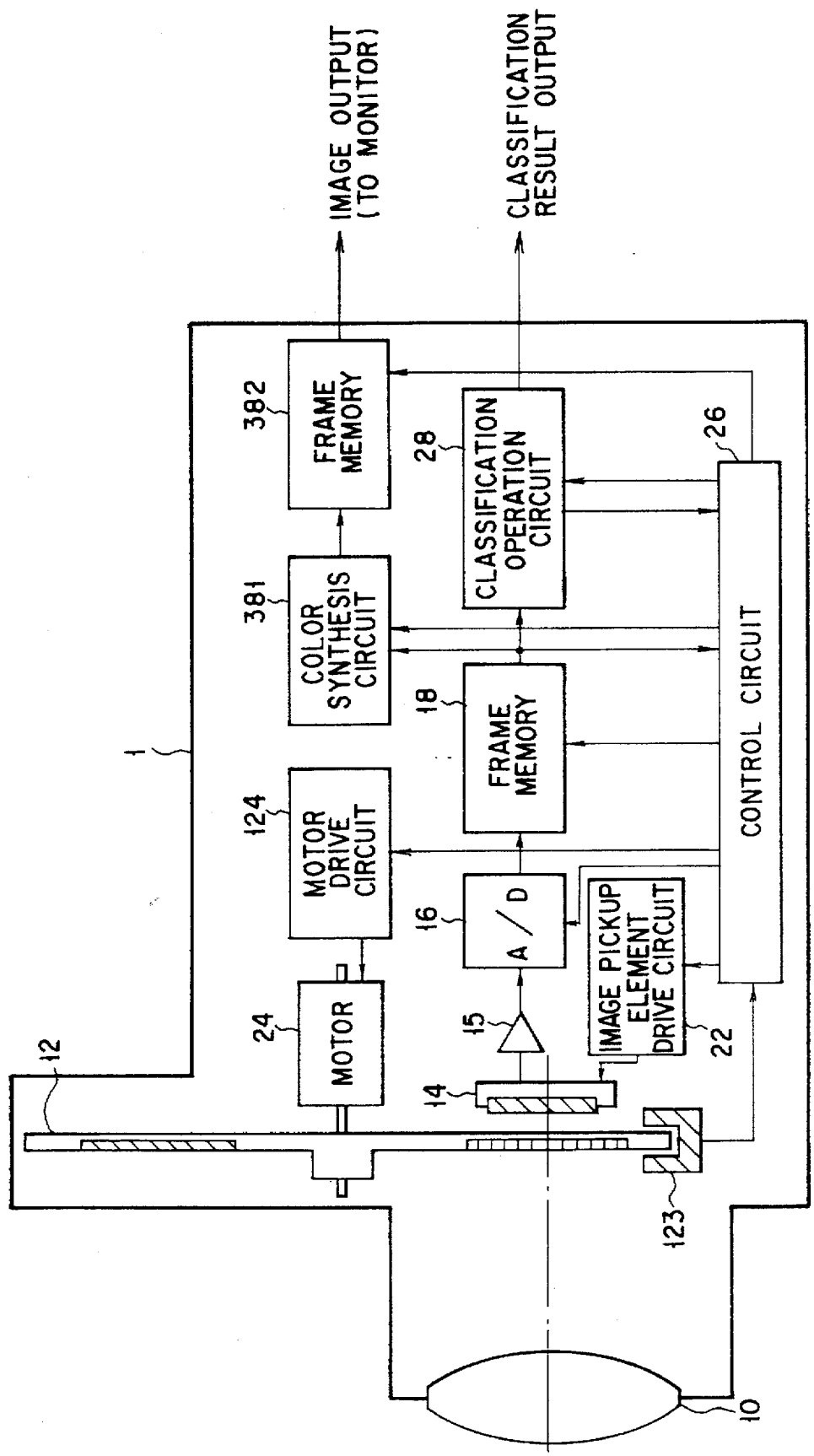
F I G. 76A

COLOR CLASSIFICATION APPARATUS

BACKGROUND OF THE INVENTION

1. Field of the Invention

The present invention relates to a color classification apparatus for classifying target objects mainly using colors, which apparatus can be used as a color measuring apparatus for measuring a color difference caused by a ratio of constituent components in color measurements of, e.g., products in a variety of industrial fields and target objects in medical and scholastic fields.

2. Description of the Related Art

Known conventional color measuring apparatus measures the intensities of reflected light components falling within the wavelength range mainly representing the three primary colors, i.e., red, green, and blue, and displays the measured colors as values in a color coordinate system standardized by the Commission Internationale de l'Eclairage (CIE), e.g., the XYZ colorimetric system or the L*a*b* colorimetric system, thereby identifying the colors.

This color measuring apparatus can express the colors of substances as absolute values in a colorimetric system similar to the human visual system. A color identification ability for detecting slight differences in colors of substances depends on the characteristics of a colorimetric system and is finally determined by R, G, and B values. For this reason, this color measuring apparatus cannot clearly identify differences in colors to be identified, i.e., spectral differences of reflected light components subjected to classification. For example, G colors having different spectra within the wavelength range of a color matching function cannot be classified using G measurement values.

An apparatus of this type is exemplified by a multichannel spectrophotometer for measuring spectra of light components reflected by a target object and identifying a color difference in accordance with a spectral difference. This apparatus, however, requires expensive devices such as a diffraction grating and a high-sensitivity detector array. In addition, in spectral measurement, the dimensionality per data undesirably increases, and an apparatus for processing and analyzing these data becomes bulky. As a result, the apparatus configuration becomes complicated, and the apparatus cost becomes high, resulting in inconvenience.

When the spectra of the light components are changed by a ratio of constituent components of a target object, a method of measuring the intensity of a light component at a specific wavelength to estimate a ratio of constituent components is attempted. For example, to obtain characteristic distribution of tissue hemoglobin on the surface of an internal organ in the medical field is important in morbid analysis of a variety of diseases. Reference "Sato, "Optical Characteristics of Living Body", Medical Electronics and Biotechnology, 24, 22–27, (1986)" proposes a method of measuring the intensity distribution of reflected light components at a few specific wavelengths from the analysis of spectra of light components scattered from internal organs such as a stomach or duodenum and estimating the oxygen saturation distribution of hemoglobin. That is, the absorption spectrum of oxyhemoglobin has two absorption peaks at wavelengths of 577 and 542 nm. Deoxygenated hemoglobin has one absorption band at a wavelength of 555 nm. The oxygen saturation of tissue hemoglobin is estimated in a combination of these peak wavelengths and a wavelength of 569 nm which is not influenced by the oxygen saturation.

To put this method into practice, the intensity of reflected light at a specific wavelength is measured using an interference filter having a narrow bandwidth or a monochromator. In this case, the S/N ratio of the measurement data may be lowered to disable a quantitative measurement because the input optical energy is very weak.

To solve the above problem, reference "Sato et al., "Spectral Diagnosis Using Laser", Artificial Organ 16, 1806–1810, (1987)" proposes an apparatus using a light-luminance laser source having a high wavelength selectivity. To generate laser beams tuned to a plurality of predetermined wavelengths, an expensive light source device such as a dye laser must be prepared. As a result, it is difficult to arrange an easy-to-handle apparatus in practice.

The above conventional color measuring apparatus does not necessarily employ an optimal input method for target objects subjected to classification to result in inconvenience because the apparatus measures the light intensities in the wavelength range of R, G, and B. The multichannel spectrophotometer is bulky and expensive and is not suitable for arranging an easy-to-handle apparatus in practice. The method of estimating the ratio of constituent components of a target object from the intensities of reflected light components at a few characteristic wavelengths poses a problem on the S/N ratio to arrange an apparatus because this method must measure the light intensity in the very narrow wavelength range.

A color identification apparatus for identifying the color of a target object has been conventionally utilized in management of painting colors and dyeing degrees in production sites in a variety of industries, color measurement of products, or color measurement of target objects in medical and scholastic fields.

In the prior art disclosed in U.S. Pat. No. 5,221,959, a statistic process is applied to the spectra of reflected light components of target objects to classify the target objects into two classes.

More specifically, the spectra of reflected light components of target objects whose classes are known are statistically processed using Foley Sammon transform (FS transform) (see Q. Tian, M. Barbaro, et al., "Image classification by the Foley-Sammon transform", Optical Engineering, Vol. 25, No. 7, 1986).

The FS transform is a technique for classifying target objects into two classes. More specifically, in the FS transform, a spectrum di, for classification, for maximizing a Fisher ratio R(di) obtained by equation (1) below is obtained:

$$R(di) = (di^t S1 di)/(di^t S2 di) \quad (1)$$

where di . . . classification spectrum $di^t$ . . . classification spectrum (transposition)

S1 . . . inter-class covariance matrix

S2 . . . intra-class covariance matrix

The spectrum di for classification will be referred to as a classification spectrum hereinafter.

This classification spectrum di should be accurately expressed as di(λ) because it has the same dimensionality as that of target object spectra, but is simply expressed as di.

Two classification spectra for maximizing the Fisher ratio are obtained.

The classification spectrum di for maximizing the Fisher ratio is defined as d1, and the classification spectrum di for maximizing the Fisher ratio in the spectra perpendicular to d1 is defined as d2.

The target objects can be classified into two classes by projecting data in a space constituted by the classification spectra d1 and d2.

The classification spectra d1 and d2 can be obtained by the following equation (2):

$$di = \alpha 1 S2^{-1}\Delta,$$

$$d2 = \alpha 2 S2^{-1}\{I - (\Delta^T S2^{-2}\Delta)/(\Delta^T S2^{-3}\Delta) S2^{-1}\}\Delta \quad (2)$$

where α1 and α2 are the normalization coefficients, Δ is X1–X2 (difference spectrum between classes 1 and 2), and I is the unit matrix.

To project the data into the space constituted by the resultant classification spectra d1 and d2, the inner products of the classification spectra and the spectrum of light reflected by a target object are obtained. In this case, if the spectrum of light reflected by the target object is defined as f(λ) (λ=wavelength), inner products t1 and t2 are expressed as follows:

$$t1 = f(\lambda) \cdot d1,$$

$$t2 = f(\lambda) \cdot d2 \quad (3)$$

where . represents the inner product operator.

In the technique disclosed in the above official gazette, a classification boundary is determined from the inner products t1 and t2, as shown in FIG. 77. A filter having the characteristics of these classification spectra is realized using a diffraction grating 501 and a liquid crystal 502, as shown in FIG. 78.

The classification spectra d1 and d2 generally have complicated shapes and take positive and negative values, as shown in FIG. 79, so that the strict mounting precision of the diffraction grating and the liquid crystal filter is required.

When the mounting positions are shifted due to mechanical vibrations caused by movement of the apparatus, the classification precision is greatly degraded. In addition, the diffraction grating itself is expensive. Demand has arisen for a simple, low-cost color classification apparatus which can withstand mechanical vibrations or the like.

The apparatus of the above official gazette is not suitable for classification using different light sources because the light source is limited to some extent (lamp 503). When the spectrum of the light source changes, it is difficult to perform good classification. When color classification is performed in a factory or the like, the light source can be specified. Demand has arisen for an apparatus capable of performing good classification even if a light source is not specified and its spectrum changes.

In the apparatus of the above official gazette, the light source is specified in advance, so the apparatus is not suitable for classification using different light sources. When the spectrum of the light source changes, good classification cannot be performed. In addition, the diffraction grating is expensive.

SUMMARY OF THE INVENTION

The present invention has been made in consideration of the above problems, and has as its first object to provide a practically useful color classification apparatus capable of inputting a light intensity, with a high S/N ratio, to a target object whose reflected light spectrum changes with a change in a ratio of constituent components, and efficiently and quantitatively performing color classification.

The present invention has been made in consideration of the above points, and has as its second object to provide a simple, low-cost color classification apparatus having a high resistance to mechanical vibrations and capable of properly performing color classification even if a light source is not specified and its spectrum changes.

In order to achieve the above objects, a color classification apparatus of the present invention is characterized by comprising image pickup means for picking up light reflected by a target object, a plurality of bandpass filters having different bands and arranged between the target object and the image pickup means, and classifying means for calculating a classification spectrum for classification using a statistic technique from a spectrum of light reflected by the target object and picked up by the image pickup means, and classifying the target object using the classification spectrum.

BRIEF DESCRIPTION OF THE DRAWINGS

FIG. 14 is a view showing the arrangement of a color classification apparatus according to the fourth embodiment of the present invention;

FIGS. 18A and 18B are views respectively showing the arrangements of a correction circuit in FIG. 17;

FIG. 18C is a view showing the arrangement of a classification operation section and a classification determination section in FIG. 16;

FIG. 19 is a view showing target objects of two classes;

FIG. 20 is a view showing a classification boundary determined by the color classification apparatus of the fourth embodiment in a learning mode;

FIG. 21 is a view showing target objects to be classified of unknown classes;

FIG. 22A is a view showing another arrangement of the classification operation section in the first embodiment;

FIG. 22B is a view showing boundaries determined in a color classification apparatus of the fifth embodiment of the present invention;

FIG. 24 is a view showing the arrangement of a luminance component extraction section in the color classification apparatus of the fifth embodiment of the present invention;

FIG. 27 is a flow chart showing the operation of a filter optimization operation circuit in FIG. 26A;

FIGS. 33A and 33B are views showing a color classification apparatus according to the 10th embodiment of the present invention;

FIG. 34 is a view showing the arrangement of a luminance component extraction section in a color classification apparatus according to the 11th embodiment of the present invention;

FIG. 35 is a view showing the characteristics of each mask circuit in FIG. 34;

FIG. 36 is a view showing the arrangement of the color classification apparatus of the 11th embodiment;

FIG. 37 is a view showing the arrangement of an image shift correction circuit in FIG. 35;

FIG. 40 is a flow chart for explaining the operation of the 12th embodiment;

FIG. 41 is a block diagram showing a color classification apparatus of the 13th embodiment of the present invention;

FIG. 42 is a view illustrating a rotary color stop plate used in the 14th embodiment;

FIG. 44 is a view illustrating a rotary ND filter used in the 14th embodiment;

FIG. 45 is a view illustrating a rotary slit plate used in the 14th embodiment;

FIG. 46 is a block diagram showing a color classification apparatus of the 15th embodiment of the present invention;

FIG. 47 is a flow chart for explaining the operation of the 15th embodiment;

FIG. 51 is a block diagram showing a color classification apparatus of the 17th embodiment of the present invention;

FIG. 52 is a view showing an image focused on a CCD of the 17th embodiment;

FIG. 53 is a view illustrating a reference plate of the 17th embodiment;

FIG. 54 is a block diagram showing a color classification apparatus of the 18th embodiment of the present invention;

FIG. 62 is a block diagram showing a color classification apparatus of the 20th embodiment of the present invention;

FIG. 63 is a view for explaining the arrangement of an optical path division prism used in the 20th embodiment;

FIG. 64 is a view for explaining a coupled state between the optical path division prism and a CCD of the 20th embodiment;

FIG. 68A is a block diagram showing a classification operation circuit of the 22nd embodiment of the present invention;

FIG. 68B is a block diagram showing a classification operation section of the 22nd embodiment;

FIG. 70A is a view showing a learning data distribution according to a conventional method;

FIG. 70B is a view showing a learning data distribution according to the 24th embodiment of the present invention;

FIG. 70C is a block diagram showing a classification determination section of the 24th embodiment;

FIG. 72A is a block diagram showing a classification operation circuit of the 26th embodiment of the present invention;

FIG. 73A is a block diagram showing a classification operation circuit as the first modification of the 26th embodiment;

FIG. 74A is a block diagram showing a classification operation circuit as the second modification of the 26th embodiment;

FIG. 75A is a block diagram showing a color classification apparatus of the 27th embodiment of the present invention;

FIG. 75B is a block diagram showing a classification operation circuit of the 27th embodiment;

FIG. 76A is a block diagram showing a color classification apparatus of the 28th embodiment of the present invention;

DETAILED DESCRIPTION OF THE PREFERRED EMBODIMENTS

The preferred embodiments of the present invention will be described in detail with reference to the accompanying drawings.

First of all, the first embodiment of the present invention will be generally described. A color measuring apparatus according to the first embodiment of the present invention comprises a light source for generating illumination light for illuminating a target measurement object, a light-receiving element for converting light reflected by the target measurement object into an electrical signal, and a color classification filter arranged on an optical path between the light source and the target measurement object.

The transmission characteristics of this color classification filter are designed from a statistic technique using a training set serving as spectrum data of a plurality of samples prepared for each of a plurality of classes determined in a difference in content of a spectral component of light reflected by the target measurement object. More specifically, a difference vector between the average vectors of classes, of all the plurality of classes determined on differences in contents of spectral components of the reflected light, which have the largest difference in color is defined as the transmission characteristics.

According to this embodiment, when target objects subjected to color classification are limited, an optimal color classification filter characteristic is derived in advance from the above statistic technique for spectrum data (training set) of samples belonging to the classes subjected to classification. A difference in color according to this embodiment is originated from a difference in content of a spectral component. The training set is prepared as classes roughly classified in accordance with differences in contents.

In color classification, a color classification filter is arranged on an optical path in accordance with a filter control means, and a wavelength characteristic suitable for classifying the spectrum of light reflected by the target measurement object is extracted. Therefore, according to the spectrum of light reflected by the target measurement object upon illumination of the object with illumination light having such a wavelength characteristic, quantitative color classification based on the content of the spectral component can be performed.

According to this method, good color classification can be performed because the optimal filter characteristic can be statistically derived for a specific target object subjected to color classification. The characteristic of the color classification filter can be realized by digitally operating the measurement values of the light intensities of several band filters in practice. Therefore, an apparatus having a high S/N ratio can be arranged.

Figure 1:
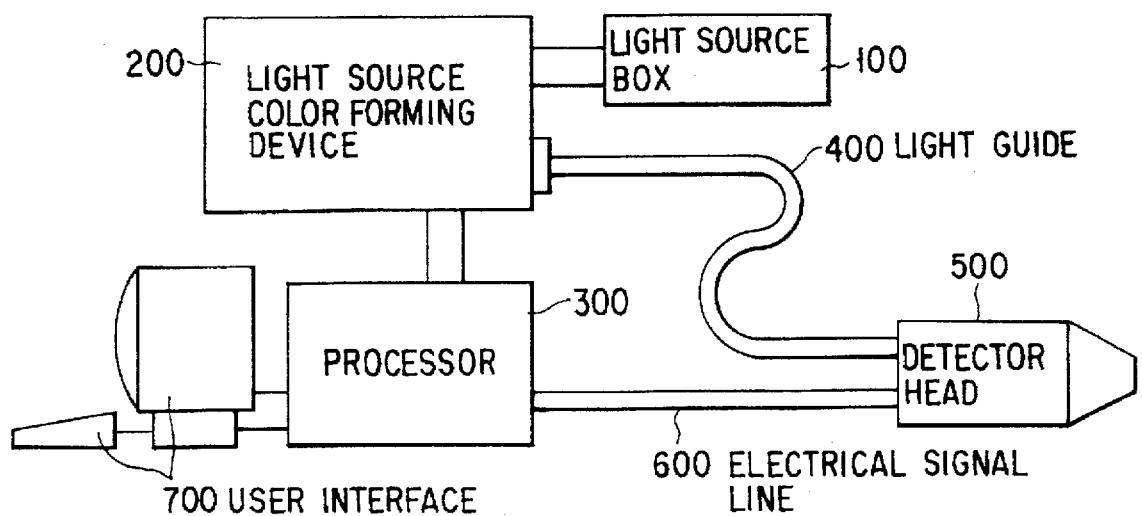
FIG. 1 is a view showing the arrangement of a color measuring apparatus according to the first embodiment of the present invention.

FIG. 1 is a view showing the arrangement of a color measuring apparatus according to the first embodiment of the present invention. This apparatus comprises a light source box 100 for generating white light, a light source color forming device 200 for converting white light generated by the light source box 100 into illumination light having a predetermined spectrum and outputting the illumination light, a light guide 400 for guiding the illumination light output from the light source color forming device 200 to a predetermined position, a detector head 500 for illuminating a target object with the illumination light and converting light reflected by the target object into an electrical signal, an electrical signal line 600 for transmitting an output electrical signal from the detector head 500, a processor 300 for sending a command signal to form a predetermined light source color to the light source color forming device 200 and processing the electrical signal received from the detector head 500 through the electrical signal line 600, and a user interface 700 for inputting a command from an operator to the processor 300 and at the same time displaying a processing result.

Figure 2:
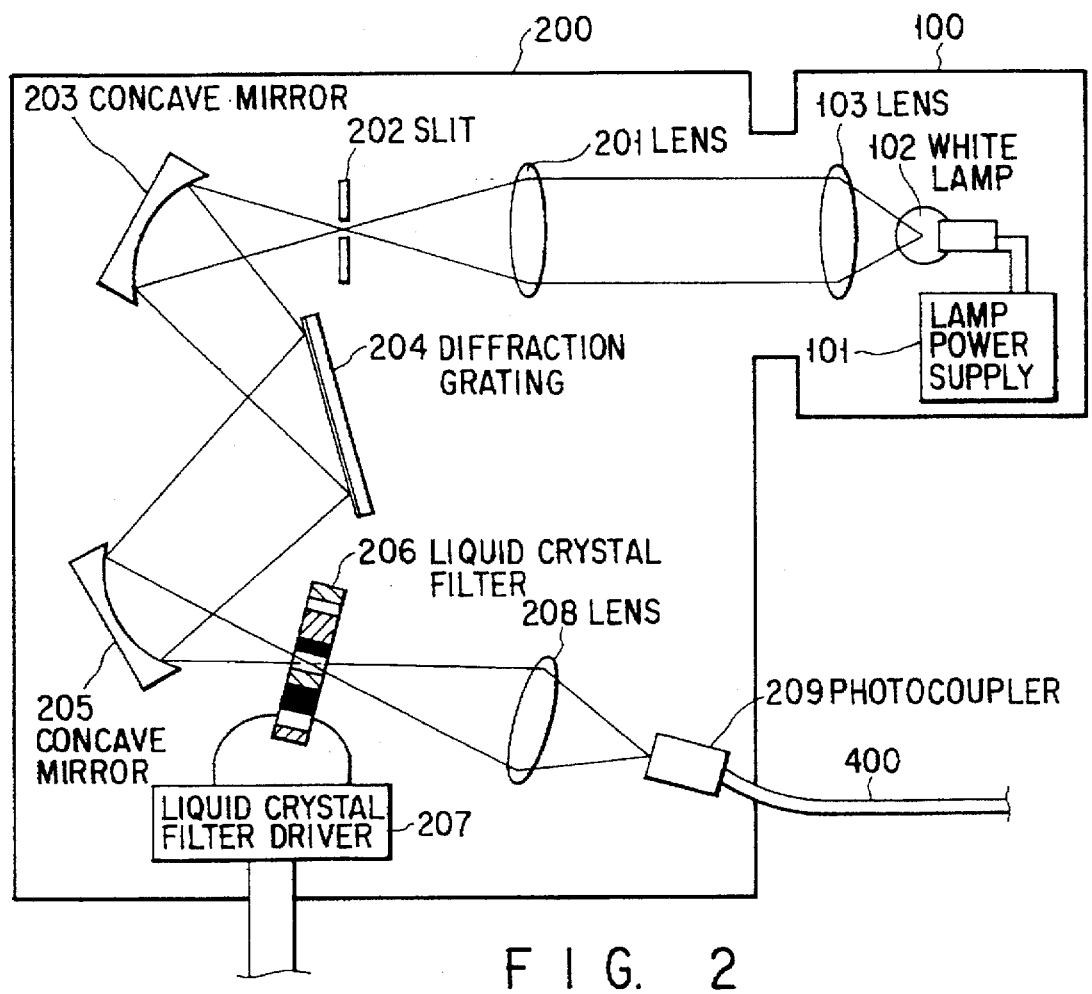
FIG. 2 is a view showing the arrangement of a light source box and a light source color forming device shown in FIG. 1.

FIG. 2 is a view showing the arrangement of the light source box 100 and the light source color forming device 200. A lamp power supply 101 and a white lamp 102 are arranged in the light source box 100. White light generated by the white lamp 102 is collimated by a lens 103 and guided to the light source color forming device 200.

In the light source color forming apparatus 200, white light incident from the light source box 100 is focused on a slit 202 by a lens 201. The white light passing through the slit 202 is reflected by a concave mirror 203 and guided to a diffraction grating 204. The diffraction grating 205 diffracts the white light in a specific direction with respect to a wavelength. The diffracted light is reflected by a concave mirror 205 and focused on a liquid crystal filter 206. The predetermined position of the liquid crystal filter 206 is set to have a predetermined transmittance by a liquid crystal filter driver 207 controlled by the processor 300, so that each transmittance can be set at each focus position of each wavelength.

The illumination light passing through the liquid crystal filter 206 and converted into a predetermined light source color is focused by the lens 208, and the focused light is guided by a photocoupler 209 to the light guide 400 constituted by an optical fiber bundle.

Figure 3:
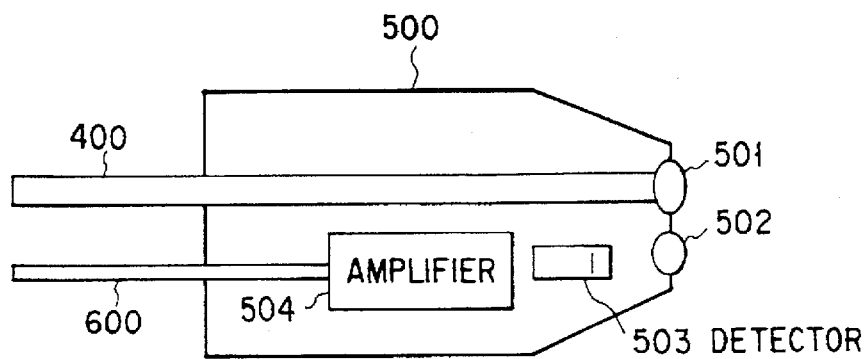
FIG. 3 is a view showing the arrangement of a detector head shown in FIG. 1.

The detector head 500 is arranged, as shown in FIG. 3. The illumination light guided by the light guide 400 is radiated by a lens 501 at a wide angle. Light reflected by the target object is focused on a detector 503 by a lens 502. The detector 503 has a photoelectric conversion element such as a photodiode and generates a current signal corresponding to an incident light intensity. This current signal is amplified by an amplifier 504, and the amplified signal is sent to the electrical signal line 600.

Figure 4:
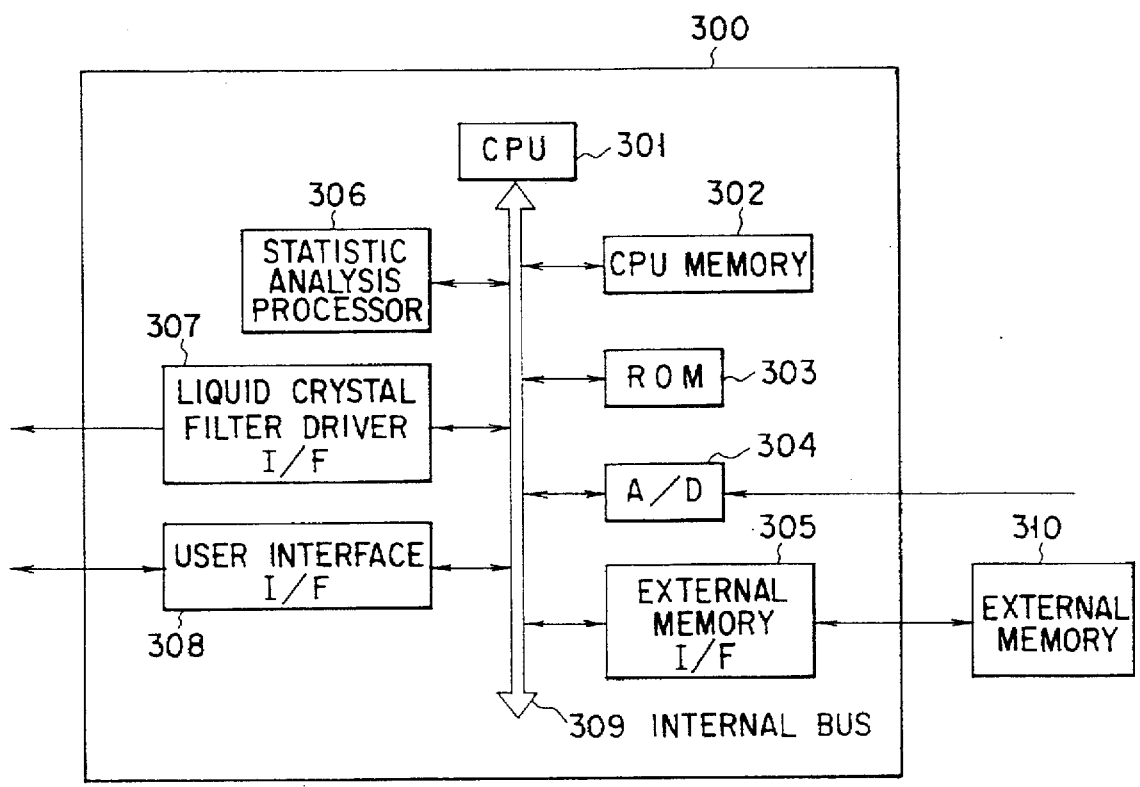
FIG. 4 is a view showing the internal arrangement of a processor shown in FIG. 1.

FIG. 4 is a view showing the internal arrangement of the processor 300. Referring to FIG. 4, a CPU 301 is connected to a ROM 303, a CPU memory 302, an A/D converter (to be referred to as an A/D hereinafter) 304, a statistic analysis processor 306, a liquid crystal filter driver interface (I/F) 307, a user interface (I/F) 308, and an external memory interface (I/F) 305 through an internal bus 309. The CPU 301 controls each constituent component and the overall apparatus.

The ROM 303 stores an operating system (OS) and execution programs managed under the control of this OS. An execution program is read out and executed, as needed. The CPU memory 302 is constituted by a RAM and stores programs and data upon execution of the programs. The A/D 304 receives an output signal from the detector head 500 and converts it into digital data. The statistic analysis processor 306 comprises a sum total operation unit, a memory, and the like. The processor 306 is a dedicated processor for performing high-speed matrix operations in accordance with pipeline processing and the like.

The liquid crystal filter driver interface (I/F) 307 is an interface for sending a command signal for determining the address and transmittance to the liquid crystal filter driver 207. The user interface (I/F) 308 is an interface for outputting a program menu and a measurement result to a display device and receiving a signal from a keyboard. The external memory interface (I/F) 305 is an interface for an external memory 310, i.e., a hard or floppy disk drive used for recording programs and measurement results in a recording medium such as a hard or floppy disk and loading the program and data therefrom.

The operation of the arrangement described above will be described below.

Figure 5:
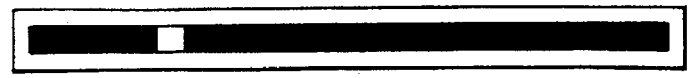
FIG. 5 is a view showing a design example of the transmission distribution of a liquid crystal filter.

This embodiment has two phases, i.e., statistic analysis for determining a classification filter characteristic and actual classification processing. A color classification filter suitable for color classification of a specific color can be designed as follows. A plurality of samples each having each color (reflected spectral light) to be classified are prepared for each class, and statistical analysis is performed. First of all, a training set is formed to perform statistical analysis. As shown in FIG. 5, the transmittance distribution of the liquid crystal filter 206 is set such that a transmittance in a given specific wavelength region $R_1$ becomes maximum. A sample is illuminated with illumination light closer to monochrome light from the light source color forming device 200 having the liquid crystal filter 206 thus formed.

Figure 6:
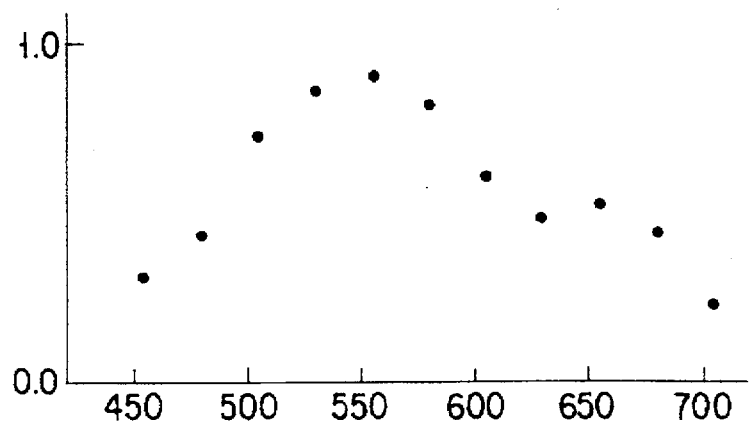
FIG. 6 is a view showing measured spectrum data.

The intensity of light reflected by the sample illuminated with this illumination light is measured and recorded in the CPU memory 302 in the processor 300. The wavelength region $R_1$ is shifted, and the above operation is repeated. The intensities of reflected light components in $\underline{n}$ ($\underline{n}$ is about several tens of regions) wavelength regions divided within the set wavelength range are recorded. The measured spectrum data example is shown in FIG. 6. This example represents spectrum data obtained by measuring the intensities of reflected light components in a total of 11 wavelength regions at an interval of 25 nm within the wavelength range of 450 to 700 nm. The spectrum data of each class for all the prepared samples are measured to prepare a training set.

When a total data amount is large, the data may be temporarily stored in the external memory 310 such as a hard or floppy disk.

The first technique for designating a classification filter having a spectral characteristic suitable for classifying the data into classes from the prepared training set will be described below. Assume that a series of samples whose colors slightly change due to changes in a ratio of two color components are prepared as the training set.

Assume that a target color spectrum is defined as an n-dimensional spectrum $x-[x_1, x_2, \ldots, x_n]^t$ and that a change in color is observed by adding another color $\underline{b}$ which causes a change in a reference color $\underline{a}$.

$$x = \alpha \underline{a} + \beta \underline{b} \qquad (4)$$

where $\underline{a}$ and $\underline{b}$ are the unit vectors.

A change in color is assumed to be appeared by a change in ratio of two color components. When the prepared training set is assumed to have the absolute intensity of the reference color $\underline{a}$ which rarely changes between the classes, a difference vector of average vectors of the two classes having the largest color difference is obtained to obtain $\underline{b}$, which can be defined as an approximate classification reference.

The number of classes observed as the trailing set is defined as $\underline{m}$, and the average vectors of the samples belonging to each class are defined as $\bar{x}^1, \bar{x}^2, \ldots, \bar{x}^m$, satisfying that $$\bar{x}^k = \frac{1}{N_k} \sum_{i=1}^{N_k} {}_i x^k \qquad (5)$$

where ${}^i x^k$: the ith sample vector belong to the kth class $N_k$: the number of samples of the kth class Assuming that a higher component ratio is given when $\underline{b}$ is larger, a largest difference vector $\underline{d}$ between $x_i$ and $x_m$ is obtained as follows:

$$d = \bar{x}_m - \bar{x}_i = ((\alpha \underline{a} + \beta_m \underline{b}) - (\alpha \underline{a} + \beta_1 \underline{b}) = (\beta_m - \beta_1) \underline{b} \qquad (6)$$

where the average vector of the kth class is defined as follows:

$$\bar{x}_k = \alpha \underline{a} + \beta_k \underline{b}, \ (\beta_1 < \beta_1 < \ldots < \beta_m) \qquad (7)$$

Figure 7:
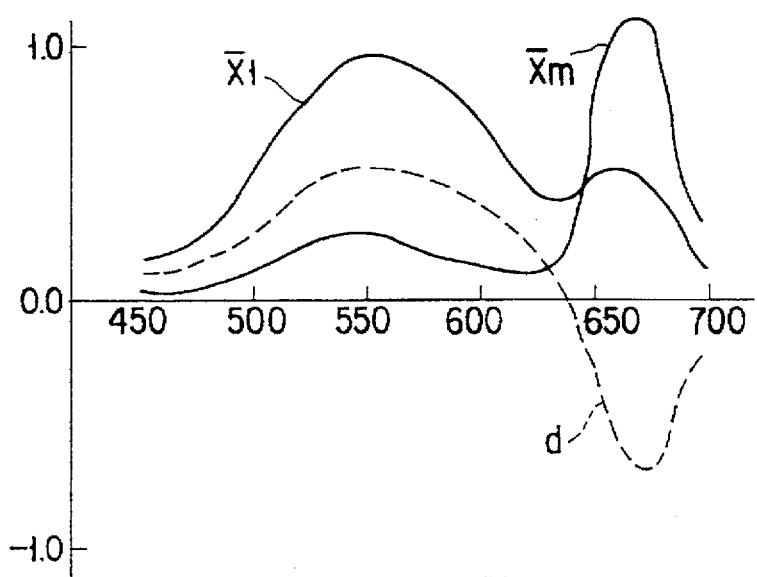
FIG. 7 is a view showing the concept of a difference vector d.

The concept of the difference vector $\underline{d}$ is shown in FIG. 7.

The color component ratio of the vector $\underline{b}$ can be estimated from the inner product between the difference vector $\underline{d}$ and the vector $\underline{x}$ of the light reflected by the target object as follows:

$$x'.d=(\alpha a+\beta b)'.c.b-\alpha cd'b+\beta cb'b=\alpha'a'b+\beta' \tag{8}$$

for $d=cb$, $\alpha'=\alpha c$, and $\beta'=\beta c$.

The values of $\alpha'a'b$ are equal for all the data, so that the value of $\beta'$ and hence the value of $\beta$ can be estimated. The inner product in equation (8) can be obtained by measuring the intensity of reflected light passing through the color classification filter representing $\underline{d}$.

Figure 8:
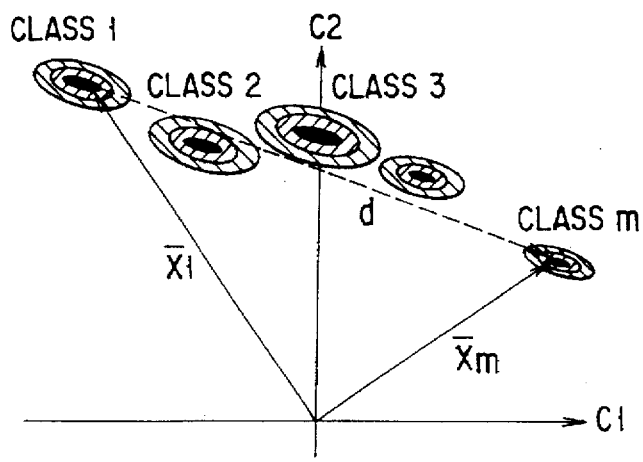
FIG. 8 is a view showing the concept of the effect of the first method for designing a classification filter.

The effect of the first method described above is shown in FIG. 8 representing its concept. For the illustrative convenience, the dimensionality in FIG. 8 is two, and the axes of the dimensionality are defined as $c_1$ and $c_2$, respectively.

The second technique for designing a color classification filter will be described below. This technique can be applied even if the absolute intensity of the reference color $\underline{a}$ is not constant such that the intensity of illumination light changes. According to this technique, a spectrum vector $\underline{x}$ is basically projected in an arbitrary orthogonal complement of the unit vector $\underline{a}$, and classification is performed on this projection space.

First of all, an orthogonal complement $a^{\perp}$ of the unit vector $\underline{a}$ is obtained as follows.

A plurality of sample vectors $\{X_1\}$ for spectrum data of the prepared training set, which are closer to the unit vector $\underline{a}$, i.e., which rarely contain the unit vector $\underline{b}$ are measured by changing the illumination light intensity, and the sample vectors are subjected to main component analysis (K-L transform). First main component vector $u_1$ is a vector almost close to the vector $\underline{a}$, and its eigenvalue becomes a variance value representing variations in intensity.

A space $A=[u_2, u_1, \ldots, u_r]$ constituted by the vectors of the second or subsequent main components is assumed as a space close to the orthogonal complement $a^{\perp}$ of the vector $\underline{a}$.

Note that $r \leq n$ represents a rank set when the sample spectrum $\{x_1\}$ is K-L-transformed, which rank has a value smaller than the main component number whose eigenvalue becomes almost zero. When the spectrum vector $\underline{x}$ is defined as in equation (4), projection into the space A can be expressed as follows:

$$x'A=(\alpha a+\beta b)'A=\alpha a'A+\beta b'A \equiv \beta b'A \tag{9}$$

More specifically, projection into the space A can eliminate the component of the reference color $\underline{a}$, and the component intensity $\beta$ of the vector $\underline{b}$ can be estimated. The intensities of light components passing through a plurality of color classification filters representing the component vectors of the space A are measured as component values because the inner product operation is the basic operation in projection into the space A.

Figure 9:
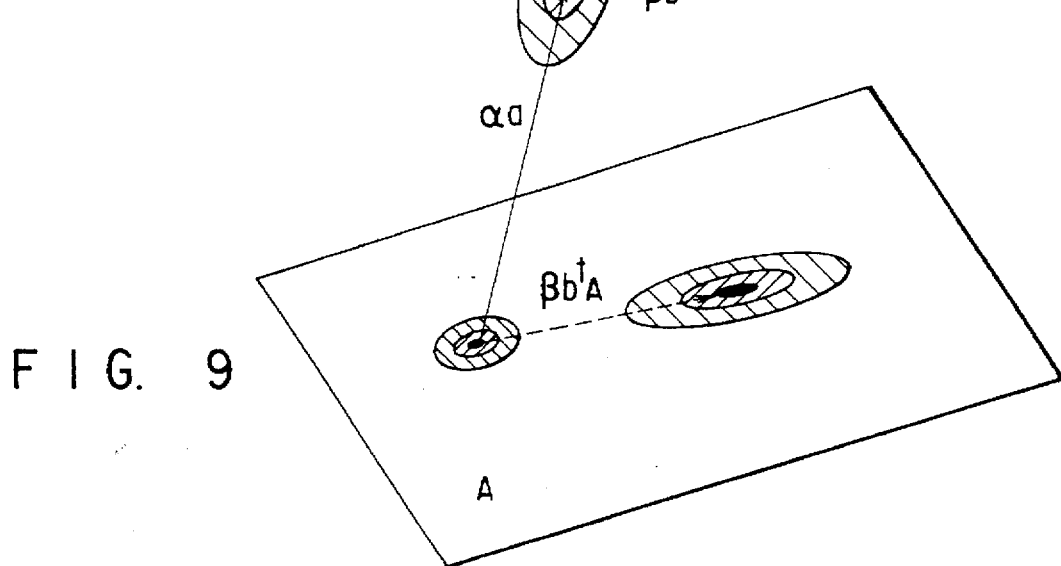
FIG. 9 is a view showing the concept of the effect of the second method for designing a classification filter.

The effect of this technique is shown in FIG. 9. FIG. 9 shows projection of the spectrum vector $\underline{x}$ expressed on the three-dimensional space into a two-dimensional space A orthogonal to the unit vector $\underline{a}$.

In this technique, the training set vectors $\{x_1\}$ and $\{x_m\}$ having the largest color difference may be projected into the space A obtained by the above method, a projection difference vector $d'=\bar{x}_m'-\bar{x}_1'$ may be obtained from the redefined projected average vectors $\bar{x}_1$ and $\bar{x}_m$, and the difference vector may be defined as the color classification filter.

The third technique for designating a color classification filter will be described below. According to this technique, the difference vector $\bar{d}$ described with reference to the first technique is rotated to obtain an effective vector in color classification. More specifically, a Monte Carlo algorithm is used in a manner to be described below.

(1) $d=\bar{x}_m-\bar{x}_1$ is obtained and defined as an initial value.

(2) $x_k$ ($k=1, 2, \ldots, m$) is projected on $\underline{d}$ to calculate a variance $v_o$:

$$v_o = \sum_{k=1}^{m} (\bar{x}_k{}^t d - \bar{x}_k{}^t \bar{d})^2 \tag{10}$$

(3) The difference vector $\underline{d}$ is rotated through a very small angle $\alpha$ along an arbitrarily set plane P, and a new variance $\underline{v}$ is calculated using equation (10).

(4) If $v>v_o$, a vector obtained by rotating the difference vector through $\alpha$ to obtain a new difference vector $\underline{d}$ to set $v_o=v$. However, if $v \leq v_o$, the difference vector $\underline{d}$ is rotated through the very small angle $\alpha$ in the opposite direction along the plane P to calculate a new variance $\underline{v}$.

(5) The operation (3) or (4) is repeated until the variance $\underline{v}$ becomes maximum.

(6) The operations (3) to (5) are repeated for a plane Q perpendicular to the plane P.

(7) A classification vector $d_p$ obtained on the plane P and a classification vector $d_q$ obtained on the plane Q are added to obtain a classification vector $d_t$, as follows:

$$d_t = d_p + d_q \tag{11}$$

Figure 10:
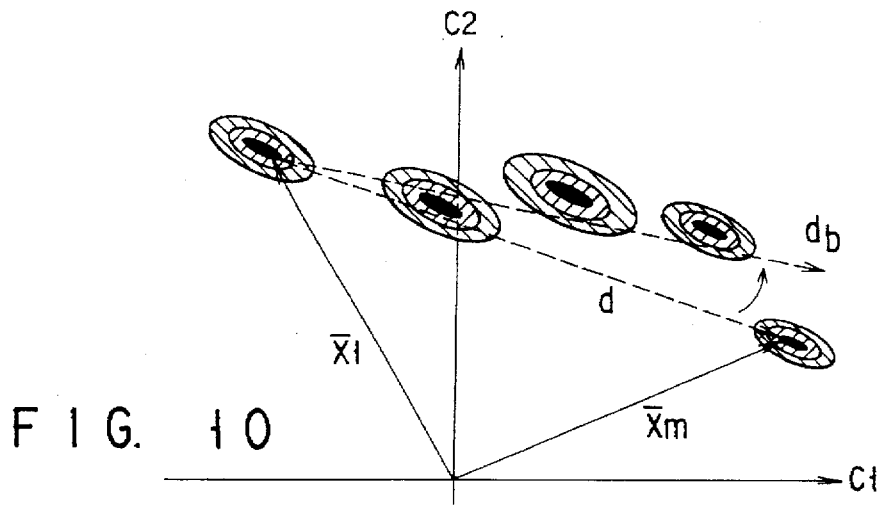
FIG. 10 is a view showing the concept of the effect of the third method for designing a classification filter.

The result of the above technique is shown in FIG. 10.

The phase for actually performing the classification processing using the classification filter characteristic obtained by the above method will be described below. For example, when color classification is to be performed by the difference vector $\underline{d}$, the transmittance distribution of the liquid crystal filter 206 is sequentially set to realize two different spectral transmission characteristics for the positive and negative components of the difference vector $\underline{d}$. A target object is illuminated with illumination light having a specific wavelength extracted by each of the two color classification filters set as described above. Light reflected by the target object is converted into an electrical signal, so that positive and negative vector components $z^+$ and $z^-$ of each reflected spectral light are measured. The measurement values of the positive and negative components of each color classification vector are subtracted in the processor 300 as follows:

$$z=z^+-z^- \tag{12}$$

The resultant difference is compared with a specific closest one of measurement values $z_k$ obtained in advance for the average vectors $\bar{x}_k$ ($k=1, 2, \ldots, m$) of each class of the training set, thereby classifying the difference into a specific class.

The $\underline{z}$ value may be used to quantitatively evaluate the $\underline{b}$ content of the vector.

According to the first embodiment, operations from the measurement of the training set to the design of the classification vector, and actual color classification can be performed by a relatively simple single apparatus.

Figure 12:
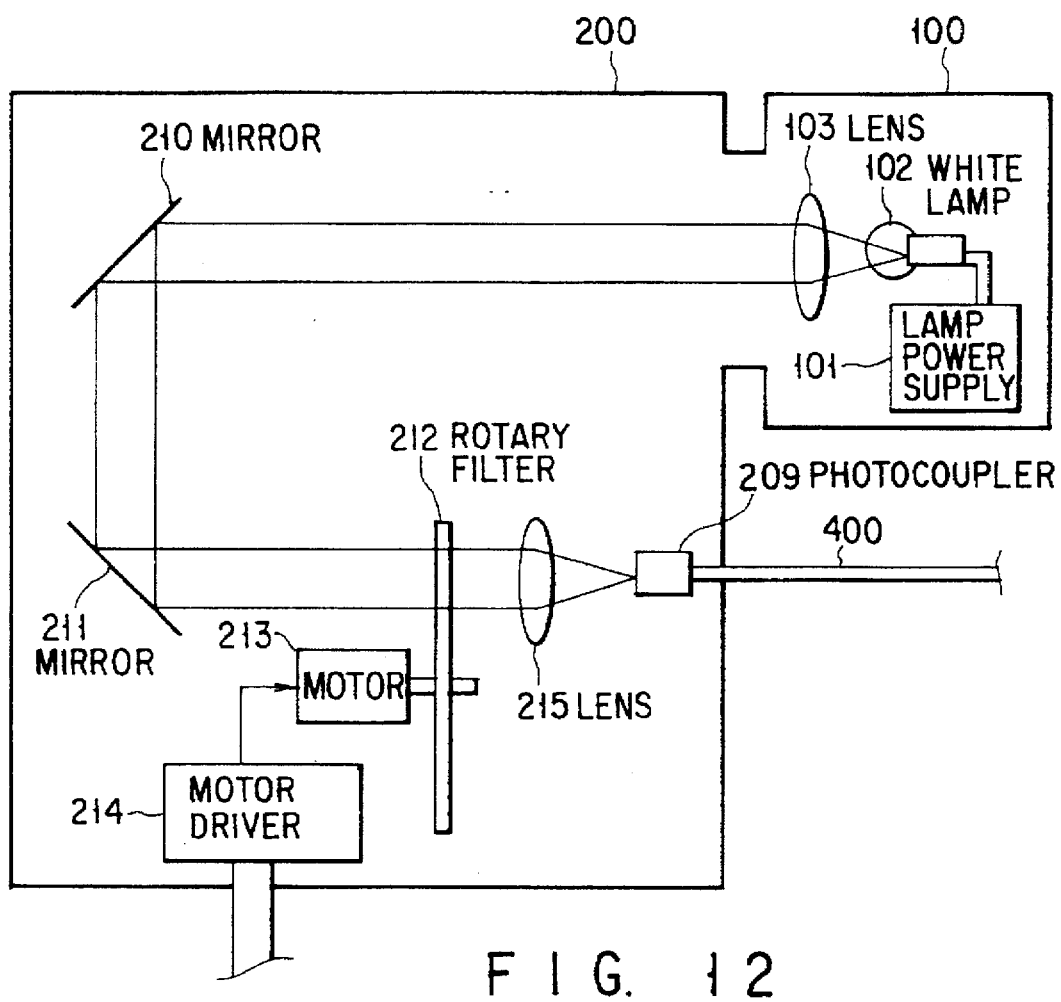
FIG. 12 is a view showing the internal arrangement of a light source color forming device used in the second embodiment.

The second embodiment will be described below. The second embodiment exemplifies a more simple arrangement in which a rotary filter is provided to a light source color forming device 200 in main processing for performing color classification. This embodiment has the same arrangement of the phase of statistic processing for deciding classification filter characteristics as that in the first embodiment. The internal arrangement of the light source color forming device 200 in this main processing for performing color classification is shown in FIG. 12. white light generated by a white lamp 102 in a light source box 100 is collimated by a lens 103 and guided to the light source color forming device 200. The white light is reflected by mirrors 210 and 211 and passes through a rotary filter 212.

Figure 11:
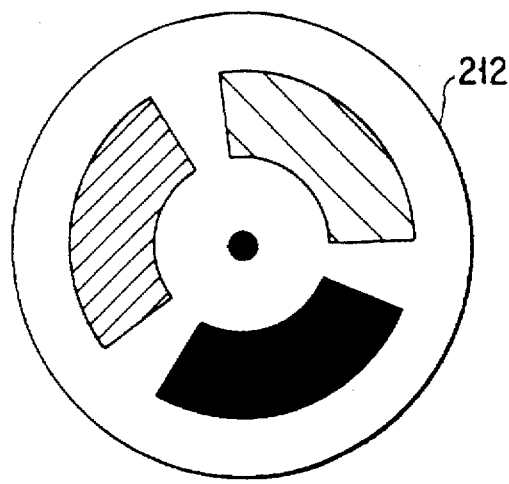
FIG. 11 is a view showing the arrangement of a rotary filter.

The rotation of the rotary filter 212 is controlled by a motor 213. The motor 213 is controlled by a motor driver 214 which is controlled in accordance with a command signal from a processor 300. Several color filters having predetermined frequency transmission characteristics in the rotational direction are provided to the rotary filter 212, as shown in FIG. 11. Each color filter is constituted by a color glass filter which is dyed by adjusting constituent components or a multilayered filter whose surface is coated with a metal. Transmission characteristics close to the color classification filter characteristics determined by preprocessing are realized. For example, when the color classification filter characteristic is set as a difference vector $\underline{d}$ represented by equation (3), the difference vector $\underline{d}$ has positive and negative characteristics, as shown in FIG. 7. In this case, the color filter is constituted by a plurality of band filters which approximately realize the characteristics at the respective positive and negative portions. Light passing through the rotary filter 212 and converted into a predetermined frequency characteristic is focused by a lens 215 and guided to a light guide 400 through a photocoupler 209.

The operation of the above arrangement will be described below.

According to this embodiment, while the light source color forming device 200 using a diffraction grating 204 and a liquid crystal filter 206 as shown in FIG. 2 is used in preprocessing for deciding color classification filter characteristics, the simple light source color forming device 200 as shown in FIG. 12 is used in classification processing. Note that a usual spectroscope (monochromator) in which a slit is located at a position of the liquid crystal filter 206 and the set angle of the diffraction grating 204 can be controlled in preprocessing, in place of the light source color forming device 200 as shown in FIG. 2. In the color classification processing, light reflected by a target object illuminated with illumination light passing through each color filter provided to the rotary filter 212 is detected by a detector head 500, and the detected light is recorded as digital data in the processor 300.

One target object is illuminated with illumination light through all the color filters. When the intensities of the reflected light components are detected, the processor 300 performs predetermined addition/subtraction operations between the detected intensity values of light components to evaluate classification.

According to the second embodiment described above, when a type of target object subjected to color classification is limited in advance, the color classification processing can be easily performed to decrease cost and realize high-speed processing to a large number of target objects.

The third embodiment will be described below.

Figure 13:
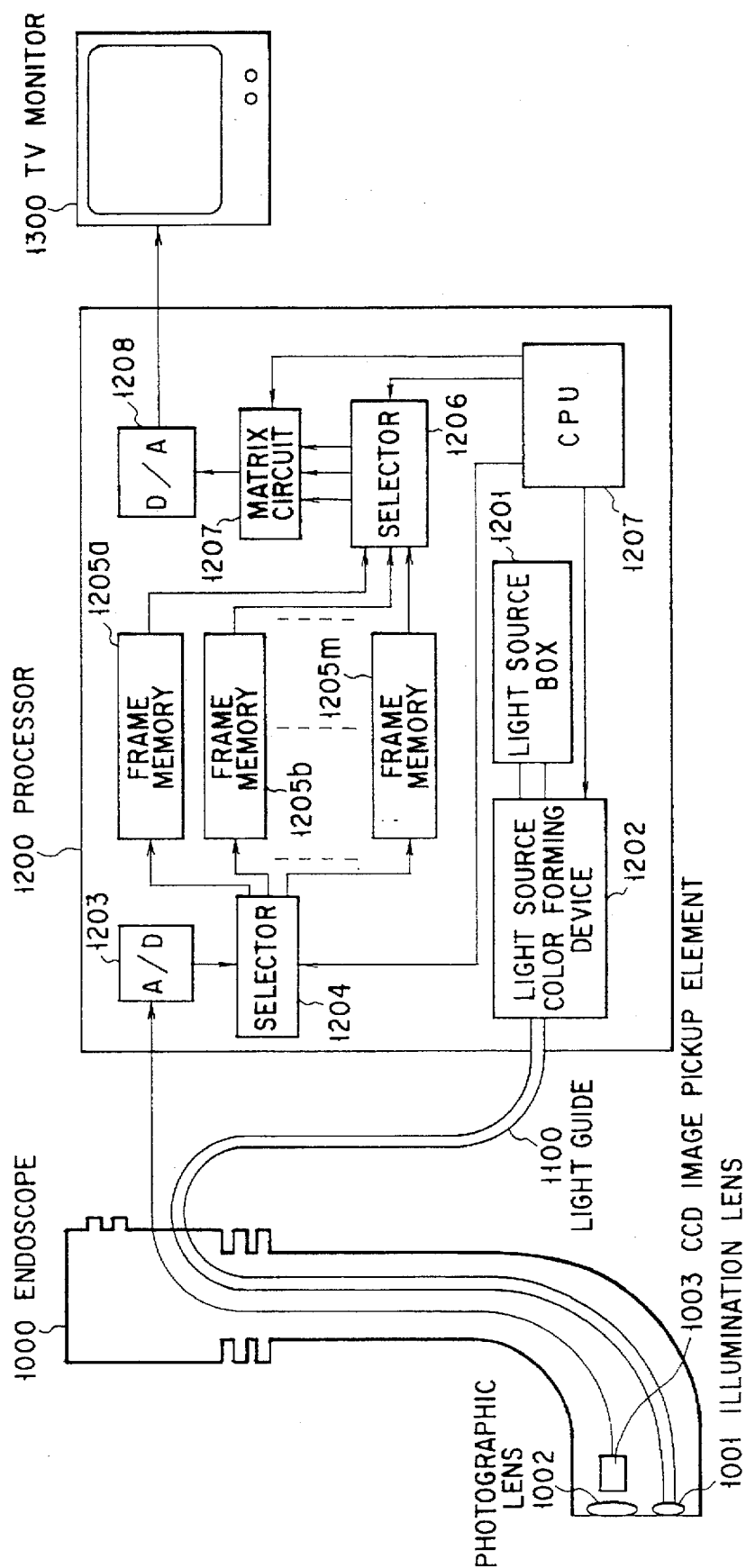
FIG. 13 is a view showing an arrangement according to the third embodiment.

This embodiment exemplifies an endoscope device as an example of the arrangement of an image apparatus having a color classification function on the basis of the principle of the present invention. The arrangement of this embodiment is shown in FIG. 13. The arrangement is schematically divided into an endoscope 1000, a light guide 1100, a processor 1200 including a light source device and an image processing section, and a TV monitor 1300. An illumination lens 1001 for radiating illumination light guided through the light guide 1100 is arranged at the distal end of the endoscope 1000. An illuminated target object is focused by a photographic lens 1002 arranged at the same distal end of the endoscope 1000, and the image is picked up by a CCD image pickup element 1003.

The CCD image pickup element 1003 converts the image of the target object into a monochrome video signal and sends the signal to the processor 1200. A light source box 1201 and a light source color forming device 1202 are located in the processor 1200. They have the same arrangement as the light source box 100 and the light source color forming device 200 in the first and second embodiments. Illumination light having a predetermined spectrum is generated by the light source box 1201 and the light source color forming device 1202. When the image of the target object is picked up with the illumination light, a video signal is converted into a digital signal by an A/D converter 1203. The digital signal is recorded in a predetermined region among frame memories 1205a to 1205m ($m \geq 3$) through a selector 1204.

The above operation is repeated, and at most three image signals are selected from images recorded in the frame memories 1205a to 1205m, and sent to a matrix circuit 1207. The matrix circuit 1207 converts at most the three images into predetermined color images, and a video D/A converter 1208 converts the color images into predetermined analogue video signals. The analogue video signals are displayed on the TV monitor 1300. A CPU 1209 in the processor 1200 controls the operations of the respective constituent elements such that it sends a command for a spectrum of illumination light generated by the light source color forming device 1202, controls the selectors 1204 and 1206, and sends coefficients of a matrix operation to the matrix circuit 1207.

The operation of the above arrangement will be described below. In this embodiment, the endoscope is added with a function of imaging a slight color difference depending on a specific morbid state, e.g., a characteristic distribution of tissue hemoglobin in addition to a function of displaying a normal RGB color image. Filter characteristics of classifying a specific color using a technique as described in the first embodiment are determined for a plurality of cases prepared in advance. Processes in the following two modes are performed in an actual medical examination and diagnosis.

First of all, spectra of illumination light are sequentially converted into R, G, and B characteristics to record respective images in an RGB mode. This operation is ended within 1/30 second, and the resultant images are displayed as an RGB color image every 1/30 second. In a color classification mode, light for realizing a color classification filter characteristic determined in advance is illuminated to record an image. As shown in the first embodiment, since the color classification filter is realized by a plurality of bands, an operation for recording images corresponding to the number of bands in the frame memories is performed within 1/30 second as a video frame rate. The matrix circuit 1207 performs a predetermined operation between the plurality of images, and color classification information is imaged as a monochrome image or a pseudo color image and displayed on the TV monitor 1300.

According to the third embodiment, the principle of the present invention is applied to the image apparatus to display color classification information as distribution information for a region in which the information is displayed as an image. Therefore, an apparatus capable of visually grasping the condition of a target object in which different color states are present can be provided.

As has been described above, according to the first, second, and third embodiments of the present invention, there can be provided a practically useful color classification apparatus capable of inputting a light intensity with a high S/N ratio to a target object whose reflected spectrum changes in accordance with a change in a ratio of constituent components, and efficiently and quantitatively performing color classification.

Before the fourth embodiment is described, the principle of the present invention will be described first to help understanding the present invention.

Figure 15A:
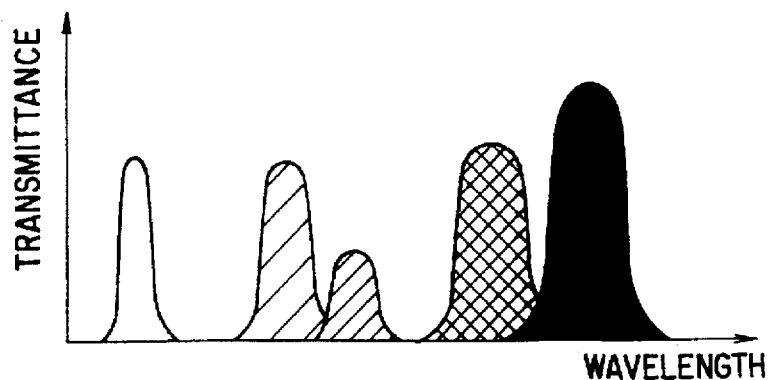
FIG. 15A is a view showing the characteristics of a plurality of bandpass filters used in a rotary color filter used in the color classification apparatus of the fourth embodiment.
Figure 15B:
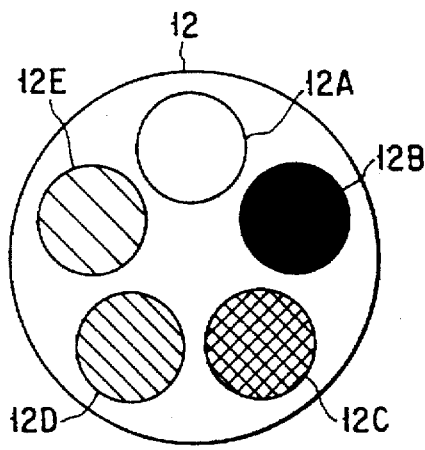
FIGS. 15B and 15C are views showing the arrangements of rotary color filters, respectively.
Figure 15C:
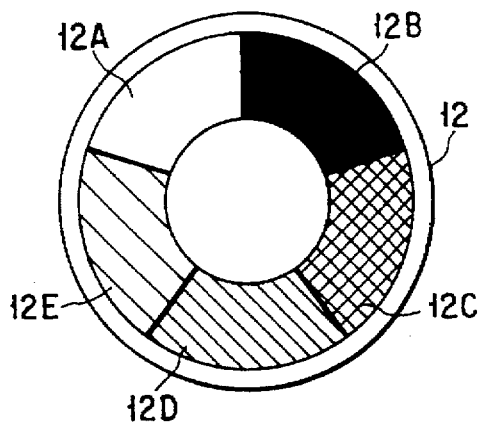
Figure 16:
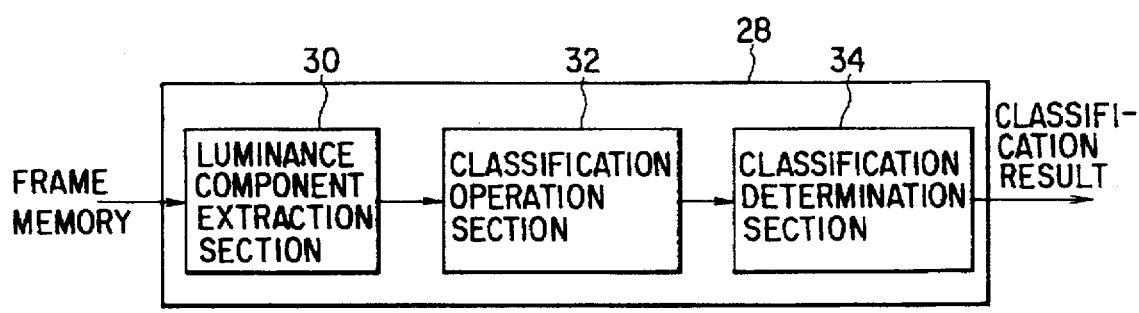
FIG. 16 is a block diagram showing the arrangement of a classification operation circuit in FIG. 14.

According to the present invention, unlike the conventional apparatus, a filter for classification is not constituted by a diffraction grating and a liquid crystal filter. The present invention employs a filter, as shown in FIGS. 15B and 15C, obtained by combining a plurality of bandpass filters shown in FIG. 15A through which only specific wavelengths can transmit, thereby realizing a simple, low-cost color classification apparatus.

In order to perform color classification using different light sources, a spectrum of light reflected by a proper reference plate is measured under the same condition as in photography of a target object, and the spectrum of light reflected by the target object is corrected using the spectrum of light reflected by the reference plate to eliminate the influence of the light sources (illumination light). That is, let $\lambda$ be a wavelength, $f(\lambda)$ be a spectrum of light reflected by a target object, $s(\lambda)$ be a spectrum of light reflected by a reference plate, $L(\lambda)$ be a spectrum of reflected light of the illumination light, and $M(\lambda)$ be a sensitivity spectrum of a photographic system (e.g., transmission spectrum of a photographic lens or a sensitivity spectrum of an image pickup element). A photographic spectrum $gi(\lambda)$ of the target object and a photographic spectrum $gs(\lambda)$ of the reference plate are represented by $$gi(\lambda)=f(\lambda)\times L(\lambda)\times M(\lambda),$$

$$gs(\lambda)=s(\lambda)\times L(\lambda)\times M(\lambda)$$

a spectrum $gi'(\lambda)$ of the target object is represented by $$gi'(\lambda)=gi(\lambda)/gs(\lambda)=f(\lambda)/s(\lambda) \quad (13)$$

In this manner, the influence of the spectrum $L(\lambda)$ of reflected light of the illumination light can be eliminated. If $gi'(\lambda)$ is used, classification can be performed using different light sources.

When the luminances of illumination light components are different, the power of the signal $gi'(\lambda)$ after elimination of the influence of the spectrum $L(\lambda)$ is normalized.

The fourth embodiment of the present invention will be described below with reference to the drawings.

First of all, a color classification apparatus for classifying target objects for two classes will be described.

FIG. 14 is a view showing its arrangement. The color classification apparatus of the present invention comprises an optical system 10 including a stop and a lens, a rotary color filter 12 constituted by a plurality of bandpass filters 12A, 12B, . . . , and 12E as shown in FIG. 15A, a CCD 14 for receiving images of a target object O and a reference plate R, an A/D converter 16, a frame memory 18, a monitor 20 for displaying a photographed portion, a CCD drive driver 22, a drive motor 24 for the rotary color filter 12, a control section 26 for controlling the CCD drive driver 22, the rotary color filter, the drive motor 24, and the like and sending an instruction to a classification operation circuit 28, and the classification operation circuit 28 for performing classification.

The rotary color filter 12 is constituted by several kinds of bandpass filters 12A to 12E, as shown in FIG. 15B. Each filter has a characteristic to transmit light through an arbitrary band width, as shown in FIG. 15A. In this embodiment, for the sake of descriptive and illustrative simplicity, the rotary color filter 12 is constituted by five bandpass filters. Note that the arrangement of the optical system 10 and the rotary color filter 12 may be reversed such that the rotary color filter 12 is arranged in front of the optical system 10.

The classification operation circuit 28 comprises a luminance component extraction section 30 for extracting a luminance component of the target object O, a classification operation section 32 for performing an operation (e.g., FS transform) for classification, and a classification determination section 34 for performing learning for classification determination and the classification determination.

Figure 17:
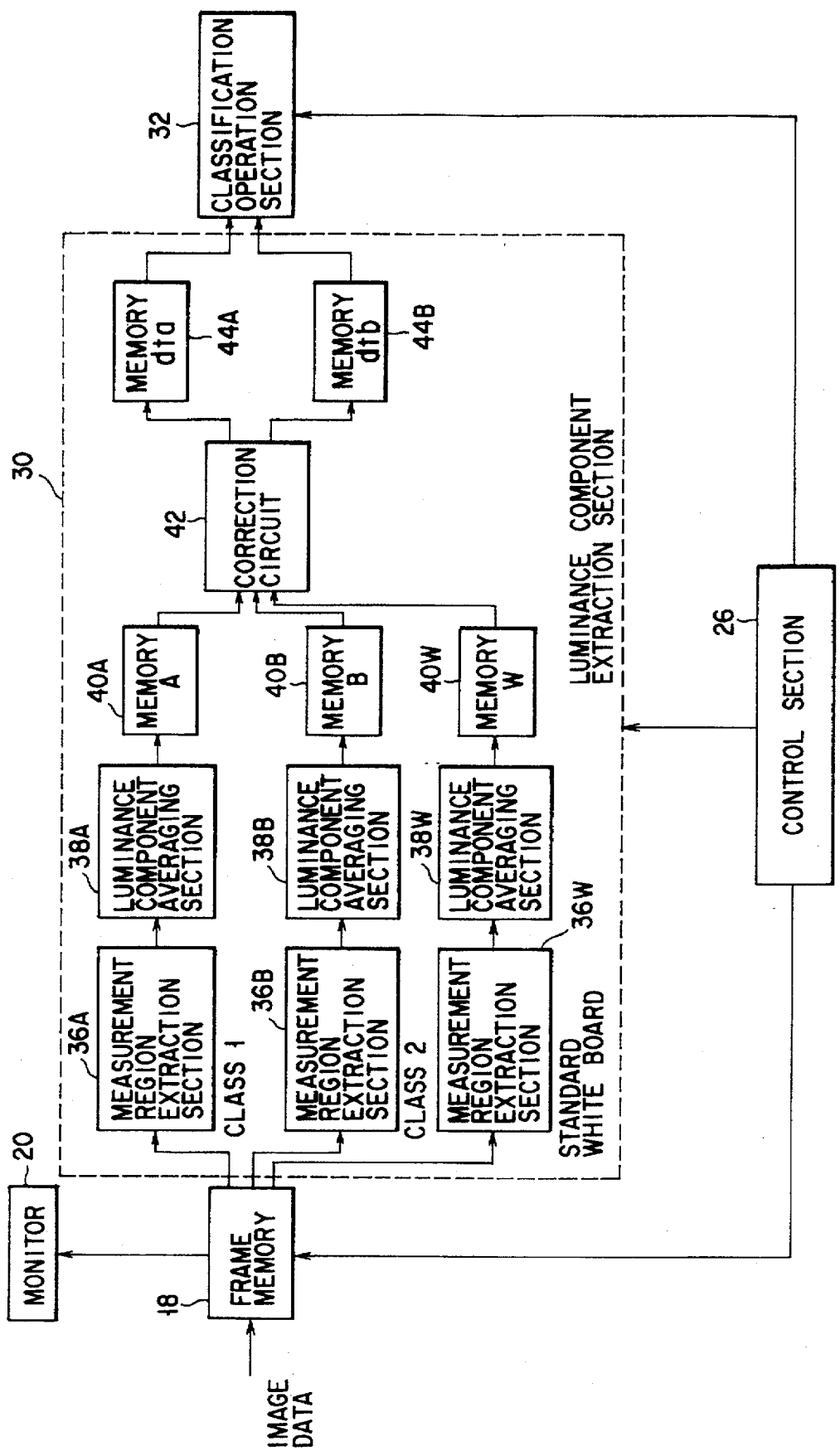
FIG. 17 is a view showing the arrangement of a luminance component extraction section in FIG. 16.

As shown in FIG. 17, the luminance component extraction section 30 comprises three measurement region extraction sections 36A, 36B, and 36W for extracting measurement regions of photographed images of the target object O and the reference plate R, three luminance component averaging sections 36A, 36B, and 36W for averaging measured luminance components, three luminance component averaging section 38A, 38B, and 38W for averaging measured luminance components, a luminance component memory "A" 40A for storing luminance components of photographed class 1 data or luminance components of unknown class data, a luminance component memory "B" 40B for storing luminance components of photographed class 2 data, a luminance component memory "W" 40W for storing luminance components of the photographed reference plate R data, a correction circuit 42 for correcting an influence of a light source, a luminance spectrum memory "dta" 44A for storing corrected class 1 data or corrected unknown class data, and a luminance spectrum memory "dtb" 44B for storing corrected class 2 data.

Each of the luminance component memories 40A, 40B, and 40W can store luminance components corresponding to the number (five, in this embodiment) of bandpass filters constituting the rotary color filter 12.

The correction circuit 42 comprises a divider $42_1$ as shown in FIG. 18A, or a divider $42_1$ and a power normalization circuit 422 as shown in FIG. 18B. In the following description, the arrangement shown in FIG. 18B is used.

Each of the luminance spectrum memories 44A and 44B can store luminance components (each luminance component is constituted by data corresponding to the number of filters) corresponding to a number N of data samples to be photographed.

On the other hand, as shown in FIG. 18C, the classification operation section 32 comprises a changeover switch "A" 46, a classification spectrum calculation section 48 for obtaining a classification spectrum, a classification spectrum d1 memory 50 for storing a classification spectrum d1, a classification spectrum d2 memory 52 for storing a classification spectrum d2, a changeover switch "B" 54, a multiplier 56, a cumulative operation section 58, constituted by an adder 58A and a latch 58B, for performing accumulation and addition.

As shown in FIG. 18C, the classification determination section 34 comprises a changeover switch "C" 60, a classification boundary decision section 62 for deciding a classification boundary, a classification boundary memory "c1" 64 for storing the decided classification boundary, and a classification decision section 66 for performing classification determination.

Processing for classifying a target object for two classes using the color classification apparatus having the above arrangement will be described below.

The learning mode will be described. This is for obtaining classification spectra for classifying the target object O for two classes, as shown in FIG. 19.

First of all, the control section 26 adjusts the direction and focal length of the optical system 10 so as to simultaneously pick up the target object for two classes. Focus control is performed by a focus control mechanism (not shown), and photometry is performed by a photometer (not shown) to set the exposure time of the optical system 10 and the stop of the CCD 14.

The position of the rotary color filter 12 is controlled so as to photograph the target object through the first bandpass filter (e.g., the bandpass filter 12A) of the rotary color filter 12. The control section 26 sends a photographic command to the CCD drive driver 22 to obtain a first image. Upon reception of the CCD 14, the image data A/D-converted by the A/D converter 16 is transferred to the frame memory 18 and stored therein. The classification operation circuit 28 reads the image data stored in the frame memory 18.

In the classification operation circuit 28, the image data is transferred to the luminance component extraction section 30.

In the luminance component extraction section 30, classification target regions corresponding to classes 1 and 2 are extracted from respective image data of the each image received in the measurement region extraction sections 36A and 36B. A luminance component is extracted for each pixel. Average luminance values of in the respective regions are detected by the luminance component averaging sections 38A and 38B, and written in the luminance component memories 40A and 40B. These values are set as data da1 and db1.

Then, the rotary color filter 12 is rotated to obtain a second image through the second filter (e.g., the bandpass filter 12B). Average values are written in the luminance component memories 40A and 40B in the same manner. These values are set as data da2 and db2.

This operation is performed up to the fifth filter (e.g., the bandpass filter 12E). Data da3, da4, and da5, and data db3, db4, and db5 are written in the luminance component memory "A" 40A and the luminance component memory "B" 40B, respectively. That is, data dai (for i=1 to 5), and data dbi (i=1 to 5) are written in the luminance component memory "A" 40A and "B" 40B with the above series of operations.

The reference plate R is arranged near the target object, and photographed through the five kinds of filters. Data dwi (i=1 to 5) are written in the luminance component memory "W" 40W.

Thereafter, the correction circuit 42 corrects the class 1 data read out from the luminance component memory "A" 40A and the luminance component memory "W" 40W, and the class 2 data read out from the luminance component memory "B" 40B and the luminance component memory "W" 40W. This correction is performed such that data in the luminance component memory "A" 40A is divided by the corresponding data in the luminance component memory "W" 40W for each filter component by the divider $42_1$ in accordance with the following equation.

$da^m i' = da^m i / dwi$ (for i=1 to 5, m=1 to N), $db^m i' = db^m i / dwi$ (for i=1 to 5, m=1 to N) (14)

This operation can eliminate the influence of different light sources (spectrum characteristics). Where $\underline{i}$ is a filter number, and $\underline{m}$ is a sample number.

The power normalization circuit $42_2$ performs the following operations using power values $Ca^m$ and $Cb^m$ so as to set the power values of the divided data constant.

$da^m i'' = da^m i' / Ca^m$ (for i=1 to 5, m=1 to N), $db^m i'' = db^m i' / Cb^m$ (for i=1 to 5, m=1 to N) (15)

The power values $Ca^m$ and $Cb^m$ are defined as follows:

$$Ca^m = \sum_{i=1}^{N} da^m i', \quad (16)$$

$$Cb^m = \sum_{i=1}^{N} db^m i'$$

or $$Ca^m = \sum_{i=1}^{N} (da^m i')^2, \quad (17)$$

$$Cb^m = \sum_{i=1}^{N} (db^m i')^2$$

This power normalization can eliminate an influence caused when the luminance values of light sources are different from each other.

Resultant values $da^m i'$ and $db^m i'$ obtained in this manner are written as luminance spectra in the luminance spectrum memories "dta" 44A and "dtb" 44B.

The above correction is performed by the number N of target object samples, and the resultant luminance spectra are written in the luminance spectrum memories "dta" 44A and "dtb" 44B. In this case, the target object samples may be different target objects or different regions on a single target object. In this manner, the luminance spectrum data, the number of which is the number N of target object samples, are written in the luminance spectrum memories "dta" 44A and "dtb" 44B.

When target objects for two classes cannot be simultaneously photographed, photography and correction of the target object and the reference plate are performed for each class in the same manner as described above, and the luminance spectra are written in the luminance spectrum memories "dta" 44A and "dtb" 44B. This operation is repeated by the number N of samples.

The classification operation section 32 switches the changeover switch "A" 46 to the $\underline{b}$ side. The luminance spectrum data about classes 1 and 2 are read out from the luminance spectrum memories "dta" 44A and "dtb" 44B. The classification spectrum calculation section 48 calculates classification spectra d1i (i=1 to 5) and d2i (i=1 to 5) perpendicular to the d1i using the above FS transform. The obtained classification spectra d1i and d2i are written in the classification spectrum d1 memory 50 and the d2 memory 52, respectively.

The changeover switch "A" 46 is switched to the $\underline{a}$ side, and the changeover switch "C" 60 in the classification determination section 34 is switched to the $\underline{b}$ side. The changeover switch "B" 54 is then switched to the $\underline{a}$ side to read out luminance spectrum data $da^m i'$ from the luminance spectrum memory "dta" 44A and the luminance spectrum data d1i from the classification spectrum d1 memory 50, and an inner product is calculated using these readout data by the multiplier 56 and the cumulative operation section 58 as follows:

$$ta^m 1 = \sum_{i=1}^{5} (da^m i'' \times d1i) \quad (18)$$

The operation result is transferred to the classification boundary decision section 62 in the classification determination section 34. Subsequently, the luminance spectrum data $db^m i'$ and the classification spectrum data d1i are read out from the luminance spectrum memory "dtb" 44B and the classification spectrum d1 memory 50, respectively, and an inner product is calculated using these readout data as follows:

$$tb^m1 = \sum_{i=1}^{5} (db^{mi} \times d1i) \quad (19)$$

The operation result is transferred to the classification boundary decision section 62.

The changeover switch "B" 54 is then switched to the b side to read out luminance spectrum data $da^{m}i'$ from the luminance spectrum memory "dta" 44A and the luminance spectrum data d2i from the classification spectrum d2 memory 52, and an inner product is calculated using these readout data:

$$ta^m2 = \sum_{i=1}^{5} (da^{mi} \times d2i) \quad (20)$$

The operation result is transferred to the classification boundary decision section 62. Subsequently, the luminance spectrum data $db^m i'$ and the classification spectrum data d2i are read out from the luminance spectrum memory "dtb" 44B and the classification spectrum d2 memory 52, respectively, and an inner product is calculated using these readout data as follows:

$$tb^m2 = \sum_{i=1}^{5} (db^{mi} \times d2i) \quad (21)$$

The operation result is transferred to the classification boundary decision section 62.

In this manner, processing is performed by the number of samples for each class. A classification boundary is decided at the classification boundary decision section 62 using the obtained inner products, as shown in FIG. 20, and written in the classification boundary memory "c1" 64.

The learning mode has been described above.

Next, a classification mode will be described.

In this classification mode, an unknown class target object O subjected to classification as shown in FIG. 21 is photographed in the same manner as in the learning mode, and luminance spectra dxi (for i=1 to 5) are written in the luminance component memory "A" 40A. Subsequently, the reference plate R is photographed under the same condition as in the preceding processing, and luminance spectra dwi (for i=1 to 5) are written in the luminance component memory "W" 40W. Data are read out from the luminance component memory "A" 40A and "W" 40W to be corrected by the correction circuit 42.

$dxi' = dxi/dwi$ (for i=1 to 5)

The power normalization circuit $42_2$ performs the following operation so as to normalize the power value of the divided data.

$dxi'' = dxi'/Cx$ (for $i = 1$ to 5)

$Cx = \sum_{i=1}^{5} dxi'$

A luminance spectrum dxi' is written in the luminance spectrum memory "dta" 44A.

The changeover switch "A" 46 is switched to the a side in the classification operation section 32, and the changeover switch "C" 60 is switched to the a side in the classification determination section 34. First, the changeover switch "B" 54 in the classification operation section 32 is switched to the a side. The luminance spectrum dxi' and the classification spectrum data d1i are respectively read out from the luminance spectrum memory "dta" 44A and the classification spectrum d1 memory 50, and an inner product is calculated using these readout data by the multiplier 56 and the cumulative operation section 58 as follow:

$$tx1 = \sum_{i=1}^{5} (dxi'' \times d1i) \quad (22)$$

The resultant product tx1 is transferred to the classification decision section 66 in the classification determination section 34.

Then, the changeover switch "B" 54 is switched to the b side, the luminance spectrum dxi' and the classification spectrum data d2i are respectively read out from the luminance spectrum memory "dta" 44A and the classification spectrum d2 memory 52, and an inner product is calculated using these readout data as follow:

$$tx2 = \sum_{i=1}^{5} (dxi'' \times d2i) \quad (23)$$

The resultant product tx2 is transferred to the classification decision section 66.

The classification decision section 66 reads the classification boundary from the classification boundary memory "c1" 64 to determined, using these data, the side of the classification boundary to which the transferred inner products tx1 and tx2 belong, and the classification results are output.

The above operations have been performed in the classification mode.

As described above, according to this embodiment, differences in spectrum characteristics of light sources are corrected by the divider $42_1$, and differences in luminance are corrected by the power normalization circuit $42_2$, thereby properly performing classification using different light sources. At this time, as shown in FIG. 18B, since the power normalization circuit $42_2$ is used, proper classification can also be performed even if the luminance of a light source changes. Note that, when the spectrum of a light source does not change but only the luminance thereof changes, the divider $42_1$ is not required and only the power normalization circuit $42_2$ may be used.

Since the arrangement of the apparatus is simple using the rotary color filter 12, the low-cost apparatus can withstand mechanical vibrations and the like.

In addition, since the operations are performed in the learning mode and the classification mode, the apparatus easily corresponds to different classification purposes.

As shown in FIG. 22A, sets of pairs of classification spectrum d1 and d2 memories 50 and 52 for storing learned classification spectra d1i and d2i and changeover switches "B" 54 each for selecting one of the classification spectrum d1 and d2 memories 50 and 52 are arranged in the classification operation section 32. If different learned classification spectra are stored in respective pairs of classification spectrum d1 and d2 memories 50 and 52, the apparatus can instantaneously cope with different classification purposes. The rotary color filter 12 can be exchanged, as a matter of course.

In this embodiment, the rotary color filter 12 has an arrangement in which circular filters 12A to 12E are arranged on a single circle, as shown in FIG. 15B, and the position of the rotary color filter 12 is controlled for each filter so as to stop the rotary color filter 12 at each circular filter. As shown in FIG. 15C, however, if the rotary color filter 12 obtained by arranging arcuated filters 12A to 12E on a single circle is used, the position of the rotary color filter 12 need not be controlled for each filter by stopping the rotary color filter 12 at each arcuated filter, and the rotary color filter 12 can be constantly rotated, thereby performing high-speed classification. In this case, the exposure timing of the CCD 14 must be synchronized with the rotational speed of the rotary color filter 12, as a matter of course.

Figure 23:
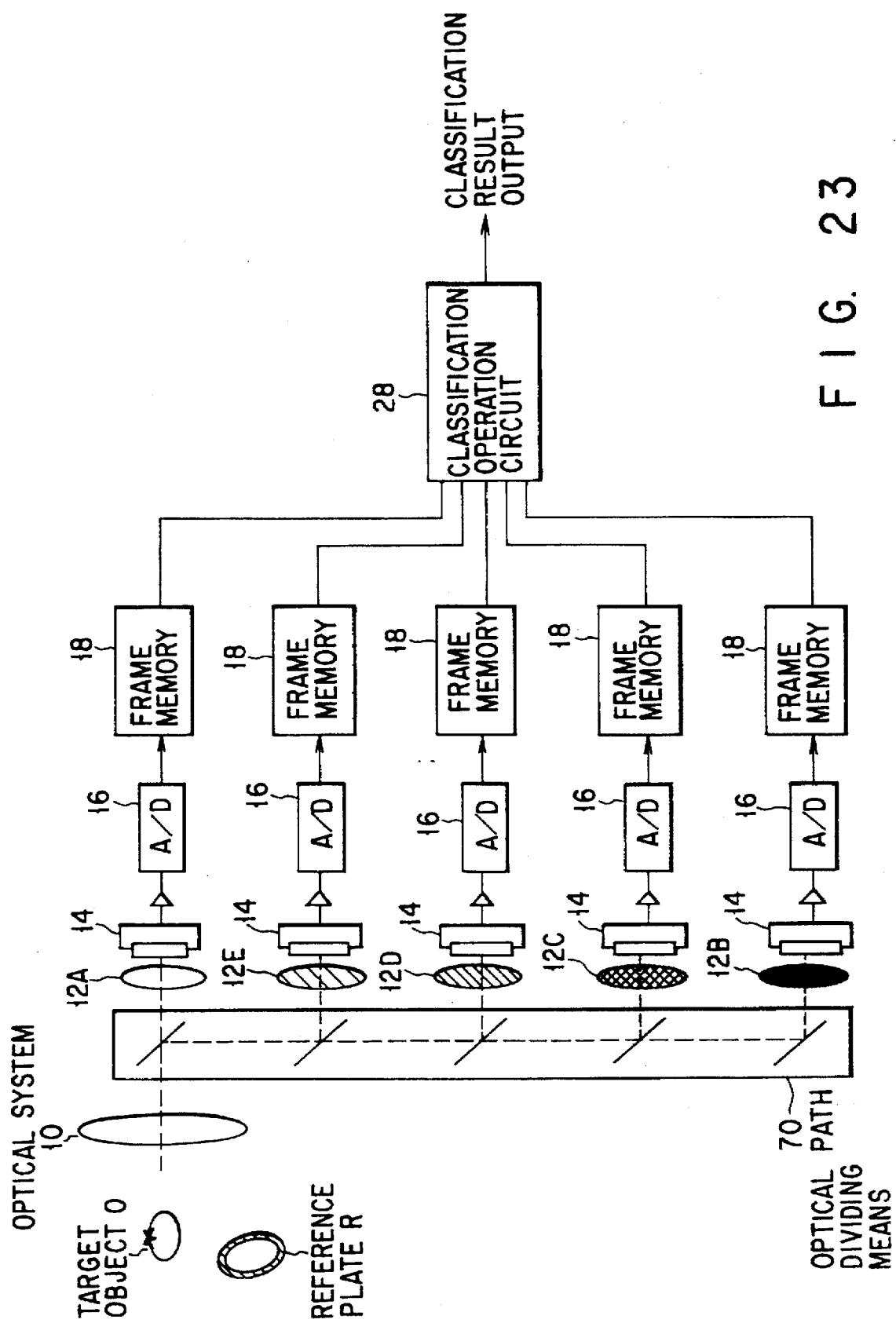
FIG. 23 is a view showing a modification of the color classification apparatus of the fourth embodiment.

In this embodiment, only one CCD 14 is used as an image pickup element. As shown in FIG. 23, the apparatus can use a plurality of image pickup elements 14 and an optical path dividing means 70, as a matter of course.

The classification results may be displayed as images having different colors corresponding to the determined classes or may be informed as audio information to a photographer.

A color classification apparatus for classifying multiclass (n-class) target objects as the fifth embodiment of the present invention will be described below. The color classification apparatus of this embodiment has the same arrangement as that of the fourth embodiment, except for the internal arrangement of a luminance component extraction section 30.

More specifically, as shown in FIG. 24, the luminance component extraction section 30 comprises target object measurement region extraction sections $36_1$ to $36_n$, and 36W for extracting measurement regions of images of a photographed target object O, luminance component averaging sections $38_1$ to $38_n$, and 38W for averaging measured luminance components, a luminance component memory "1" $40_1$ for storing luminance components of photographed class 1 data or unknown class data, a luminance component memory "2" $40_2$ for storing luminance components of photographed class 2 data, ..., a class component memory "n" $40_n$ for storing luminance components of photographed class $\underline{n}$ data, and a luminance component memory "W" 40W for storing luminance components of photographed reference plate R data. Each of the luminance component memories "1" $40_1$ to "n" $40_n$ and the luminance component memory "W" 40W has a capacity in which luminance components corresponding to the number (five) of filters constituting a rotary color filter 12 can be written.

The luminance component extraction section 30 further comprises a correction circuit 42 for correcting the influence of light sources, a luminance spectrum memory "dt1" $44_1$ for storing corrected class 1 data, a luminance spectrum memory "dt2" $44_2$ for storing corrected class 2 data is written, ..., and a luminance spectrum memory "dtn" $44_n$ for storing corrected class $\underline{n}$ data. Each of the luminance spectrum memories "dt1" $40_1$ to "dtn" $40_n$ has a capacity in which luminance components (each luminance component is constituted by data corresponding to the number of filters) corresponding to a number N of data samples to be photographed can be written.

In the color classification apparatus having the above arrangement, a learning mode for obtaining a classification boundary is executed first and then a classification mode for performing color classification to unknown class data is executed in the same manner as in the fourth embodiment.

The learning mode will be described first.

A target object for two arbitrary classes among multiclass target objects is photographed in the same manner as in the fourth embodiment, and an obtained image is corrected to store resultant luminance spectra $da^m i'$ and $db^m i'$ in the luminance spectrum memories "dt1" $44_1$ and "dt2" $44_2$. Using the FS transform in the same manner as in the first embodiment, classification spectra d1i (for i=1 to 5) and d2i (i=1 to 5) are obtained to write them in classification spectrum d1 and d2 memories 50 and 52 shown in FIG. 18C. Subsequently, a target object for remaining n–2 classes is photographed in the same manner as in the fourth embodiment, and an obtained image is corrected to store resultant luminance spectra $ds^m i'$ (for s=3 to n, i=1 to 5) in luminance spectrum memories "dts" $44_s$. Let $\underline{s}$ be the class number, $\underline{m}$ be the sample number, and $\underline{i}$ be the filter number. In this manner, classification boundaries for the target object for class 1 to class $\underline{n}$ are obtained using the luminance spectra $ds^m i'$ written in the respective luminance spectrum memories "dts" $44_s$ and the classification spectra d1i and d2i. In order to obtain the classification boundaries, an inner product ts1 (for s=1 to $\underline{n}$) between the luminance spectrum $ds^m i'$ of the target object for each class and the classification spectrum d1i and an inner product ts2 (s=1 to $\underline{n}$) between the luminance spectrum $ds^m i'$ of the target object for each class and the d2i are calculated to transfer the obtained inner products to a classification boundary decision section 62. The classification boundaries are decided in the classification boundary decision section 62 using the transferred inner products as shown in FIG. 22B, and the decided classification boundaries are written in a classification boundary memory "c1" 64.

The learning mode has been described above.

Next, a classification mode will be described.

More specifically, a target object O to be classified is photographed, and the resultant images are corrected to store resultant luminance spectra dxi in the luminance spectrum memory "dt1" $44_1$ in the same manner as in the first embodiment. Subsequently, classification determination is performed in a classification operation section 32 and a classification determination section 34 in the same manner as in the first embodiment.

The above operations have been performed in the classification mode.

Proper classification can be performed using different light sources in the case of multiclass objects.

In the fifth embodiment, classification spectra are obtained from two arbitrary classes among multiclasses using the FS transform. However, classification spectra can be obtained using information of all the classes. (This will be described in detail as the sixth embodiment.)

Classification can be performed group by group each consisting of several steps. For example, when classification for 10 classes is to be performed, 10 classes are classified into two classes, each consisting of five classes, using classification spectra first, and then classification spectra for performing detailed classification are selected in accordance with the classification results. The classes are further classified. In this manner, classification is performed in a multistep manner to improve classification precision.

A color classification apparatus for classifying a target object for multiclass (n-class) as the sixth embodiment of the present invention will be described. The color classification apparatus of this embodiment has the same arrangement as that of the fifth embodiment, except for the arrangement of a classification operation section 32.

Figure 25:
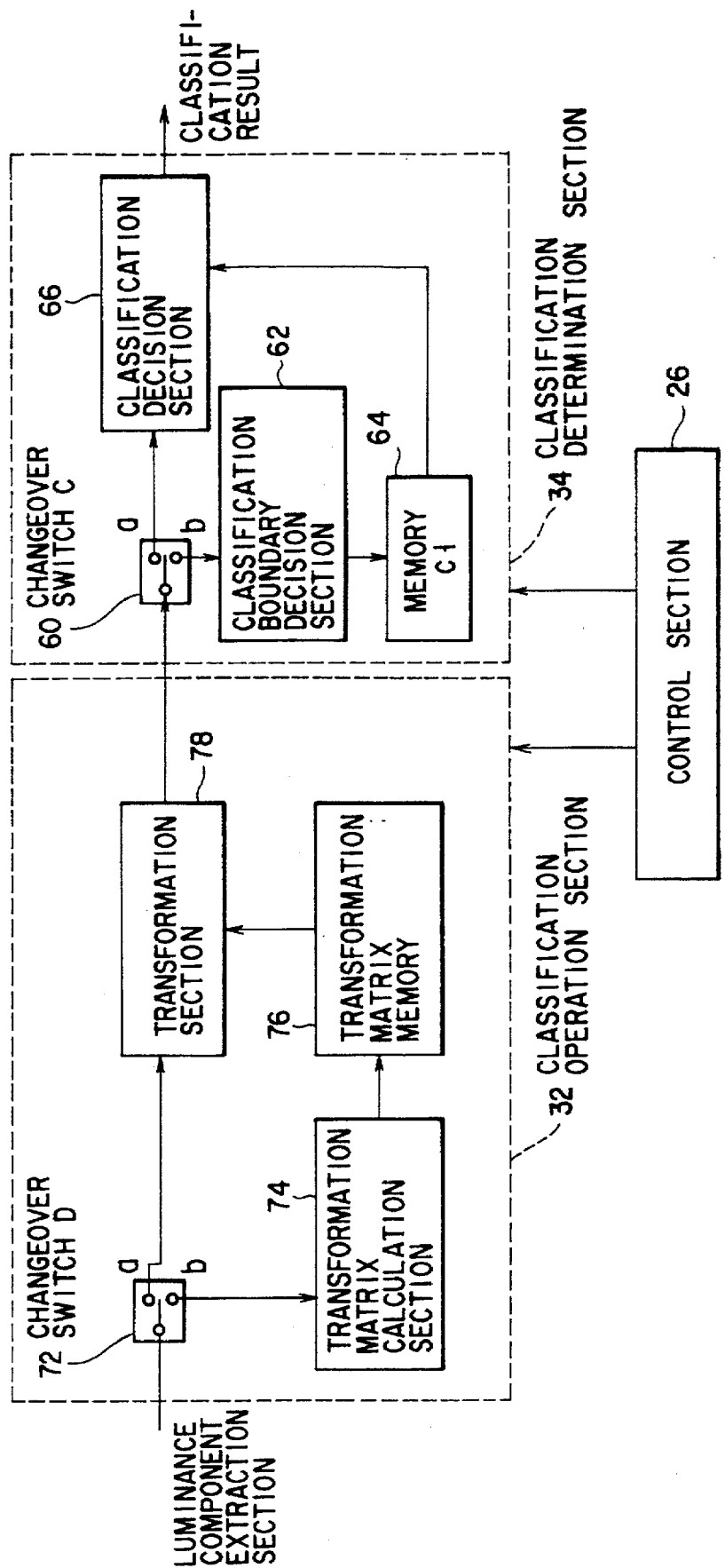
FIG. 25 is a view showing the arrangement of a luminance component extraction section and a classification determination section in a color classification apparatus of the sixth embodiment of the present invention.

More specifically, as shown in FIG. 25, the classification operation section 32 comprises a transformation matrix calculation section 74 for obtaining a transformation matrix for projecting data into a classification space, a transformation matrix memory 76 for storing the transformation matrix obtained in the transformation matrix calculation section 74, and a transformation section 78 for projecting data into the classification space using the transformation matrix.

A classification technique (HTC) used in the sixth embodiment will be described below. The HTC (Hotelling trace criterion) is a technique for separating multiclass target objects from each other. More specifically, the HTC is to obtain a transformation matrix A to maximize the HTC as follows, provided that S1 obtained by transforming the spectrum of light reflected by a target object is defined as an interclass covariance matrix and S2 obtained by transforming the spectrum of the light reflected by the target object is defined as an intra-class covariance matrix:

$$J=tr(S2^{-1}S1) \tag{24}$$

(where tr(X) is the trace (sum of diagonal components) of the matrix X).

This matrix A is obtained as follows. Let dim be the mth data (vector) of the ith class, $\underline{di}$ be the average data (vector) of the ith class, and $\underline{d}$ be the average data (vector) of all the classes. Also let I be the unit matrix, Wi be the residual matrix (Vi=(di1−$\underline{di}$ di2−$\underline{di}$ ... dim−$\underline{di}$)) constituted by the data of the ith class, Wt be the residual matrix (Wt=($\underline{d1}$−$\underline{d}$ $\underline{d2}$−$\underline{d}$ ... $\underline{dn}$−$\underline{d}$)) constituted by all the data, E be the eigenvector matrix of (Wt$^t$Wt), Λ be the eigenvalue matrix of (Wt$^t$Wt), U be the matrix for whitening S1, V be the eigenvector matrix of S2, and Γ be the eigenvalue matrix of S2.

First of all, the following eigenvalue problem will be solved, provided that S2=WtWt$^t$.

$$S2V=V\Gamma,\ V^tV=I \tag{25}$$

$$V^tS2V=\Gamma \tag{26}$$

for $$(Wt^tWt)E=E\Lambda \tag{27}$$

When Wt is multiplied to the left- and right-hand sides of the above equation in an order named, the following equation is derived:

$$(WtWt^t)WtE=(WtE)\Lambda \tag{28}$$

Equation (28) is compared with equation (14) to obtain the following relations:

$$V=W+E,\ \Gamma=\Lambda$$

S2 is then whitened as follows:

$$U^tS2U=1 \tag{29}$$

for $$U=WtE\Lambda^{-1} \tag{30}$$

The following relation is similarly obtained also for S1:

$$U^tS1U=D \tag{31}$$

The eigenvalue problem of D is then solved:

$$D\Psi=\Psi\theta\Psi^t\Psi=I \tag{32}$$

$$\Psi^tD\Psi=\theta \tag{33}$$

$$(\Psi^tU^t)S1(\Psi U)=\theta \tag{34}$$

These relations correspond to S1 of Z transformed as follows:

$$Z=(\Psi^tU^t)X \tag{35}$$

By this transform, S2 can be whitened $$(U^t\Psi^t)S2(U\Psi)=\Psi^tI\Psi=\Psi^t\Psi=I \tag{36}$$

$$A=\Psi^tU^t=\Psi^t\Lambda^{-1}E^tWt^t \tag{37}$$

The transformation matrix A represented by equation (37) is multiplied with the spectrum of the light reflected by the target object of each class to perform multiclass classification.

Color classification using the color classification apparatus of the sixth embodiment will be described below. The learning mode and then the classification mode are set as in the fourth and fifth embodiments.

The learning mode will be described first.

More specifically, a target object for multiclass is photographed in the same manner as in the fourth embodiment, and the resultant images are corrected to store resultant luminance spectra ds$^m$i' in luminance spectrum memories "dts" $44_s$. Let $\underline{s}$ be the class number, $\underline{m}$ be the sample number, and $\underline{i}$ be the filter number.

Then, a changeover switch "D" 72 in the classification operation section 32 is switched to the $\underline{b}$ side, luminance spectra ds$^m$i' are read out from the luminance spectrum memories "dts" $44_s$. A transformation matrix is calculated in the transformation matrix calculation section 74 using the HTC described above, and the calculated transformation matrix is written in the transformation matrix memory 76. This transformation matrix is set as a transformation matrix A.

The changeover switch "D" 72 is switched to the a side, and a changeover switch "C" 60 is switched to the $\underline{b}$ side. The luminance spectra ds$^m$i' are read out from the luminance spectrum memories "dts" $44_s$, and the transformation matrix A is read out from the transformation matrix memory 76. The respective luminance spectra ds$^m$i' are multiplied with the transformation matrix A in the transformation section 78. That is, $$[t1^m t2^m t3^m t4^m t5^m]^T=A.ds^mi'' \tag{38}$$

In this multiplication, the dimensionality of the luminance spectra does not change. This dimensionality is kept five, and 5-dimensional data:

t1m, t2m, t3m, t4m, t5m are transferred to a classification boundary decision section 62 as evaluation values for classification. Note that T represents transposition in equation (38). Classification boundaries are decided in the classification boundary decision section 62 as shown in FIG. 22B and the resultant classification boundaries are written in a classification boundary memory "c1" 64.

The learning mode has been described above.

Next, the classification mode will be described.

A target object O to be classified is photographed, and the resultant images are corrected to store resultant luminance spectra dxi in a luminance spectrum memory "dt1" $44_1$ in the same manner as in the first embodiment. Subsequently, the changeover switch "D" 72 in the classification operation section 32 is switched to the $\underline{a}$ side, and the changeover switch "C" 60 in a classification determination section 34 is switched to the $\underline{a}$ side. The luminance spectra dxi' are read out from the luminance spectrum memory "dt1" $44_1$, and the transformation matrix A is read out from the transformation matrix memory 76 to multiple the luminance spectra dxi' with the transformation matrix A in the transformation section 78. The obtained results (values) are transferred to a classification decision section 66. That is, the following values t1m, t2m, t3m, t4m, t5m satisfying $$[t1^m t2^m t3^m t4^m t5^m]^T = A \cdot dxi'' \tag{39}$$

are transferred to the classification decision section 66. The classification boundaries are read out from the classification boundary memory "c1" 64 to classify the position of each value transferred to the classification decision section 66 in any of regions divided by the classification boundaries shown in FIG. 22B.

The above operations have been performed in the classification mode.

As described above, the transformation matrix for optimal classification can be obtained using the HTC in the case of the multiclass objects.

In the sixth embodiment, classification is performed using 5-dimensional data. However, the dimensionality may be reduced to a proper one (e.g., two-dimensional data) to obtain classification boundaries.

According to the fourth to sixth embodiments, the pass bands of the bandpass filters are arbitrarily determined. That is, a commercially available arbitrary filter can be used to manufacture a low-cost rotary color filter 12.

A color classification apparatus for obtaining an optimal band of a rotary color filter 12 in accordance with target objects, unlike in the fourth to sixth embodiments, will be described below as the seventh embodiment.

The arrangement of the color classification apparatus of the seventh embodiment is the same as that of the fourth embodiment. A processing method of calculating an optimal classification filter will be described in the seventh embodiment.

Figure 26A:
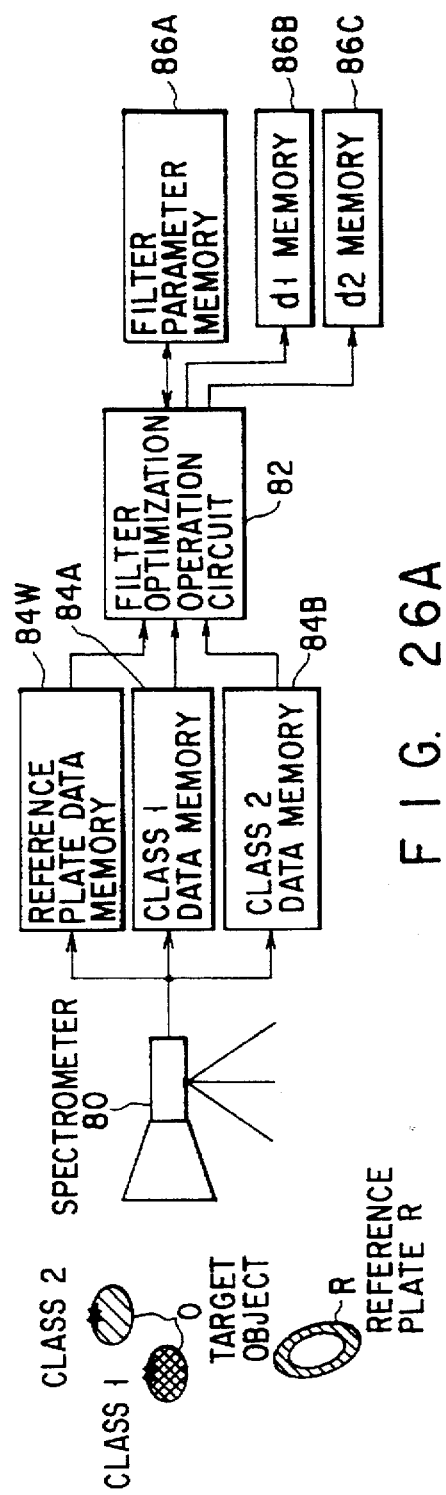
FIG. 26A is a view showing the arrangement of an apparatus for obtaining an optimization filter according to the seventh embodiment of the present invention.

FIG. 26A is a view showing the arrangement of an apparatus for obtaining an optimization filter. The apparatus comprises a spectrometer 80 for measuring the spectrum of light reflected by a target object, an filter optimization operation circuit 82 for finding an optimal filter, a reference plate data memory 84W, a class 1 data memory 84A, a class 2 data memory 84B, a filter parameter memory 86A, a classification spectrum d1 memory 86B, and a classification spectrum d2 memory 86C. In the seventh embodiment, the spectra of a target object O are photographed at a small interval (e.g., 5 nm), and a plurality (5 to 10) of optimal bandpass filters are decided based on the resultant data.

As shown in FIG. 26A, the spectra of light components reflected by the target objects O for the two known classes and the spectrum of light reflected by the reference plate R are photographed by the spectrometer 80 and written as data $ds^m(\lambda)$ in the data memories 84A and 84B. In this case, $s$ is the class number ($s=0$ for the reference plate, $s=1$ for class 1, $s=2$ for class 2), and $m$ is the sample number.

All the subsequent processing is performed in the filter optimization operation circuit 82 and will be described with reference to a flow chart in FIG. 27.

Figure 26B:
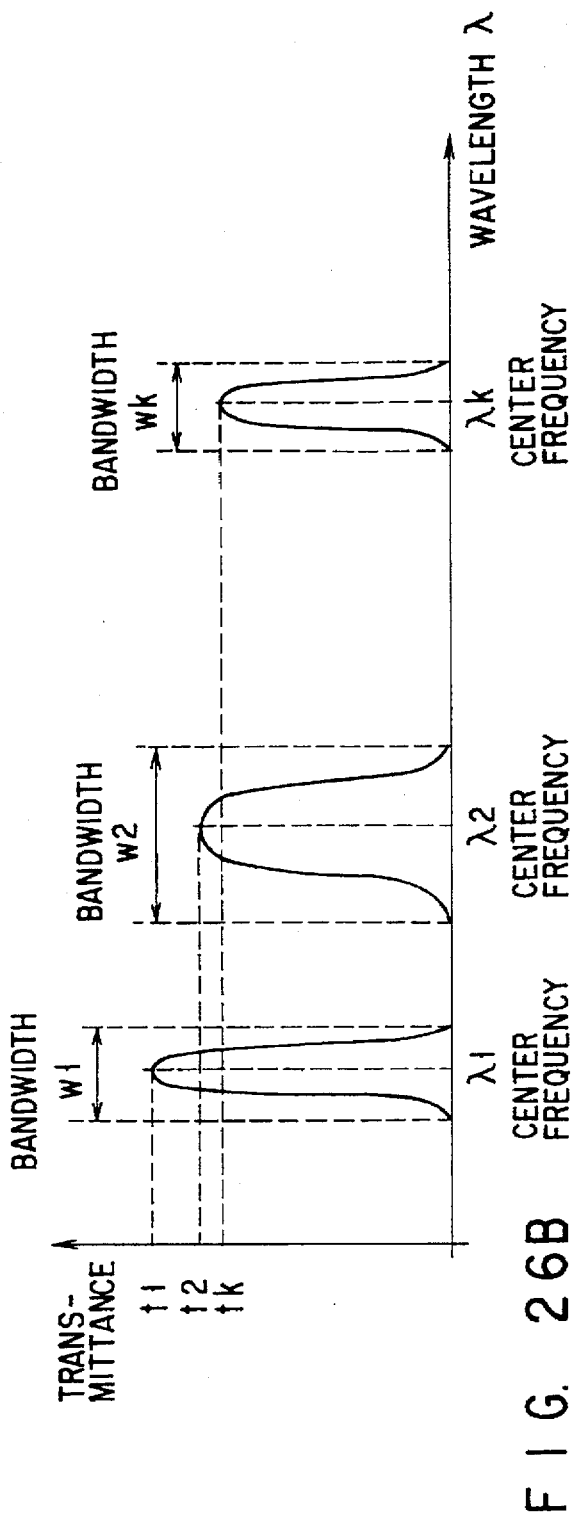
FIG. 26B is a view associated with parameters of filters constituting a rotary color filter.

The initial values of parameters of bandpass filters constituting a rotary color filter 12 are set (step S1). As shown in FIG. 26B, these parameters are the number (count $k$) of filters, the center frequency ($\lambda i$) of each filter, the bandwidth (wi) of each filter, and the transmittance (ti) of each filter. In this case, a total number of parameters is 3×Number of Filters. In this case, $i$ is the filter number (i=1 to k).

First of all, a spectrum $d1^1(\lambda)$ of light reflected by one target object O of class 1 is converted into data having passed through the bandpass filter. More specifically, the following operation is performed for the first filter:

$$df1^1(1) = \int_{\lambda - WV2}^{\lambda + WV2} d1^1(\lambda) d\lambda / W1 \tag{40}$$

The above operation is sequentially performed for the second, third, ..., kth filters, and the conversion operation and integration are also performed for the spectra of the remaining samples to obtain data $df1^m$. This series of operations are also performed for the spectra of light components reflected by the target objects O of class 2 and the spectrum of light reflected by the reference plate R to obtain $df2^m(i)$ and $dfs(i)$. The above operations are called spectral conversion (step S2) in the seventh embodiment.

The resultant data $df1^m(i)$ and $df2^m(i)$ (where i=1 to k, m=1 to N) are corrected using the data $dfs(i)$ of the reference plate R (step S3), and FS transform is performed to obtain classification spectra (step S4).

A Fisher ratio is calculated from the resultant classification spectra to obtain a classification evaluation value C. The classification evaluation value C is determined in consideration of an S/N ratio snr and the luminance of the target objects O in addition to the Fisher ratio and is given as follows:

$$C = Ca \times \text{Fisher ratio} + Cb \times snr + Cc \times \sum_{i=1}^{k} df1(i) \tag{41}$$

where Ca, Cb, and Cc are the appropriate weighting coefficients. The classification evaluation value C and the corresponding filter parameters are written in the filter parameter memory 86A (step S5).

One of the filter parameters is updated (step S6), and spectral conversion described above is performed again using the spectra of light components reflected by the target objects O (step S7). The resultant data are corrected with the data of the reference plate R (step S8). FS transform is performed using the new data to obtain classification spectra d1 and d2 (step S9), and a classification evaluation value Cnew is obtained (step S10).

At this time, the classification evaluation value C written in the filter parameter memory 86A is loaded, and the magnitude of the classification evaluation value C is compared with that of the classification evaluation value Cnew (step S11). As a result, if Cnew is larger than C, the classification evaluation value Cnew in the filter parameter memory 86A is updated to C, and at the same time, the corresponding filter parameters are updated. The values of the classification spectra d1 and d2 are written in the classification spectrum d1 memory 86B and the classification spectrum d2 memory 86C, respectively (step S12). However, if Cnew is smaller than C, the filter parameters are restored to the state before updating (step S13).

It is determined whether all the filter parameters are updated (step S14). If so, processing is ended; otherwise, the flow returns to step S6 to update a parameter again.

Note that processing may be interrupted if the classification evaluation value exceeds a predetermined value.

As described above, the parameters of the bandpass filters of the rotary color filter 12 and the classification spectra d1 and d2 are obtained. A bandpass filter having this characteristic is manufactured, and a classification boundary is obtained in the learning mode as in the fourth embodiment or the like, thereby performing classification processing. However, unlike in the fourth embodiment, the classification spectrum calculation section 48 can be omitted.

In the flow chart, the flow simply advances to step S12 only when Cnew is larger than C in step S11. However, a Simulated Annealing method of causing the flow to advance to step S12 with a given probability even if Cnew is smaller than C may be employed to obtain a global optimal value.

The same processing as described above can also be performed in multiclass (n-class) classification. In this case, two arbitrary classes are selected, and the above FS transform is utilized. In this case, the classification evaluation value C is a value obtained in consideration of a Fisher ratio for checking a degree of classification separation of the two classes, an HTC value representing a degree of separation in multiclass classification, an S/N ratio snr of the sensor, and luminance df of the target object and can be exemplified as follows:

$$C = Ca \times \text{Firsher ratio} + Cb \times HTC + Cc \times snr + Cd \times \sum_{i=1}^{k} df1(i) \quad (42)$$

where Ca, Cb, Cc, and Cd are the appropriate weighting coefficients.

The FS transform upon selecting the two arbitrary classes need not be performed. As described with reference to the sixth embodiment, a transformation matrix may be obtained, and then the above classification evaluation value may be utilized.

Figure 28:
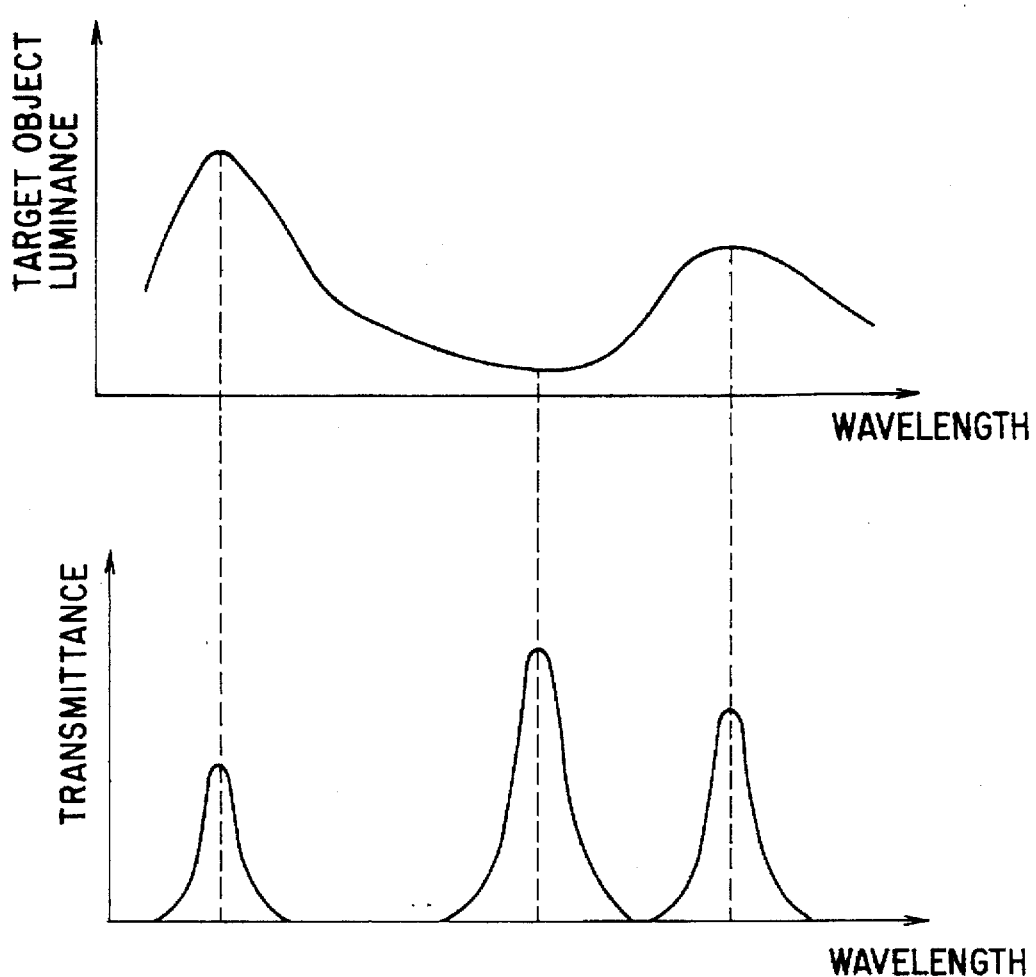
FIG. 28 is a view for explaining a method of determining the transmittance of each filter according to the eighth embodiment of the present invention.

The eighth embodiment of the present invention will be described below. In the seventh embodiment, the transmittance (ti) of each filter is optimized as one of the parameters. However, in consideration of a dynamic range during photography, the transmittance is preferably decided in consideration of the luminance of the target object. For example, a wider dynamic range can be obtained for a lower transmittance in a higher luminance range of a target object and for a higher transmittance in a lower luminance range of the target object, thereby increasing an S/N ratio during photography. For this reason, the transmittance is set as the following value:

$$ti = C/(Liave*Wi) \quad (43)$$

where C is the constant, Wi is the bandwidth of the filter, and Liave is the average luminance of the target objects in this band. This will be illustrated as shown in FIG. 28.

As another means for increasing a dynamic range, the exposure time may be changed. In this case, every time an image is obtained through each filter, the shutter speed of the CCD is changed or the stop of an optical system 10 is changed.

Figure 29:
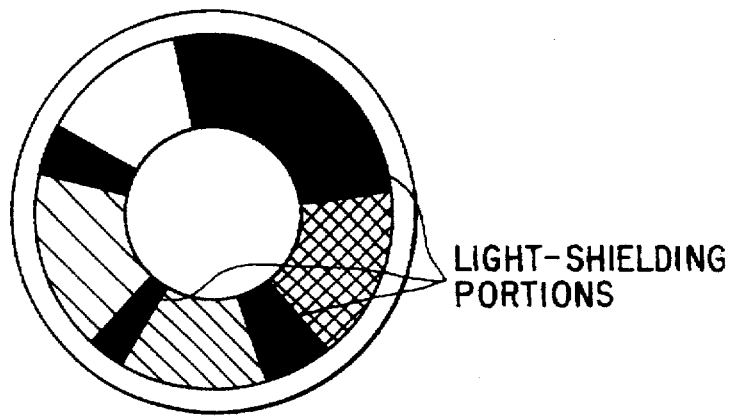
FIG. 29 is a view showing the arrangement of a rotary color filter used in the fifth embodiment.

When a rotary color filter 12 as shown in FIG. 15C is used, the size of a light-shielding portion (i.e., each filter) can be changed in accordance with an exposure amount, as shown in FIG. 29.

The ninth embodiment of the present invention will be described below. The eighth embodiment described above corresponds to the case in which light sources are changed. When a light source is specified, optimization can be more easily performed. A color classification apparatus for classifying a target object for two classes when a light source is specified as the ninth embodiment will be described.

Figure 30A:
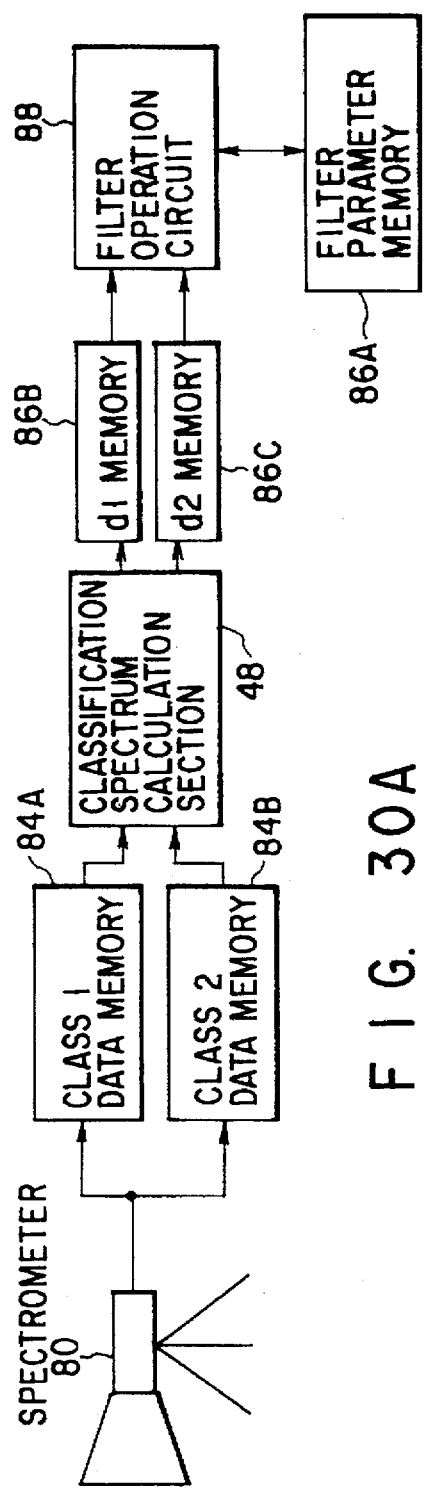
FIG. 30A is a view showing the arrangement of an apparatus for obtaining an optimization filter according to the ninth embodiment of the present invention.

That is, when a light source is specified, correction using a reference plate R can be omitted, the FS transform is performed on the dimensionality of an image photographed by a spectrometer to calculate an ideal spectrum, thereby calculating a practical filter having a lower dimensionality than that of this filter. FIG. 30A is a view showing an overall arrangement in which a filter is calculated.

A classification spectrum calculation section 48 has the same arrangement as in the fourth embodiment, and calculates classification spectra d1 and d2 using the FS transform. The dimensionality corresponds to the dimensionality of spectra to be photographed by a spectrometer 80. A plurality of bandpass filters for approximating the classification spectra d1 and d2 are calculated by a filter operation circuit 88. This calculation uses sequential processing as described in the fourth embodiment. For example, the classification spectra d1 and d2 to be realized are approximated as linear coupling of proper bandpass filters. Using a bandpass filter Ui(λ) (for i=1 to m) and Vj(λ), spectra d1' and d2' for approximating the classification spectra d1 and d2 are represented, as follows:

$$d1'=U1(\lambda)+U2(\lambda)+U3(\lambda)+ \ldots +Um(\lambda),$$

$$d2'=V1(\lambda)+V2(\lambda)+V3(\lambda)+ \ldots +Vn(\lambda) \quad (44)$$

Ui(λ) and Vj(λ) are sequentially calculated with which following evaluation values C1 and C2 become minimum:

$$C1=|d1-d1'|^2,$$

$$C2=|d2-d2'|^2 \quad (45)$$

Note that, as shown in the seventh embodiment, the evaluation values may be obtained further in consideration of a Fisher Ratio and an S/N (ratio).

Figure 30B:
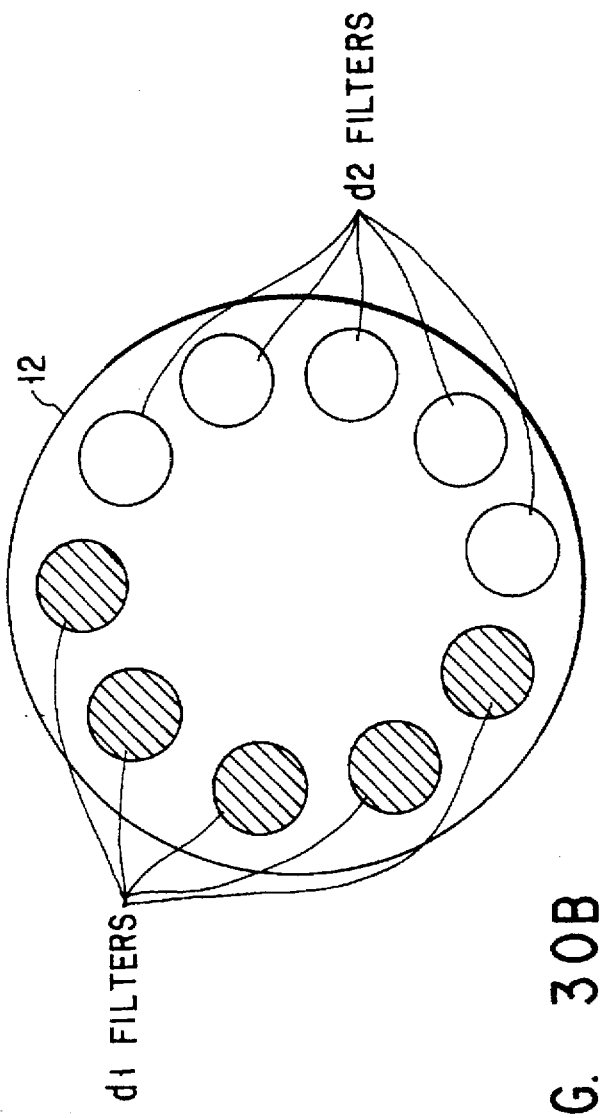
FIG. 30B is a view showing the arrangement of a rotary color filter used in the ninth embodiment.

In this manner, a plurality of bandpass filters for approximating the classification spectra d1 and d2 are calculated to constitute a rotary color filter 12 as shown in FIG. 30B.

Figure 31:
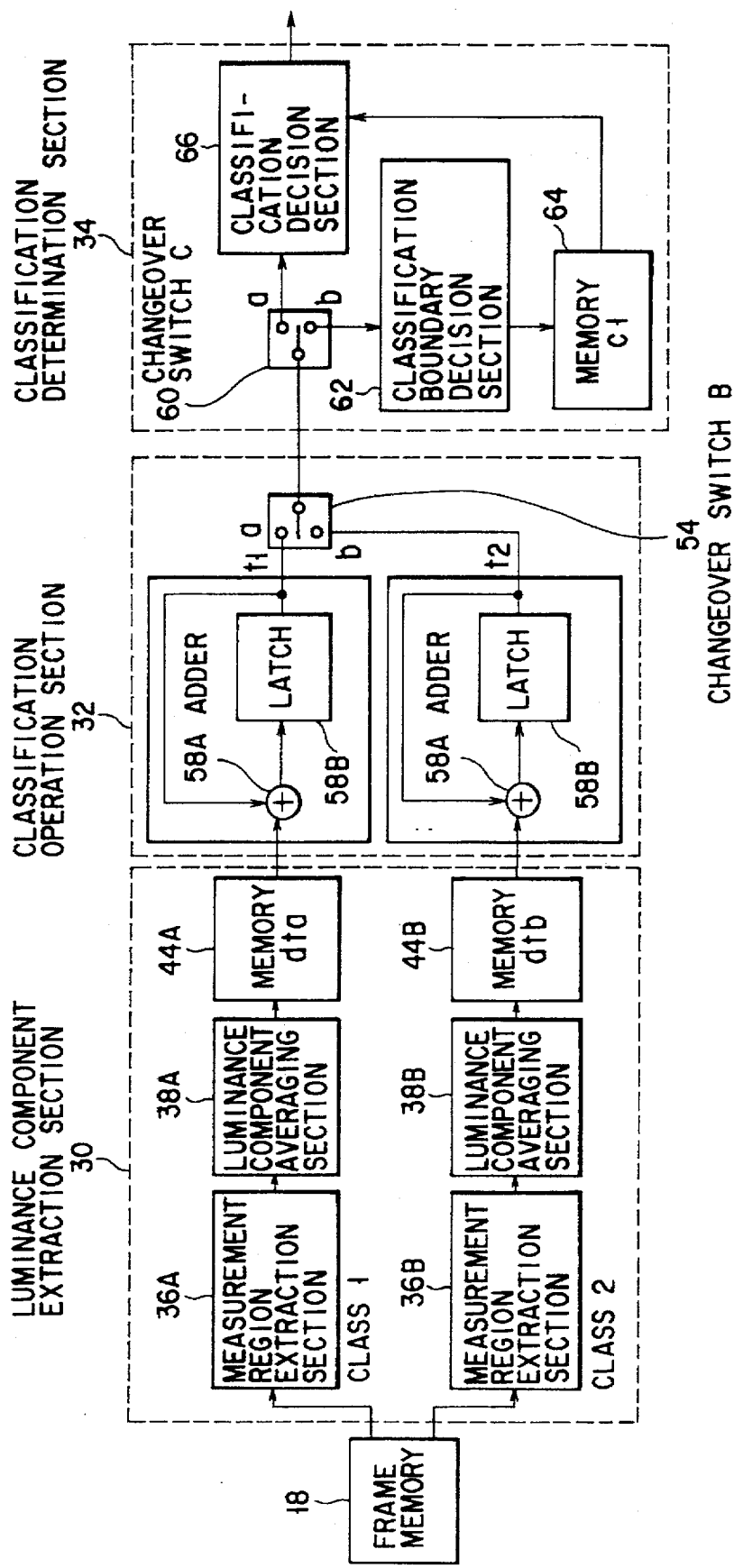
FIG. 31 is a view showing the arrangement of a luminance component extraction section, a classification operation section, and a classification determination section in a color classification apparatus of the ninth embodiment.

A classification operation circuit 28 is constituted as shown in FIG. 31. Memories 40A and 40B and a correction circuit 42 are omitted from a luminance component extraction section 30 because correction of a light source is not required. Luminance spectra are stored in luminance spectrum memories "dta" 44A and "dtb" 44B. A classification operation section 32 is a simple cumulative addition circuit. Cumulative addition values t1 and t2 are sent to a classification determination section 34. The classification determination section 34 has the same arrangement as in the first embodiment.

When a light source is specified as in the ninth embodiment, a circuit arrangement is greatly simplified in comparison with the case wherein a light source is corrected.

When light sources are limited to several kinds thereof, a light source detection device 92 for detecting a light source 90, and a filter exchange section 94 in which the rotary color filter 12 is exchanged for a dedicated one in accordance with the kind of light source may be provided.

The 10th embodiment capable of properly performing complicated classification determination using a neural network in a classification determination section 34 in FIG. 26A will be described below. This classification determination section 34 outputs the class number of a target object from inner product values t1 and t2. As shown in FIG. 33A, the classification determination section 34 comprises a 2-input, 1-output neutral network 96 and a learning unit 98 used for learning by the neural network 96.

In this neural network 96, the inner product values t1 and t2 are input to input-layer units 100A and 100B. The input-layer units 100A and 100B distribute the input signals into intermediate units 102A to 102N. Each of the intermediate units 102A to 102N and an output-layer unit 104 has a plurality of input terminals and one output terminal.

Each unit executes the following processing $$y=f(\Sigma w_i x_i+\theta) \quad (46)$$

where $x_i$ is the input to a terminal $i$, $w_i$ is the weighting coefficient of the terminal $i$, θ is the bias value, and $f$ is a sigmoid function represented as follows:

$$f(x)=1/(1+e^{-x}) \qquad (47)$$

In this neural network 96, the weighting coefficients and bias values which are required to decide the respective classes are supplied from a weighting memory 106 to the intermediate-layer units 102A to 102N and the output-layer unit 104.

In the learning mode, learning is performed to output a class number from the neural network 96 by the learning unit 98 in accordance with a general delta rule learning method devised by Lamelheart et al. ("PDP Model Cognition Science and Search for Neural Network", Chapter 8, D. E. Lamelheart, J. L. Macreland, PDP Search Group, Edited and Translated by Shunichi Amari, Sangyo Tosho, 1989).

By using this neural network, classification determination can be facilitated even for a complicated classification boundary or multiclass classification. Human empirical classification can also be easily realized using a neural network.

A preprocessing circuit may be arranged to eliminate data not suitable for learning in a network.

As shown in FIG. 33B, a 2-input, 1-output classification table 108 may be formed using the neural network 96 obtained by learning, and this classification table 108 may be used in actual classification because the neural network takes much time in execution of learning. In this case, a table forming circuit 110 for forming the classification table 108 is utilized.

Relearning is required for a different classification purpose. In this case, only the values in the weighting memory 106 are changed. Alternatively, learning may be performed for each classification purpose to store weighting coefficients in different weighting memories, and a proper weighting memory may be selected for a specific classification purpose, or a proper classification table may be selected.

The above embodiment exemplifies the color classification apparatus for performing classification mainly using the rotary color filter 12. In this case, however, when a target object O moves, an image picked up by each filter shifts. In the fourth embodiment, an average within a given range is obtained by the luminance component extraction section 30. When the shift has a smaller magnitude with respect to the magnitude of the average value, no problem is posed in practice. However, when a high-speed target object is to be picked up or a target object is too small to sufficiently assure a range for averaging the data, the shift poses a serious problem. A method of eliminating the influence of this shift will be described as the 11th embodiment of the present invention.

More specifically, as shown in FIG. 34, mask circuits 112A, 112B, and 112W are arranged in a luminance component extraction section 30. As shown in FIG. 35, each of the mask circuits 112A, 112B, and 112W is a kind of filter arranged such that an amplitude is reduced near the periphery of a two-dimensional image. Since different patterns may be mixed into the peripheral portion of an image upon shifting in the image, such mask processing can reduce the influence of the shift. This masking utilizes a function approximated from, e.g., a Gaussian function. This method provides a large effect with simple processing.

As shown in FIG. 36, an image shift correction circuit 114 is used. The image shift correction circuit 114 corrects a shift of an image photographed through bandpass filters 12A to 12E, and is constituted as shown in FIG. 37 in detail. That is, the image shift correction circuit 114 comprises a frame memory 116, a reference area memory 118 for storing a reference image used for correlation operation, a correlation circuit 120 for performing a correlation operation, and a read control circuit 122. With this arrangement, an image photographed through a filter is stored in the frame memory 116, and part of the image is stored in the reference area memory 118. An image subsequently photographed through another filter is stored in the frame memory 116, and the correlation circuit 120 performs the correlation operation between the obtained image and the reference image stored in the reference area memory 118. This correlation operation is performed using a method of comparing sums of absolute values of differences, thereby obtaining a shift amount between the two subsequent images through the filters. The read control circuit 122 controls the read position from the frame memory on the basis of this shift amount so as to match the obtained image with the first photographed image, thereby correcting the shift between the images. This method is effective when a target object is small.

Further, an image is divided into small blocks, and a shift amount is obtained for each block, thereby correcting the image. With this operation, even when part of an image moves, a shift can be corrected.

As described in detail, according to each of the fourth to 11th embodiments, there is provided a simple, low-cost color classification apparatus having a high resistance to mechanical vibrations and capable of properly performing color classification even if a light source is not specified and its spectrum changes.

According to the fifth embodiment described above, the classification spectra $d1i$ (i=1 to 5) and $d2i$ (i=1 to 5) are calculated using the FS transform. Instead of this, the difference vector $\underline{d}$ described in the first embodiment using equations (4) to (7) or an orthogonal complement $a^\perp$ described with FIG. 8 can be utilized.

That is, a technique using the above difference vector $\underline{d}$ as the classification spectra $d1i$ and $d2i$ (i=1 to 5) can greatly decrease a calculation amount in comparison with the technique using the FS transform.

When the orthogonal complement is used, as described in the first embodiment, if the second principle component vector and the third principle component vector are respectively used as the classification spectra $d1i$ (i=1 to 5) and the classification spectra $d2i$ (i=1 to 5), data can be projected into the orthogonal complement $a^\perp$ as shown in FIG. 8.

By using the orthogonal complement, even when an absolute intensity of a reference color $\underline{a}$ is not constant due to a change in illumination light intensity, classification can be accurately performed.

In accordance with the characteristic of light reflected by a target object to be measured, the intensity of reflected light is low at a certain band filter, and the SNR of observed data is also low, thereby degrading classification precision.

The 12th embodiment for solving the above problem will be described with reference to FIG. 38.

Figure 38:
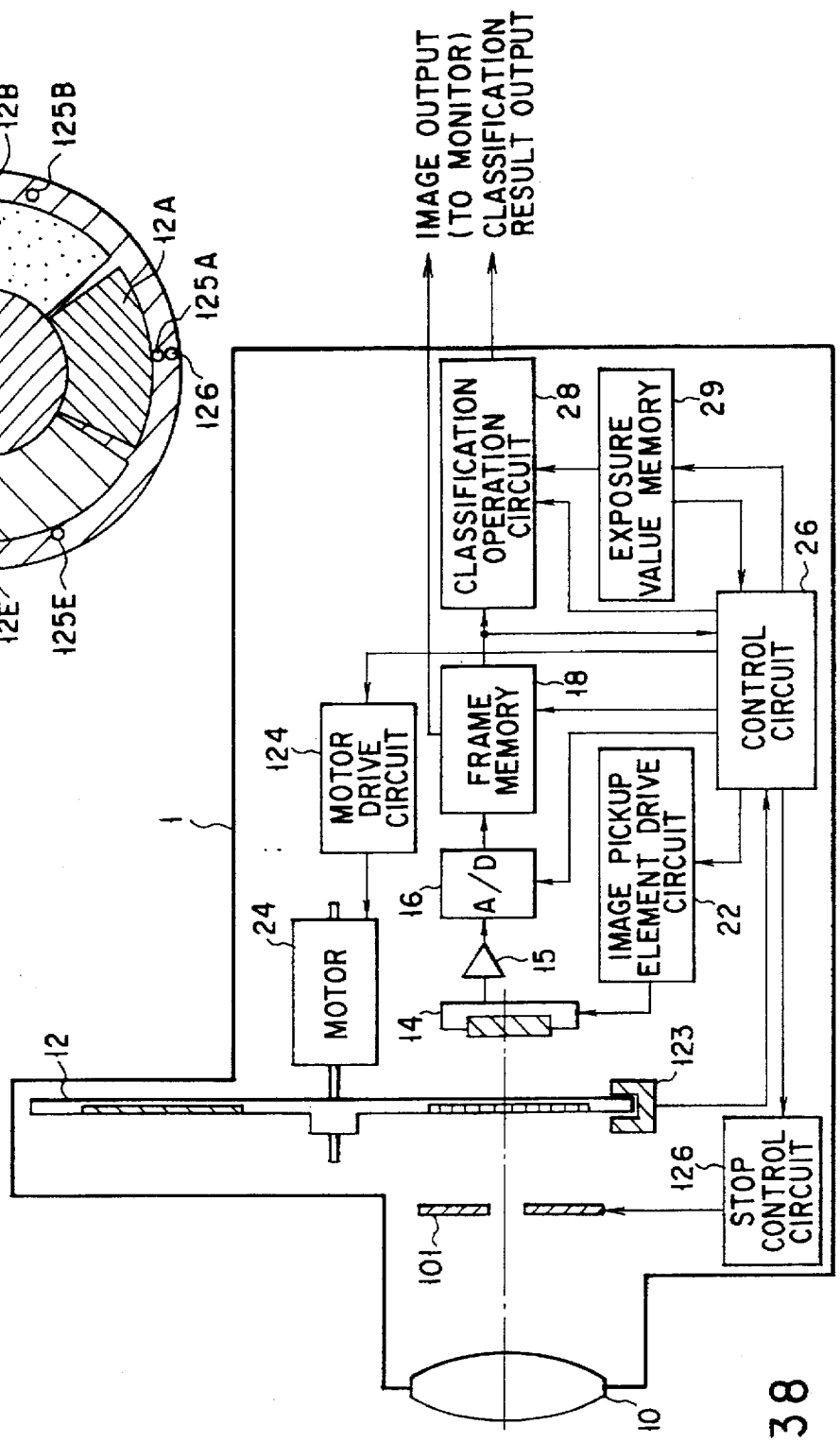
FIG. 38 is a block diagram showing a color classification apparatus of the 12th embodiment of the present invention.

As shown in FIG. 38, a color classification apparatus of this embodiment comprises an optical system 10 including a lens and the like arranged in front of a housing 1, a stop 101, a stop control circuit 126, a rotary color filter 12 constituted by a plurality of bandpass filters 12A, 12B, ... , and 12E having different pass band characteristics, a filter position sensor 123, a motor 24, a motor drive circuit 124, an image pickup element 14 for picking up images of a target object and a reference plate, an amplifier 15, an image pickup element drive circuit 22, an A/D converter 16, a frame memory 18, a classification operation circuit 28, an exposure value memory 29 for storing an aperture value for obtaining optimal exposure of each bandpass filter, and a control circuit 26.

Figure 39:
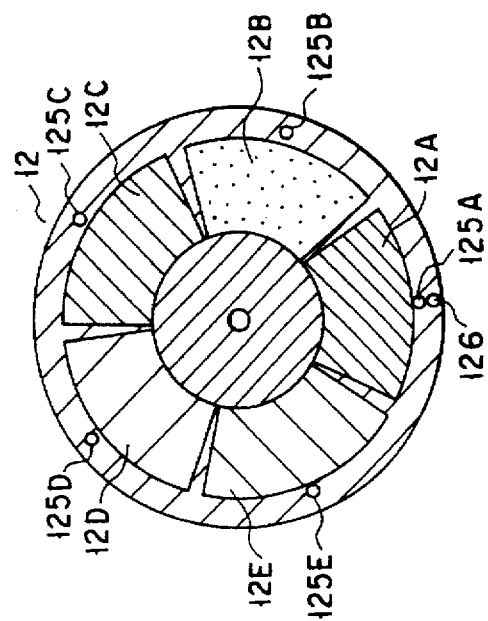
FIG. 39 is a view illustrating a rotary color filter used in the 12th embodiment.

Filter position detection holes 125A, 125B, ... , and 125E and a filter initial position detection hole 126 are formed in the rotary color filter 12, as shown in FIG. 39. The initial position detection hole 126 and each of the filter position detection holes 125A, 125B, ..., and 125E are detected by the filter position sensor 123 constituted by a photointerrupter or the like to detect each of the bandpass filters 12A, 12B, ..., 12E. The control circuit 26 controls the motor drive circuit 124 such that rotation of the filter is synchronized with an image pickup operation of the image pickup element 14 in accordance with a signal from the filter position sensor 123.

An image passing through the rotary color filter 12 is focused on the image pickup element 14 and converted into a digital signal by the A/D converter 16 through the amplifier 15. The digital signal is stored in the frame memory 18. The image signal is sent from the frame memory 18 to the monitor, and data of a predetermined region of the image is sent to the classification operation circuit 28.

Assume that the data value of the bandpass filter 12A is about 1/10 that of the bandpass filter 12B as data of the predetermined region in the image.

In this case, when a signal-to-noise ratio (SNR) is taken into consideration, the data of the bandpass filter 12A is degraded about 10 times that of the bandpass filter 12B by dark current noise in the measurement data.

The stop is controlled in synchronism with each of the filters 12A to 12E, and the SNR is set to exceed a predetermined level in each filter.

The aperture values of the filters 12A to 12E are stored in the exposure value memory 29, and the aperture value is corrected in preprocessing of the classification operation circuit 28.

The opening area of the stop for receiving data from the bandpass filter 12A is set ten times that from the bandpass filter 12B.

In classification operation, the data from the bandpass filter 12A is divided into 1/10, and the resultant data is then classified.

A series of operations in the color classification apparatus having the above arrangement according to the 12th embodiment will be described with reference to a flow chart in FIG. 40.

A target object measurement region is set (step S1).

The first bandpass filter is set (bandpass filter 12A), preliminary exposure is performed, the stop is set such that the resultant measurement data falls within a predetermined numerical range, and the resultant aperture value is stored together with the corresponding bandpass filter number (steps S2 to S7).

The above operations are sequentially performed for all the bandpass filters (bandpass filters 12B to 12E) (steps S8 to S10).

Upon completion of the above preliminary exposure, in the measurement mode, the measurement data of the bandpass filters are corrected and classified in the classification operation circuit 28 on the basis of the corresponding aperture value data of the bandpass filters.

As described above, in the 12th embodiment, the exposure value memory 29 is arranged to perform an image pickup operation with optimal exposure for each bandpass filter. As a result, the measurement data SNR can increase, and classification precision can also be improved.

In this embodiment, the preliminary exposure is performed to measure light using each bandpass filter with optimal exposure, so that high-precision classification can be achieved even if a target measurement object changes.

The 13th embodiment for preventing the SNR from being reduced due to dark current noise of the image pickup element will be described with reference to FIG. 41 as far as types of target objects are limited to some extent.

As shown in FIG. 41, a color classification apparatus of this embodiment comprises an optical system 10 including a lens and the like, a rotary color filter 12 constituted by a plurality of bandpass filters 12A, 12B, ..., and 12E as shown in FIG. 39 and fixed to a motor shaft, a rotary stop plate 102 having fan-shaped openings 103A, 103B, ..., and 103E with different widths so as to correspond to the respective bandpass filters as shown in FIG. 42 and fixed to the motor shaft such that the openings overlap the corresponding bandpass filters, a filter position sensor 123, a motor 24, a motor drive circuit 124, a solid image pickup element 14 for receiving images of a target object and a reference plate, an amplifier 15, an image pickup element drive circuit 22, an A/D converter 16, a frame memory 18, a classification operation circuit 28, an exposure value memory 29 for storing aperture values of the rotary stop plate corresponding to the respective bandpass filters 12A, 12B, ..., and 12E of the rotary color filter 12, and a control circuit 26.

Filter position detection holes 125A, 125B, ..., and 125E and a filter initial position detection hole 126 are formed in the rotary color filter 12 in the same manner as in the 12th embodiment as shown in FIG. 39.

The initial position detection hole 126 and each of the filter position detection holes 125A, 125B, ..., and 125E are detected by the filter position sensor 123 constituted by a photointerrupter or the like to detect the position of each of the bandpass filters 12A, 12B, ..., and 12E. The control circuit 26 controls the motor drive circuit such that rotation of the filter is synchronized with an image pickup operation of the image pickup element in accordance with a signal from the filter position sensor 123.

The rotary stop plate 102 is rotated together with the rotary color filter 12.

The openings 103A, 103B, ..., and 103E of the rotary stop plate 102 correspond to the respective bandpass filters 12A, 12B, ..., and 12E of the rotary color filter 12 to limit an exposure amount.

An image passing through each filter is focused on the image pickup element 14 and converted into a digital signal by the A/D converter 16 through the amplifier. The digital signal is stored in the frame memory 18. The image signal is sent from the frame memory 18 to the monitor, and data of a predetermined region of the image is sent to the classification operation circuit 28.

The rotary stop plate 102 will be described hereinafter.

The distribution of light reflected by a target object is roughly checked in advance to obtain optimal opening diameters of the stops for the respective bandpass filters (bandpass filters 12B, ..., and 12E).

The rotary stop plate is formed on the basis of these opening diameters, and the opening diameters at this time are stored in the exposure value memory 29 so as to correspond to the bandpass filters.

The measurement data of the corresponding bandpass filters are corrected and classified in the classification operation circuit 28 on the basis of the aperture value data stored in the exposure value memory 29.

As described above, in the 13th embodiment, the rotary stop plate 102 and the exposure value memory 29 are arranged to perform an image pickup operation with optimal exposure for each bandpass filter. As a result, the measurement data SNR can increase, and classification precision can also be improved.

In the 13th embodiment, high-speed, stable measurement can be performed because no mechanical operation such as a change in diameter of a stop is required.

In addition, in the 13th embodiment, a plurality of rotary stop plates designed in accordance with application purposes can be prepared. The color classification apparatus can be used for many application purposes by exchanging a rotary stop plate for an optimal one.

The 14th embodiment for preventing the SNR from being reduced due to dark current noise of the image pickup element when types of target objects are specified to some extent will be described with reference to FIGS. 43, 44, and 45.

Figure 43:
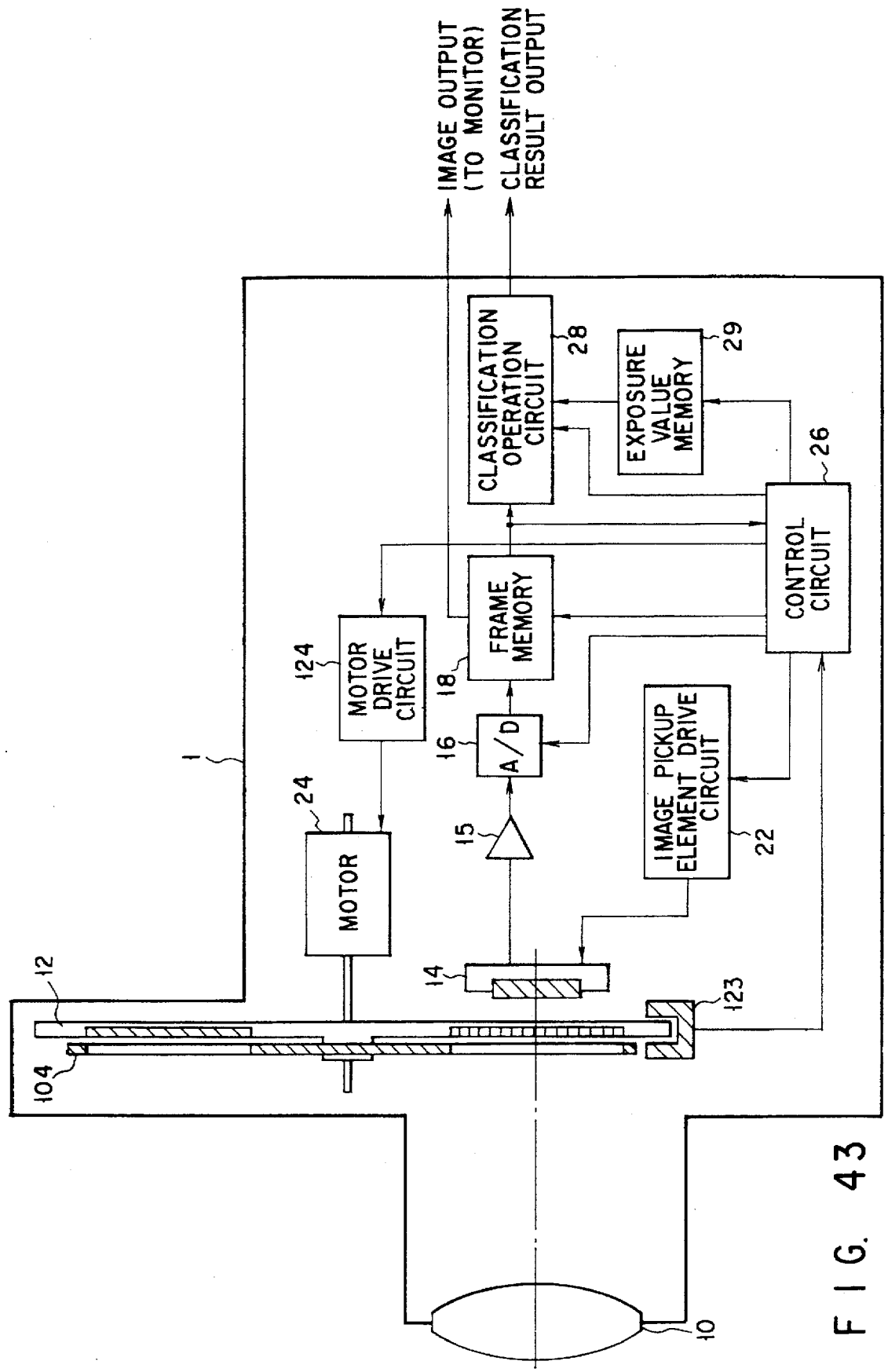
FIG. 43 is a block diagram showing a color classification apparatus of the 14th embodiment of the present invention.

As shown in FIG. 43, a color classification apparatus of this embodiment comprises a housing 1, an optical system 10 including a lens and the like, a rotary color filter 12 constituted by a plurality of bandpass filters 12A, 12B, ..., and 12E as shown in FIG. 2 and fixed to a motor shaft, a rotary ND filter 104 having ND filters 105A, 105B, ..., and 105E with different transmittances so as to correspond to the respective bandpass filters of the rotary filter as shown in FIG. 44 and directly fixed to the rotary filter such that openings overlap the corresponding bandpass filters, a filter position sensor 123, a motor 24, a motor drive circuit 124, a solid-state image pickup element 14 for receiving images of a target object and a reference plate, an amplifier 15, an image pickup element drive circuit 22, an A/D converter 16, a frame memory 18, a classification operation circuit 28, an exposure value memory 29 for storing transmittances of the rotary ND filter 104 corresponding to the respective bandpass filters 12A, 12B, ..., and 12E of the rotary color filter 12, and a control circuit 26.

Filter position detection holes 125A, 125B, ..., and 125E and a filter initial position detection hole 126 are formed in the rotary color filter 12 in the same manner as in the first and second embodiments, as shown in FIG. 39.

The initial position detection hole 126 and each of the filter position detection holes 125A, 125B, ..., and 125E are detected by the filter position sensor 123 constituted by a photointerrupter or the like to detect the position of each of the bandpass filters 12A, 12B, ..., and 12E. The control circuit 26 controls the motor drive circuit such that rotation of the filter is synchronized with an image pickup operation of the image pickup element in accordance with a signal from the filter position sensor 123.

The rotary ND filter 104 is rotated together with the rotary color filter 12.

The respective ND filters 105A, 105B, ..., and 105E of the rotary ND filter 104 correspond to the respective bandpass filters 12A, 12B, ..., and 12E of the rotary color filter 12 to limit an exposure amount.

An image passing through each filter is focused on the image pickup element 14 and converted into a digital signal by the A/D converter 16 through the amplifier. The digital signal is stored in the frame memory 18. The image signal is sent from the frame memory 18 to the monitor, and data of a predetermined region of the image is sent to the classification operation circuit 28.

The rotary ND filter 104 will be described hereinafter.

The distribution of light reflected by a target object is roughly checked in advance to obtain optimal transmittances for the respective bandpass filters (bandpass filters 12B, ..., and 12E). The rotary ND filter 104 is formed using the ND filters having these transmittances, and these transmittances at this time are stored in the exposure value memory 29 so as to correspond to the bandpass filters.

The measurement data of the corresponding bandpass filters are corrected and classified in the classification operation circuit 28 on the basis of the transmittance data stored in the exposure value memory 29.

As described above, in the 14th embodiment, the rotary ND filter 104 and the exposure value memory 29 are arranged to perform an image pickup operation with optimal exposure for each bandpass filter. As a result, the measurement data SNR can increase, and classification precision can also be improved.

In the 14th embodiment, high-speed, stable measurement can be performed because no mechanical operation such as a change in diameter of a stop is required.

In addition, in the 14th embodiment, a plurality of rotary ND filters designed in accordance with application purposes can be prepared. The color classification apparatus can be used for many application purposes by exchanging a rotary ND filter for an optimal one.

In the 14th embodiment, as shown in FIG. 45, a rotary slit plate 104A may be prepared in place of the rotary ND filter 104.

Openings 106A, 106B, ..., and 106E of this rotary slit plate corresponding to the respective bandpass filters have circumferential lengths corresponding to the transmittances of the respective ND filters in FIG. 7.

With this arrangement, the exposure time of each bandpass filter is limited. As a result, an exposure can be controlled, thereby obtaining the same effect as described above.

The 15th embodiment with versatility will be described with reference to FIGS. 46 and 47.

As shown in FIG. 46, a color classification apparatus of this embodiment comprises a housing 1, an optical system 10 including a lens and the like, a rotary color filter 12 constituted by a plurality of bandpass filters 12A, 12B, ..., and 12E shown in FIG. 39, a filter position sensor 123, a motor 24, a motor drive circuit 124, a transmittance variable filter 122 capable of changing a transmittance, a transmittance control circuit 121 for controlling the transmittance of the transmittance variable filter 122, an image pickup element 14 for receiving images of a target object and a reference plate, an amplifier 15, an image pickup element drive circuit 22, an A/D converter 16, a frame memory 18, a classification operation circuit 28, an exposure value memory 29 for storing transmittances with which optimal exposure of each bandpass filter can be obtained, and a control circuit 26.

Filter position detection holes 125A, 125B, ..., and 125E and a filter initial position detection hole 126 are formed in the rotary color filter 12 in the same manner as in the first to third embodiments, as shown in FIG. 39.

The initial position detection hole 126 and each of the filter position detection holes 125A, 125B, ..., and 125E are detected by the filter position sensor 123 constituted by a photointerrupter or the like to detect the position of each of the bandpass filters 12A, 12B, ..., and 12E. The control circuit 26 controls the motor drive circuit such that rotation of the filter is synchronized with an image pickup operation of the image pickup element in accordance with a signal from the filter position sensor 123.

An image passing through each filter is focused on the image pickup element 14 and converted into a digital signal by the A/D converter 16 through the amplifier 15. The digital signal is stored in the frame memory 18. The image signal is sent from the frame memory 18 to the monitor, and data of a predetermined region of the image is sent to the classification operation circuit 28.

The operation of the 15th embodiment will be described with reference to a flow chart in FIG. 47. A target object measurement region is set (step S11).

The first bandpass filter is set (bandpass filter 12A), preliminary exposure is performed, the transmittance of the transmittance variable filter 122 is set such that the resultant measurement data falls within a predetermined numerical range, and the resultant transmittance is stored together with the corresponding bandpass filter number (steps S12 to S17). The above operations are sequentially performed for all the bandpass filters (bandpass filters 12B to 12E) (steps S18 to 20).

Upon completion of the above preliminary exposure, in the measurement mode, the transmittance of the transmittance variable filter 122 is changed synchronized with the respective bandpass filters 12A, 12B, ..., and 12E, and the measurement data of the corresponding bandpass filters are corrected and classified in the classification operation circuit 28 on the basis of the corresponding transmittance data stored for each bandpass filter.

As described above, in the 15th embodiment, the transmittance variable filter 122 and the exposure value memory 29 are arranged to perform an image pickup operation with optimal exposure for each bandpass filter. As a result, the measurement data SNR can increase, and classification precision can also be improved.

In this embodiment, the preliminary exposure is performed to measure light using each bandpass filter with optimal exposure, so that high-precision classification can be achieved even if a target measurement object changes. The color classification apparatus with versatility can be realized.

Figure 48:
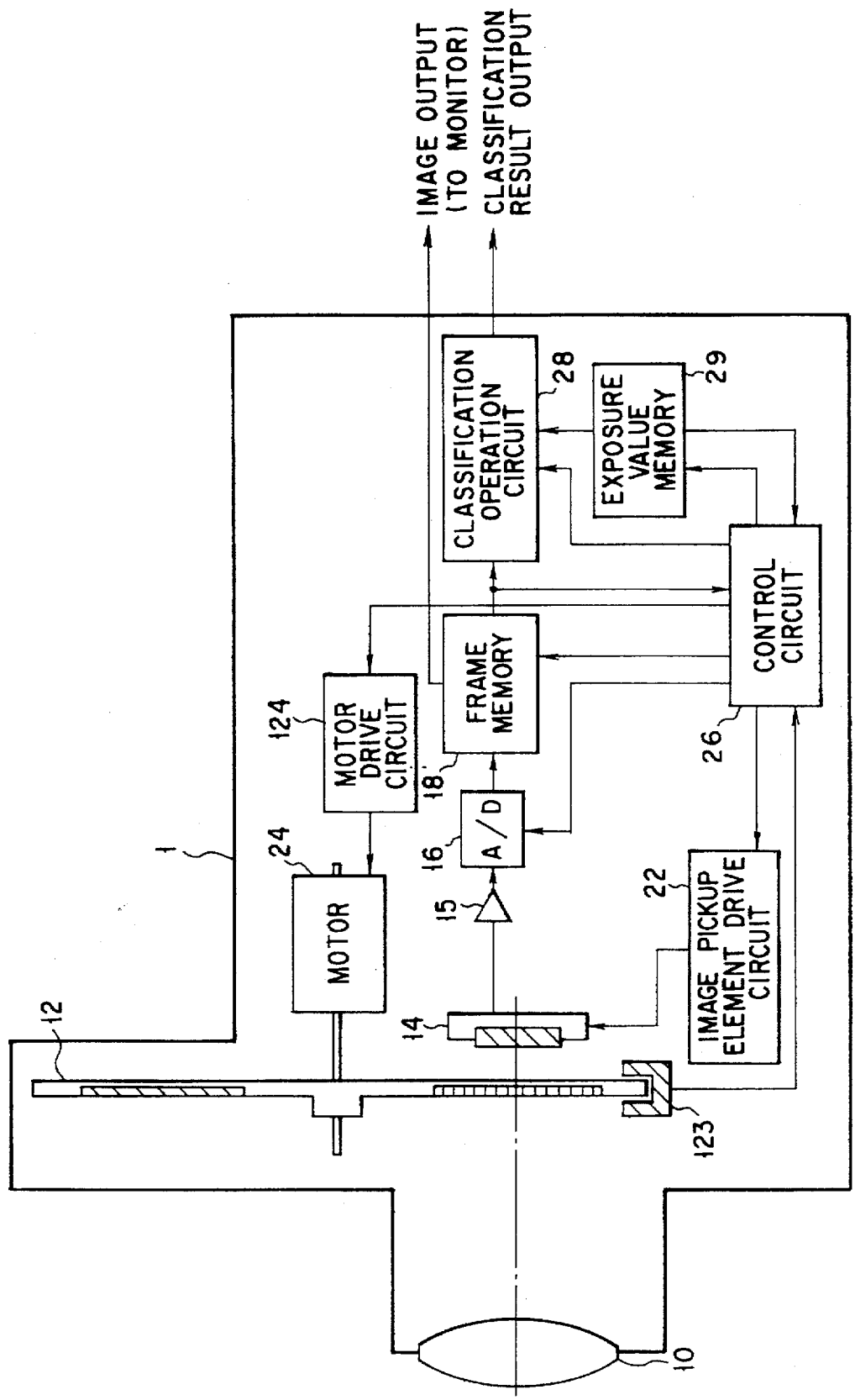
FIG. 48 is a block diagram showing a modification of the color classification apparatus of the 15th embodiment.

As shown in FIG. 48, the 15th embodiment may employ an arrangement in which the transmittance variable filter 122 and the transmittance control circuit 121 in FIG. 46 are removed to control the exposure time of the image pickup element. With this arrangement, a circuit arrangement can be further simplified.

The 16th embodiment which facilitates measurement of a reference plate mainly in outdoor use will be described below with reference to FIGS. 49 and 50.

Figures 49, 50:
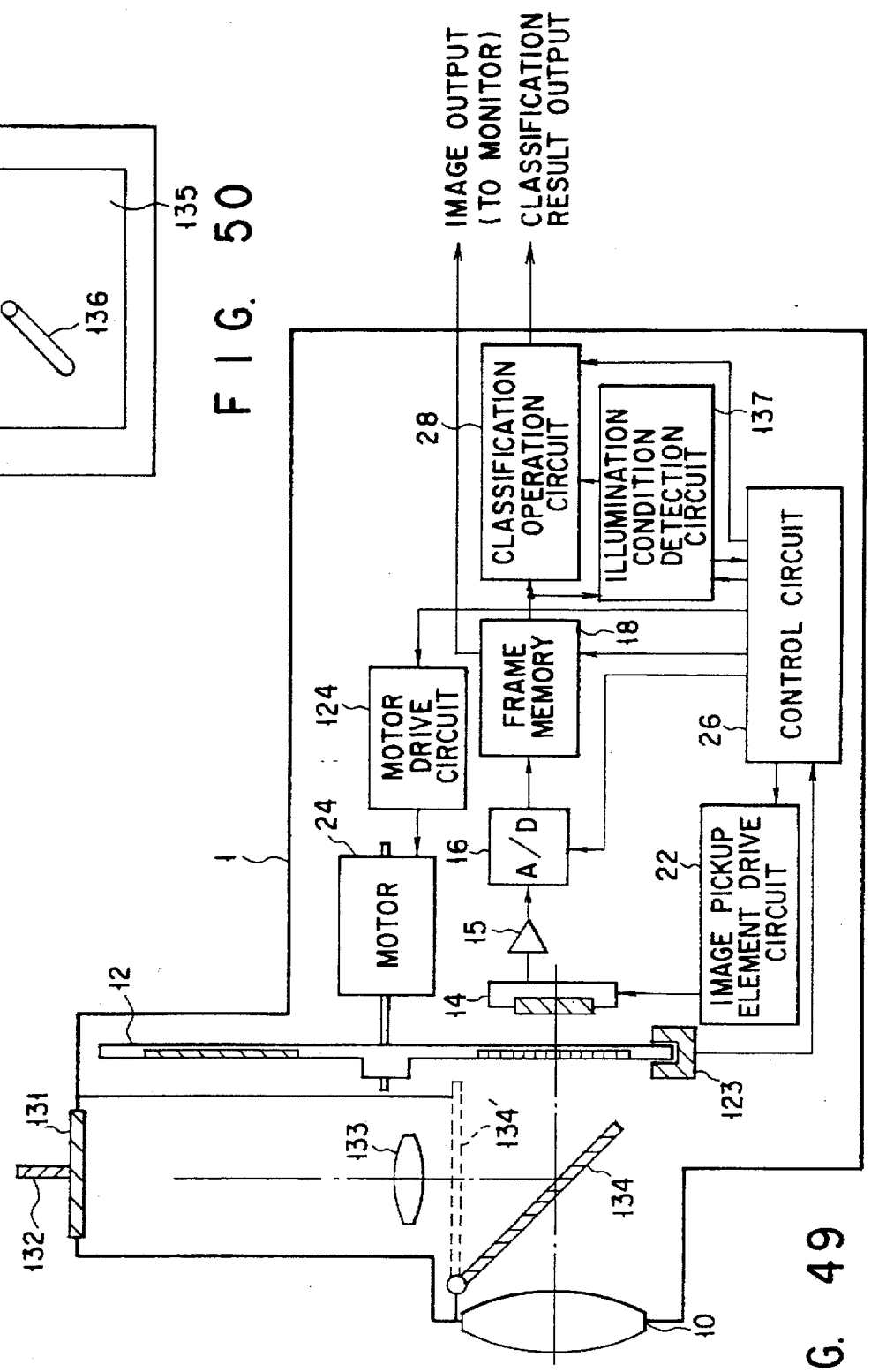
FIG. 49 is a block diagram showing a color classification apparatus of the 16th embodiment of the present invention.
FIG. 50 is a view illustrating a reference plate of the 16th embodiment.

As shown in FIG. 49, a color classification apparatus of this embodiment comprises a housing 1, an optical system 10 including a lens and the like, a rotary color filter 12 constituted by a plurality of bandpass filters 12A, 12B, ..., and 12E shown in FIG. 39, a filter position sensor 123, a motor 24, a motor drive circuit 124, an image pickup element 14 for receiving images of a target object and a reference plate, an amplifier 15, an image pickup element drive circuit 22, an A/D converter 16, a frame memory 18, an illumination condition detection circuit 137 for detecting illumination conditions from data in the frame memory 18, a classification operation circuit circuit 26, a circuit 26, a transmission reference plate 131 arranged on the upper front portion of the housing 1, an optical system 133 for focusing the reference plate on the image pickup element, and a mirror 134 whose angle is variable using one end as a center.

In measurement with respect to the reference plate 131, the mirror 134 is set at a position 134' represented by a dashed line in FIG. 49. An image of the transparent reference plate 131 arranged on the upper portion of the housing 1 is transmitted into the housing 1 while diffusing downward illumination light.

The reference plate 131 which reflects the distribution of light from a light source is reflected by the mirror 134 through the optical system 133 to be focused on the image pickup element.

The rotary color filter 12 is rotated. The image passing through each bandpass filter is converted into digital data to be described later. The image signal is subjected to image processing by the illumination condition detection circuit 137, thereby obtaining illumination condition data such as brightness, and the direction of illumination, and light source data. Note that data of the direction of illumination will be described later.

The brightness data obtained by the illumination condition detection circuit 137 is sent to the control section 26 and used for exposure adjustment.

The light source data is sent to the classification operation circuit 28 and stored in a memory in the classification operation circuit 28. At the same time, the data of the direction of illumination is sent to the classification operation circuit 28.

In measuring a target object, the mirror 134 is set at the position 134' represented by the dashed line in FIG. 49. Light reflected by the target object passes through the optical system 10 and the rotary color filter 12, and is focused on the image pickup element 14.

The control circuit 26 sends a signal to the motor drive circuit 124. The rotary color filter 12 is rotated by the motor 24 such that the position of each bandpass filter is synchronized with an image pickup operation of the image pickup element 14.

The target object image passing through each bandpass filter is focused on the image pickup element 14, through the amplifier 15, and converted into digital data by the A/D converter 16. The digital data is stored in the frame memory 18, and sent to the classification operation circuit 28. The light source is corrected using the data of the reference plate 131 measured in advance and stored in the memory in the classification operation circuit 28 to perform classification operation.

A method of obtaining the data of the direction of illumination will be described hereinafter.

A rod 132 is mounted at the central portion of the reference plate 131, as shown in FIG. 49.

The reference plate 131 is observed as an image as shown in FIG. 50 by the image pickup element 14.

That is, since a shadow 136 of the rod 132 is reflected in an image 135 of the reference plate 131, the illumination condition detection circuit 137 detects illumination conditions from the resultant image.

The direction of illumination in measurement can be detected from the angle and length of the shadow 136 of the rod. In addition, in the case of slightly cloudy weather, a luminance difference between the shadow 136 of the rod and the image 135 of the reference plate around the shadow 136 is small, and in the case of completely cloudy weather, no shadow is obtained, thereby grasping illumination conditions in detail.

The classification operation circuit 28 which receives illumination information detected by the illumination condition detection circuit 137 prepares learning data obtained under different illumination conditions such as follow light, back light, and cloudiness in advance. A measurement error caused by a difference in illumination conditions can be maximally eliminated to perform classification operation.

In this manner, according to the 16th embodiment, the reference plate 131 is arranged on the upper front portion of the housing 1, and the data of the reference plate 131 can be obtained by only switching the angle of the mirror 134. With this arrangement, when illumination light changes such that the weather changes from fine to cloudy during measurement in outdoor, data acquisition of the reference plate can be facilitated such that the data of the reference plate 131 can be easily obtained.

Note that the angle of the mirror 134 may be changed manually, or automatically in accordance with a signal sent from the control circuit 26 using a drive device.

The 17th embodiment which facilitates measurement of a reference plate mainly in outdoor use will be described below with reference to FIGS. 51, 52, and 53.

As shown in FIG. 51, a color classification apparatus of this embodiment comprises a housing 1, an optical system 10 including a lens and the like, a rotary color filter 12 constituted by a plurality of bandpass filters 12A, 12B, ... , and 12E as shown in FIG. 39, a filter position sensor 123, a motor 24, a motor drive circuit 124, an image pickup element 14 for receiving images of a target object and a reference plate, an amplifier 15, an image pickup element drive circuit 22, an A/D converter 16, a frame memory 18, an illumination condition detection circuit 145 for detecting illumination conditions from data in the frame memory 18, a classification operation circuit 28, a control circuit 26, a reference plate 138 arranged on the upper portion of the housing 1, mirrors 141 and 142 arranged so as to focus the reference plate 138 on the image pickup element 14 through the optical system 10, and arms 143 and 144 for fixing the mirrors 141 and 142 on the housing 1.

This embodiment relates to a measurement apparatus used for measurement in outdoor, i.e., using a sunbeam as illumination light.

In measuring a target object, light reflected by the target object passes through the optical system 10 and the rotary color filter 12, and is focused on the image pickup element 14.

At the same time, an image of the reference plate 138 is reflected by the mirrors 141 and 142, and focused on part of the image pickup element 14 through the optical system 10.

FIG. 52 shows this state. A target object 146 is displayed on the entire screen, and the reference plate 138 reflected by the mirrors 141 and 142 is also displayed on the lower central portion of the screen.

A region 147 surrounded by a quadrangle at the center of the screen represents a measurement region. This is a range within which colors for classifying the target object are measured, and can be arbitrarily changed (its position and size).

The control circuit 26 sends a signal to the motor drive circuit 124. The rotary color filter 12 is rotated by the motor 24 such that the position of each bandpass filter is synchronized with an image pickup operation of the image pickup element. Images of the target object 146 and the reference plate 138 are simultaneously focused on the image pickup element 14, as shown in FIG. 52.

The obtained images of the target object 146 and the reference plate 138 passing through each bandpass filter are focused on the image pickup element 14, and A/D-converted through the amplifier 15. The converted data are stored in the frame memory 18.

The illumination condition detection circuit 145 detects illumination condition data from the data of the reference plate 138 in the image data stored in the frame memory 18, and the detected data is sent to the control circuit 26. In addition, the data of the reference plate 138 is sent to the classification operation circuit 28, and stored in a memory in the classification operation circuit 28.

The control circuit 26 controls the shutter speed of the image pickup element 14 using brightness data from the illumination condition detection circuit 145 so as to set optimal exposure, and sends the data of the direction of illumination to the classification operation circuit 28.

The data of the target object 146 in the image data stored in the frame memory 18 is sent to the classification operation circuit 28. A light source is corrected using the data of the reference plate 138 stored in the memory in the classification operation circuit 28 to perform classification operation.

A rod 139 is mounted at the central portion of the reference plate 138, as shown in FIG. 53. Scale marks 148 are radially set from the rod 139. With this arrangement, the direction of illumination light in measurement can be detected on the basis of the relative angle of a shadow 149 of the rod 139 formed by a sunbeam on the reference plate 138 with the scale mark 148 and the length of the shadow 149.

In addition, in the case of slightly cloudy weather, a luminance difference between the shadow 149 of the rod and the image of the reference plate 138 around the shadow 149 is small, and in the case of completely cloudy weather, no shadow is observed, thereby grasping illumination conditions in detail.

In this manner, according to the 17th embodiment, the reference plate 138 is arranged on the upper portion of the housing 1, and the mirrors 141 and 142 are arranged so as to focus the reference plate 138 on part of the image pickup element 14 through the optical system 10. With this arrangement, in measuring the target object 146, since the image of the reference plate 138 also falls within the same image, the reference plate 138 and the target object 146 can be simultaneously measured, thereby greatly facilitating the measurement. Further, a difference between illumination conditions in measuring the reference plate and those in measuring the target object is not generated, thereby improving correction reliability.

According to this embodiment, since the rod 139 is arranged on the reference plate 138, illumination conditions such as follow light, back light, and cloudiness can be detected from information about its shadow. Learning data obtained under different illumination conditions are prepared in advance. With this operation, a measurement error caused by a difference in illumination conditions can be maximally eliminated to perform the classification operation, thereby improving classification precision.

The 18th embodiment which facilitates measurement of a reference plate mainly in outdoor use will be described below with reference to FIG. 54.

As shown in FIG. 54, a color classification apparatus of this embodiment comprises a housing 1, an optical system 10 for focusing a target object, a rotary color filter 12 constituted by a plurality of bandpass filters 12A, 12B, ... , and 12E shown in FIG. 39, a filter position sensor 123, a motor 24, a motor drive circuit 124, an image pickup element 14 for receiving an image of a target object, an amplifier 15, an image pickup element drive circuit 22, an A/D converter 16, a frame memory 18, a classification operation circuit 28, a control circuit 26, a reference plate 151 arranged at the front portion of the housing 1, an image pickup element 154, an optical system 152 for focusing the reference plate 151 on the image pickup element 154, an A/D converter 156 for converting an image signal from the image pickup element 154 to digital data through an amplifier 15a, and an illumination light detection circuit 137 for detecting illumination light conditions from image data of the reference plate 151.

This embodiment relates to a measurement apparatus used for measurement in outdoor, i.e., using a sunbeam as illumination light.

In measuring a target object, light reflected by the target object passes through the optical system 10 and the rotary color filter 12, and is focused on the image pickup element 14.

The control circuit 26 sends a signal to the motor drive circuit 124. The rotary color filter 12 is rotated by the motor 24 such that the position of each bandpass filter is synchronized with an image pickup operation of the image pickup element.

An image signal of light reflected by the target object passing through each bandpass filter can be obtained from the image pickup element 14. The obtained image signal is processed in the same manner as in each embodiment described above.

On the other hand, the image pickup element 154 is set diagonally to the rotary color filter 12 with respect to the image pickup element 14. When the rotary color filter 12 is rotated by one revolution, an image signal obtained from light reflected by the reference plate 151 and passing through each bandpass filter is obtained from the image pickup element 154.

The image signal of the reference plate 151 obtained in this manner is converted into digital data by the A/D converter 156 through the amplifier 15a. The illumination condition detection circuit 137 detects illumination condition data, and the detected data is sent to the control circuit 26. The data of the reference plate 151 is sent to the classification operation circuit 28.

If the reference plate 151 has the same arrangement shown in FIG. 53 as in the 17th embodiment, illumination conditions can be grasped in detail.

The control circuit 26 controls the shutter speed of the image pickup element 14 and the image pickup element 154 using brightness data from the illumination condition detection circuit 137 so as to set optimal exposure, and sends the data of the direction of illumination to the classification operation circuit 28.

The target object data stored in the frame memory 18 is sent to the classification operation circuit 28. A light source is corrected using the data of the reference plate stored in a memory in the classification operation circuit 28 to perform classification operation.

In this manner, according to the 18th embodiment, the reference plate 151 is arranged at the front portion of the housing 1, and data of the reference plate 151 passing through each bandpass filter are received using the dedicated optical system 152 and the dedicated image pickup element 154. Measurement with respect to the reference plate and the target object can be simultaneously performed, thereby greatly facilitating measurement and increasing a measurement speed. Further, a difference between illumination conditions in measuring the reference plate and those in measuring the target object is not generated, thereby improving correction reliability.

According to this embodiment, if the same rod as the rod 139 in the sixth embodiment is arranged on the reference plate 151, illumination conditions such as follow light, back light, and cloudiness can be detected from information about its shadow. Learning data obtained under different illumination conditions are prepared in advance. With this operation, a measurement error caused by a difference in illumination conditions can be maximally eliminated to perform classification operation, thereby improving classification precision.

When the apparatus is used for an application purpose which does not require data such as the direction of illumination, a rod or scale marks need not be arranged on the reference plate 151, and a simple photodiode or CdS can be sufficiently used in place of the image pickup element 154, thereby further simplifying an arrangement.

The 19th embodiment which does not use a rotary color filter will be described with reference to FIGS. 55 to 61.

Figures 55, 56:
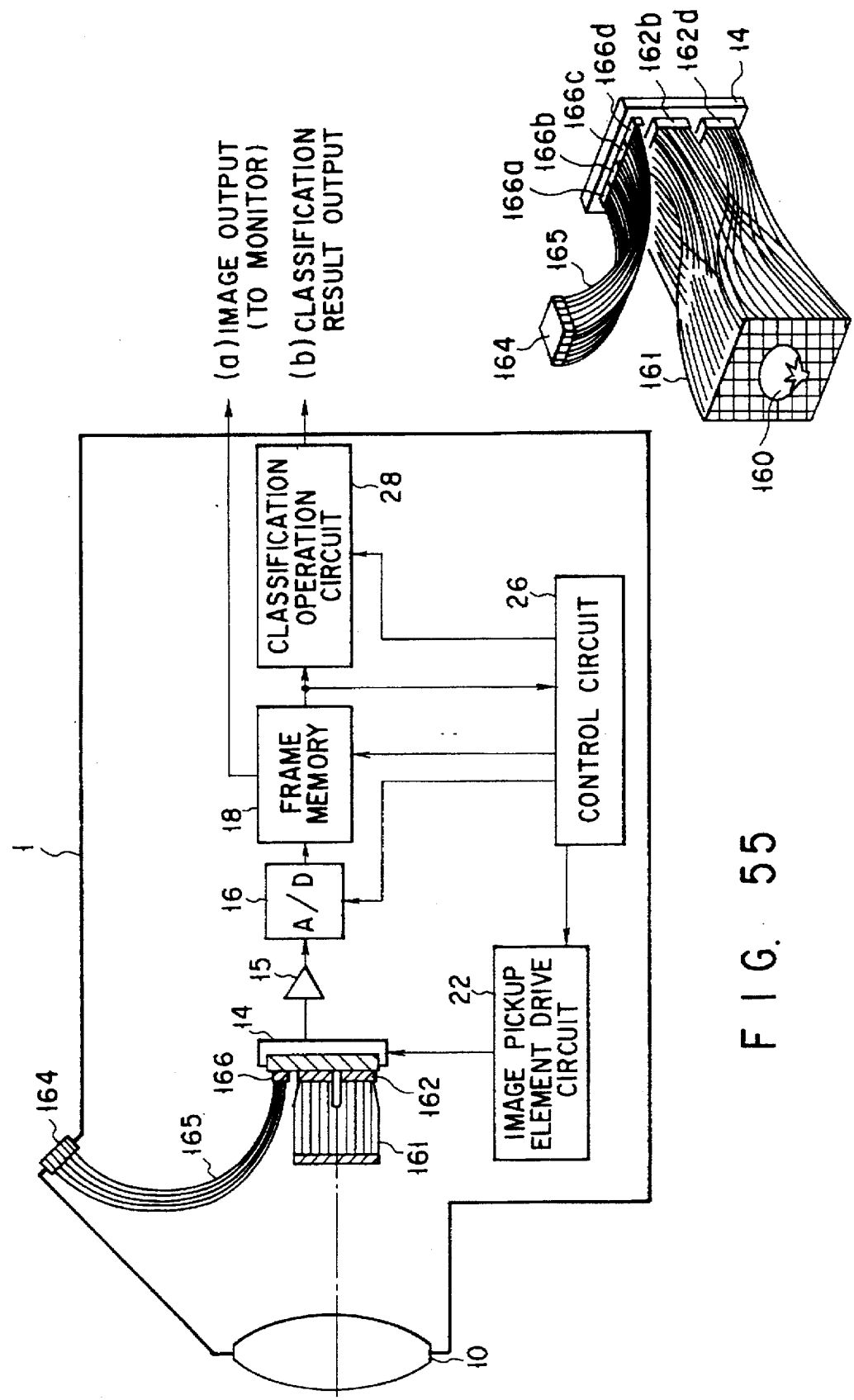
FIG. 55 is a block diagram showing a color classification apparatus of the 19th embodiment of the present invention.
FIG. 56 is a view showing a connection between a CCD and optical fibers.

As shown in FIG. 55, a color classification apparatus of this embodiment comprises a housing 1, an optical system 10 for focusing a target object, a fiber bundle 161 having one end face aligned on an image formation surface on which a target object is focused, bandpass filters 162a, 162b, 162c, and 162d coupled to the other end face of the fiber bundle 161 divided into a plurality of portions, an image pickup element 14 for receiving the image of the target object passing through the bandpass filters, an amplifier 15, an image pickup element drive circuit 22, an A/D converter 16, a frame memory 18, a classification operation circuit 28, a control circuit 26, a transmission reference plate 164 arranged on the upper portion of the housing 1, a fiber bundle 165 having one end aligned on the reference plate 164, and bandpass filters 166a, 166b, 166c, and 166d arranged between the other end of the fiber bundle 165 and the image pickup element 14.

According to this embodiment, the image pickup surface of the image pickup element 14 is divided, and data, passing through a plurality of bandpass filters, of a target object and the direction of a light source are simultaneously input to the image pickup element 14. Classification of this case uses four kinds of bandpass filters.

The arrangements of the fiber bundle 161, the fiber bundle 165, the reference plate 164, and the bandpass filters 162a to 162d, and 166a to 166d will be described with reference to FIGS. 56 to 59.

One end face of the fiber bundle 165 is aligned and connected to the reference plate 164, as shown in FIG. 56.

Figure 57:
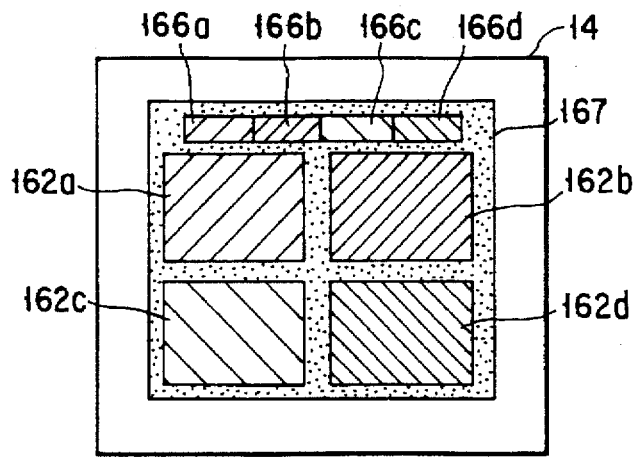
FIG. 57 is a view showing the layout of bandpass filters on the CCD of the 19th embodiment.

The bandpass filters 162a to 162d, and 166a to 166d are mounted on the image pickup surface 167 of the image pickup element 14 in an arrangement shown in FIG. 57.

Each pair of bandpass filters 162a and 166a, 162b and 166b, 162c and 166c, and 162d and 166d have the same bandpass characteristic.

The other end of the fiber bundle 165 is mounted on the bandpass filters 166a to 166d.

In this case, the other end of the fiber bundle 165 is aligned and placed on the image formation surface of the optical system 10 as a plan, and divided into four portions.

Figure 58:
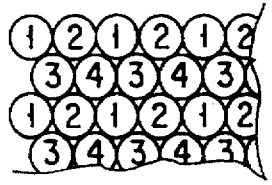
FIG. 58 is a view for explaining a method of binding the optical fibers of the 19th embodiment.

FIG. 58 shows part of a sectional surface of the fiber bundle 165. The fiber bundle 161 is divided into four portions and bundled again such that fibers represented by ① are connected to the bandpass filter 162a, fibers represented by ② are connected to the bandpass filter 162b, fibers represented by ③ are connected to the bandpass filter 162c, and fibers represented by ④ are connected to the bandpass filter 162d.

Therefore, the other end of the fiber bundle 165 becomes a reduced screen of each of the divided image formation surfaces. An image from each reduced screen is input to the image pickup element 14 through the corresponding bandpass filter.

Figure 59:
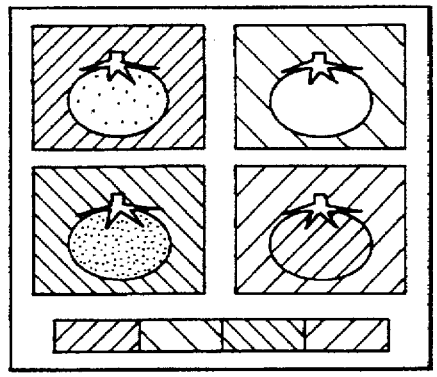
FIG. 59 is a view showing an image focused on the CCD of the 19th embodiment.

With this arrangement, a target object 160 focused as shown in FIG. 56 is observed as image signals, as shown in FIG. 59.

These image signals are converted into digital data by the A/D converter 16 through the amplifier 15. The digital data are written in the frame memory 18. Illumination data for correction from data of the reference plate 164 passing through the bandpass filters 166a to 166d, and data of a predetermined region of the target object for the respective bandpass filters 166a to 166d are sent to the classification operation circuit 28.

The classification operation circuit 28 corrects the data of the target object with the illumination data, and performs classification operation to output the results.

According to the 19th embodiment, the image pickup surface of the image pickup element 14 is divided, the data of the target object corresponding to the plurality of bandpass filters are simultaneously focused, and in addition the illumination data is picked up in the same frame. With this arrangement, the measurement time is greatly shortened.

Figure 60:
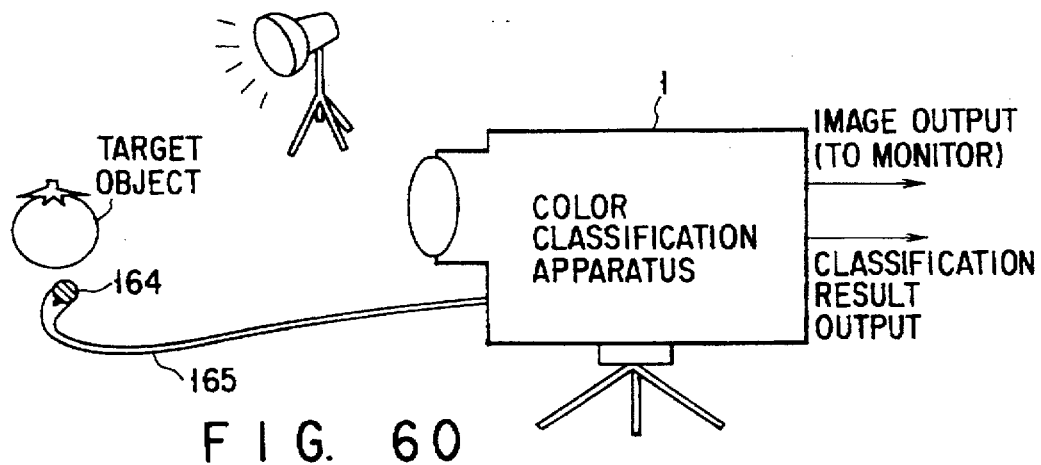
FIG. 60 is a view for explaining a modification of the 19th embodiment.
Figure 61:
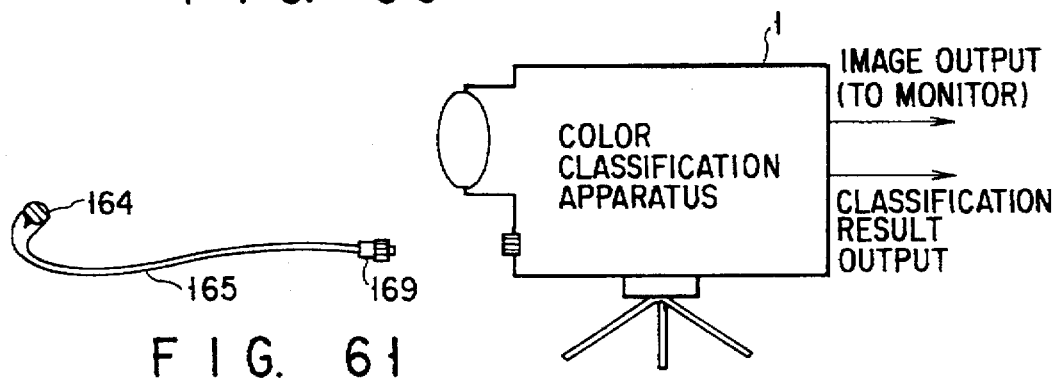
FIG. 61 is a view for explaining another modification of the 19th embodiment.

Since FIG. 55 shows an example for outdoor measurement, the transmission reference plate 164 is fixed on the upper portion of the housing 1 so as to catch a sunbeam. As shown in FIG. 60, the fiber bundle 165 is made to be longer, and the reference plate 164 is extracted outside the housing 1 to be arranged adjacent to a target object. With this arrangement, the apparatus can be used for indoor measurement.

Moreover, the fiber bundle 165 having the distal end mounted with the reference plate 164 to obtain illumination data is mounted is removed from the housing 1 using an optical connector 169. With this arrangement, the apparatus is convenient in portability.

In this embodiment, the number of bandpass filters is four. The number of bandpass filters is not limited to this, and an optimal number of bandpass filters can be set.

The 20th embodiment which does not use a rotary color filter will be described with reference to FIGS. 62 to 66.

As shown in FIG. 62, a color classification apparatus of this embodiment comprises a housing 1, an optical system 10 for focusing a target object, an optical path division prism 170a, optical path division prisms 170b and 170c for receiving two beams split by the optical path division prism 170a, an image pickup element 14 on which light components split by and output from the optical path division prisms 170b and 170c, an amplifier 15, bandpass filters 162a to 166d which are arranged between the optical path division prisms 170b and 170c and the image pickup element 14 such that split light components pass through different bandpass filters to reach the image pickup element 14, an image pickup element drive circuit 22, an A/D converter 16, a frame memory 18, a classification operation circuit 28, a control circuit 26, and a light source spectral sensor 180 arranged on the upper portion of the housing.

According to this embodiment, the image pickup surface of the image pickup element 14 is divided, and images of a target object passing through a plurality of bandpass filters are simultaneously input to the image pickup element 14. Classification of this case uses four kinds of bandpass filters.

The arrangements of the optical path division prisms 170a to 170c, the optical path division prisms 170a to 170c, the bandpass filter 162a to 162d, and the image pickup element 14 will be described.

FIG. 63 shows the arrangement of one of the optical path division prisms 170a to 170c. Referring to FIG. 63, an optical path is represented by a chain line, a half mirror is represented by a dashed line, and mirrors are represented by thick lines.

A light component incident from the left side in FIG. 63 is divided into 50% components in two directions by a half mirror 171. A light component transmitted through the half mirror 171 is reflected by mirrors 162, 163, 164, and 165, and output to the right side in FIG. 63.

On the other hand, a remaining light component reflected by the half mirror 171 is reflected by mirrors 176, 177, and 178, and output to the right side in FIG. 63.

That is, a light component incident on this optical path division prism is divided into two components. The optical axes of the light components divided into two are shifted, and the resultant light components are output from the exit of the prism in parallel.

Three optical path division prisms are prepared serving as 170a to 170c, and these prisms and the image pickup element 14 are combined as shown in FIG. 64.

In this case, two outputs from the optical path division prism 170a are incident on the optical path division prisms 170b and 170c, respectively. A light component incident on the optical path division prism 170a is finally split into four through the optical path division prisms 170b and 170c, and the split light components are output in two rows and two columns.

Figure 65:
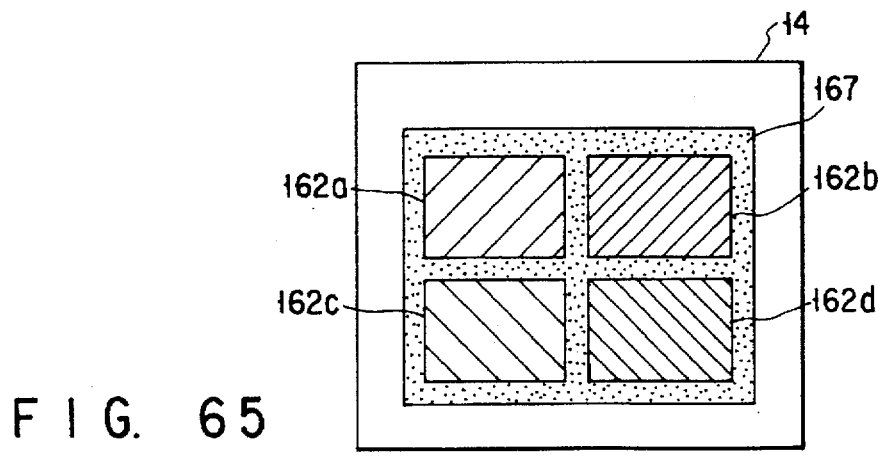
FIG. 65 is a view showing the layout of bandpass filters on the CCD of the 20th embodiment.

Four bandpass filters 162a to 162d having different characteristics and required for measurement are mounted on the image pickup element 14, as shown in FIG. 65. The respective bandpass filters 162a to 162d correspond to images divided into four by the optical path division prisms 170a and 170c.

With this arrangement, a light component reflected by a target object is split into four. The split light components are simultaneously focused on the image pickup element 14 through the different bandpass filters. The image signals output from the image pickup element 14 are converted into digital data by the A/D converter 16 through the amplifier 15. The digital data are stored in the frame memory 18. Data of a predetermined region of the target object is read out from the frame memory 18 for each bandpass filter, and sent to the classification operation circuit 28.

Data from the light source spectral sensor 180 is also sent to the classification operation circuit 28.

Figure 66:
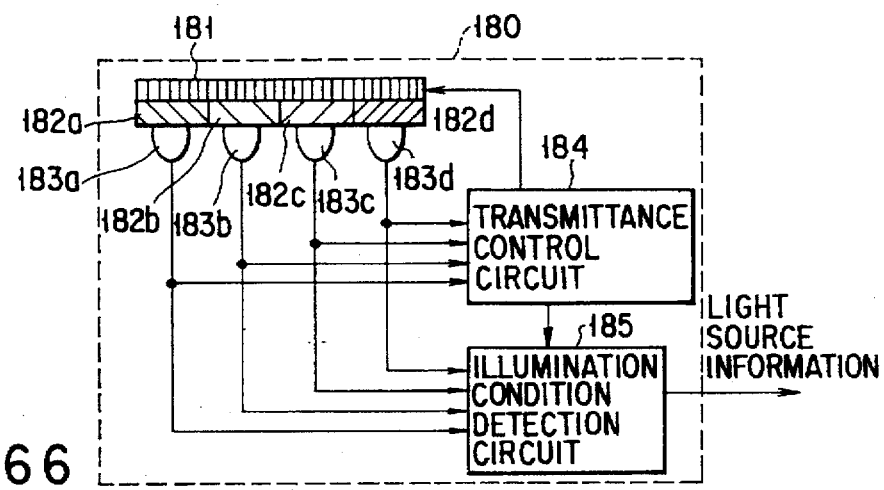
FIG. 66 is a view for explaining the arrangement of an illumination sensor used in the 20th embodiment.

The arrangement of the light source spectral sensor 180 is shown in FIG. 66. The light source spectral sensor 180 comprises a transmittance variable filter 181 located at the outermost position, a plurality of bandpass filters 182a to 182d located next to the transmittance variable filter 181, a plurality of optical sensors 183a to 183d corresponding to the plurality of bandpass filters 182a to 182d, a transmittance control circuit 184 for receiving signals from the plurality of optical sensors 183a to 183d as inputs, and an illumination condition detection circuit 185 for receiving a signal from the transmittance control circuit 184 and signals from the plurality of optical sensors 183a to 183d as inputs.

The plurality of bandpass filters 182a to 182d are the same as the bandpass filters 162a to 162d for classifying a target object.

Photodiodes, phototransistors, or CdSs can be used as the optical sensors 183a to 183d, and a liquid crystal filter can be used as the transmittance variable filter 181.

The transmittance control circuit 184 controls the transmittance of the transmittance variable filter 181 so as not to saturate each optical sensor.

The illumination condition detection circuit 185 detects light source spectrum data from each sensor and the brightness of a light source from an output from the transmittance control circuit 184, and outputs the obtained data.

As described above, the classification operation circuit 28 which receives the data obtained by the light source spectral sensor 180 corrects target object data read out from the frame memory 18 with the illumination data obtained by the light source spectral sensor 180, and performs classification.

According to the 20th embodiment, the image pickup surface of the image pickup element 14 is divided, and the target object data corresponding to the plurality of bandpass filters are simultaneously focused. With this arrangement, the measurement time is greatly shortened. In addition, the operation is stabilized and durability can be improved because mechanically movable members are not used.

Since FIG. 62 shows an example for outdoor measurement, the light source spectral sensor is fixed on the upper portion of the housing so as to catch a sunbeam. The sensor itself is not fixed on the housing but connected to the housing through a cable so as to be arranged adjacent to a target object. With this arrangement, the apparatus can be used for indoor measurement.

The cable of the light source spectral sensor is removed from the housing using a connector. With this arrangement, the apparatus is convenient in portability, as a matter of course.

In this embodiment, the number of bandpass filters is four. It is needless to say that the number of bandpass filters can be increased or decreased.

The 21st embodiment which does not use a rotary color filter will be described with reference to FIG. 67.

Figure 67:
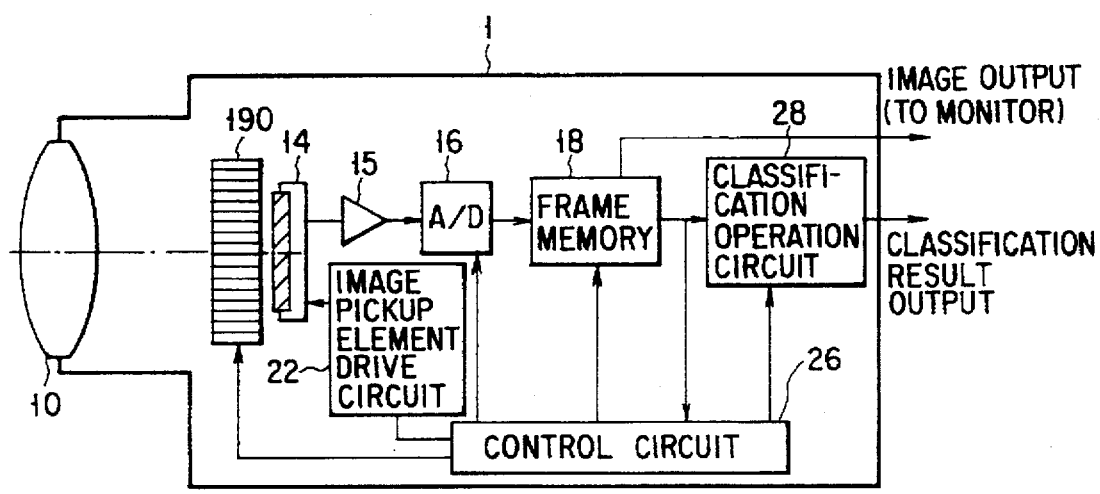
FIG. 67 is a block diagram showing a classification apparatus of the 21st embodiment of the present invention.

As shown in FIG. 67, a color classification apparatus of this embodiment comprises a housing 1, an optical system 10 for focusing a target object, a band variable bandpass filter 190, an image pickup element (CCD) 14, an amplifier 15, a CCD drive circuit 22, an A/D converter 16, a frame memory 18, a classification operation circuit 28, and a control circuit 26.

The band variable bandpass filter 190 used in this embodiment can control a pass band frequency using an external signal.

An image of a target object passing through the optical system 10 is transmitted through the band variable bandpass filter 190 to be focused on the CCD 14.

An image signal output from the CCD 14 is converted into digital data by the A/D converter 16 through the amplifier 15. The digital data is stored in the frame memory 18. Data of a predetermined region of the target object is read out from the frame memory 18 for each bandpass filter, and sent to the classification operation circuit 28.

The control circuit 26 sets the pass band of the band variable bandpass filter 190 to a predetermined value. The control circuit 26 also sends control signals to the CCD drive driver 22 and the frame memory 18 such that data obtained by the CCD 14 is written in the frame memory 18.

This operation is performed by a predetermined number of bands. The classification operation circuit 28 corrects target object data with the reference plate data measured simultaneously or in advance and classifies the target object data.

According to the 21st embodiment, the band variable bandpass filter 190 is used in place of the plurality of bandpass filters to control each pass band, thereby receiving target object data. For this reason, classification spectra having complicated shapes can be highly precisely approximated. The operation is stabilized and durability can be improved because mechanically movable members are not used.

In addition, according to this embodiment, the number of bandpass filters and bands can be freely set to enhance versatility. An optimal arrangement can be obtained by changing only control software of the control circuit 26 even if the application purpose is limited to a specific one.

In this embodiment, image data is read out for each predetermined band. In the classification mode set after the classification spectra are obtained in the learning mode, the band characteristics of the band variable bandpass filter 190 may be controlled during the exposure time of the CCD 14, thereby approximating the classification spectra.

That is, the band of the band variable bandpass filter 190 is set during the exposure time and held for a predetermined period of time. The band is then set to the next band and held for a predetermined period of time. This operation is repeated.

At this time, the holding time upon setting the band of the band variable bandpass filter 190 is controlled in proportion to each band value of a classification spectrum to be approximated (exposure is performed for all bands in which values of classification spectra become negative, and subtraction is then performed with respect to the frame memory).

This operation is equivalent to the inner product operation of classification spectra, and classification can be determined on the basis of an amount of charge stored during the exposure time.

The 22nd embodiment using a classification operation circuit for performing multiclass classification operations in each embodiment described above will be described with reference to FIGS. 68A, 68B, and 68C.

In a multiclass classification operation, e.g., in classification of four classes, i.e., classes 1 to 4, when classes 2 and 3 are projected into a space of classification spectra calculated by the data of classes 1 and 4, boundaries between classes 1 and 2 and between classes 3 and 4 become vague, and classification precision may be degraded.

This embodiment can effectively perform classification without degrading the classification precision even in this case.

As shown in FIG. 68A, a classification operation circuit 28 of this embodiment comprises a luminance component extraction section 30, a classification operation section 32, and a classification determination section 34.

The arrangement of the classification operation section 32 used in this embodiment will be described with reference to FIG. 68B.

As shown in FIG. 68B, the classification operation section 32 of this embodiment comprises a d1 memory 2200 for storing a classification spectrum, a d2 memory 2201 for storing a classification spectrum, a switching unit 2202 for switching between outputs from the d1 and d2 memories 2200 and 2201, a multiplier 2203 for calculating the product between a classification spectrum and spectrum data from an unknown target object, a cumulative adder 2206 consisting of an adder 2204 and a memory 2205, a d1 memory 2210 for storing a classification spectrum, a d2 memory 2211 for storing a classification spectrum, a switching unit 2212 for switching between outputs from d1 and d2 memories 2213 and 2214, from d1 and d2 memories 2216 and 2217, and from the d1 and d2 memories 2210 and 2211, a switching unit 2215 for switching between outputs from the d1 and d2 memories 2213 and 2214, a switching unit 2218 for switching between outputs from the d1 and d2 memories 2216 and 2217, a classification spectrum selection circuit 2207 for selecting one of three classification spectra in accordance with a signal from the cumulative adder 2206, a multiplier 2223 for calculating the product between the selected classification spectra and the spectrum data from the unknown target object, and a cumulative adder 2226 consisting of an adder 2224 and a memory 2225.

The operation of the classification operation section 32 of this embodiment will be described below. In this case, the number of classes is 4, i.e., classes 1 to 4.

Assume that these four classes are distributed in a multi-dimensional space in an order of almost ascending class numbers, and that classification spectra $d1_{1-4}$ and $d2_{1-4}$ calculated from learning data of classes 1 and 2 are stored in the d1 memory 2200 and the d2 memory 2201, respectively.

Assume that classification spectra $d1_{1-2}$ $d2_{1-2}$ calculated from learning data of classes 1 and 2 are stored in the d1 memory 2210 and the d2 memory 2211, respectively. Classification spectra $d1_{2-3}$ and $d2_{2-3}$ calculated from learning data of classes 2 and 3 are stored in the d1 memory 2213 and the d2 memory 2214, respectively. Classification spectra $d1_{3-4}$ and $d2_{3-4}$ calculated from learning data of classes 3 and 4 are stored in the d1 memory 2216 and the d2 memory 2217, respectively.

In the classification operation section 32, each component (dimension) of the unknown data of the target object from the luminance component extraction section 30 is multiplied by the multiplier 2203 with that of the classification spectrum $d1_{1-4}$ from the d1 memory 2200.

The products of the above components are added to each other by the cumulative adder 2206, and the sum is input to the classification spectrum selection circuit 2207.

Consequently, the output from the cumulative adder 2206 represents the inner product value between the unknown data and the classification spectrum.

The switching unit 2202 is switched to obtain an inner product value for d2 in the same manner as described above, and the resultant inner product value is sent to the classification spectrum selection circuit 2207.

Figure 68C:
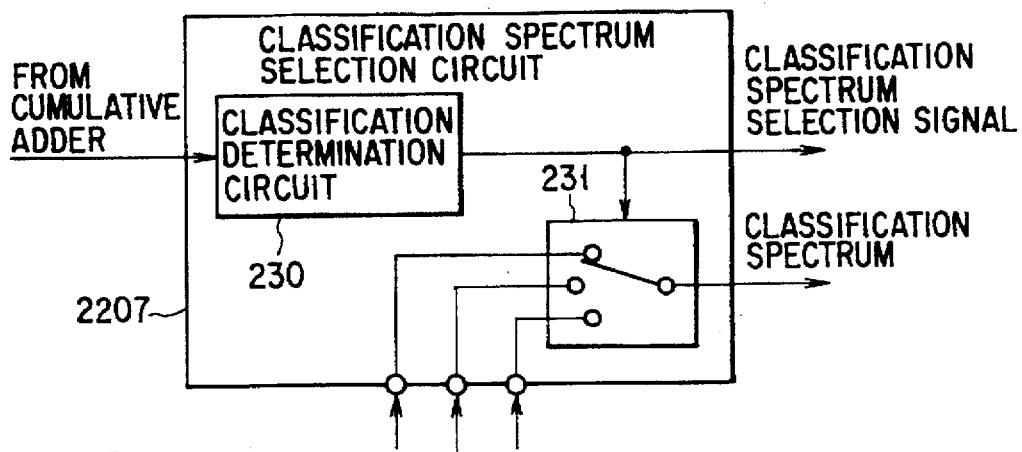
FIG. 68C is a block diagram showing a classification spectrum selection circuit of the 22nd embodiment.

As shown in FIG. 68C, the classification spectrum selection circuit 2207 comprises a classification determination circuit 230 and a selector 231. When the inner product value from the cumulative adder 2206 is added to the classification spectrum selection circuit 2207, coarse classification determination is performed in the classification determination circuit 230.

In this case, the unknown data is projected into a space constituted by the classification spectra $d1_{1-4}$ and $d2_{1-4}$ calculated from the data of classes 1 and 4, and the class of the unknown data is decided in accordance with the decided classification boundary.

In this case, boundaries, i.e., a "boundary close to class 1 from class 2", a "boundary between classes 2 and 3 from class 2", and a "boundary close to class 4 from class 3", are determined to classify data into three classes.

When a classification spectrum selection signal as an output from the classification determination circuit 230 represents the "boundary close to class 1 from class 2", the selector 231 outputs an input from the switching unit 2212 as a classification spectrum.

The classification spectra $d1_{1-2}$ and $d2_{1-2}$ are then selected, and the multiplier 223 and the cumulative adder 226 calculate the inner products between these spectra and the unknown data. The inner product values are supplied from the classification spectrum selection circuit 2207 to the classification determination section 34 together with the classification spectrum selection signal, thereby deciding the final class.

When the classification spectrum selection signal from the classification determination circuit 230 represents the "boundary between classes 2 and 3 from class 2", the selector 231 outputs an input from the switching unit 218 as a classification spectrum. However, when the classification spectrum selection signal represents the "boundary close to class 4 from class 3", the selector 231 outputs an input from the switching unit 2218 as a classification spectrum.

The optimal classification spectra are selected and subjected to an inner product operation.

In this embodiment, although the first classification spectrum is derived from the data of classes 1 and 4, this does not mean that data of the two classes at the end face of the distribution are used. In this sense, a classification spectrum obtained from the data of classes 2 and 3 may be used.

New class 1' as the sum of classes 1 and 2 and new class 4' as the sum of classes 3 and 4 may be defined, and classification spectra obtained using the data of these new classes may be used.

In this embodiment, classification determination is performed in two stages, but may be performed in three or more stages depending on the number of classes to be classified, thereby obtaining the same effect as described above, as a matter of course.

According to the 22nd embodiment, as described above, classification determination is performed in multiple stages.

Effective classification can be performed in multiclass classification without degrading the classification precision.

The 23rd embodiment using a classification operation circuit for performing multiclass classification operations in each embodiment described above will be described with reference to FIGS. 69A to 69D.

In a multiclass classification operation, e.g., in classification of three classes, i.e., classes 1 to 3, when class 3 is projected into a space of classification spectra calculated by the data of classes 1 and 2, the distributions of classes 2 and 3 overlap each other. Boundaries between the classes become vague, and classification precision may be degraded.

This embodiment can effectively perform classification without degrading the classification precision even in this case.

A classification operation circuit of this embodiment is shown in FIGS. 69C and 69D. The arrangement of a luminance component extraction section 30 will be described with reference to FIG. 69C.

As shown in FIG. 69C, the luminance component extraction section 30 used for a classification operation circuit 28 of this embodiment comprises a measurement region extraction section 36 for extracting measurement region data from image data in a frame memory, a luminance component averaging section 38 for calculating an average value of data obtained in all the measurement region, an illumination data memory 40W for storing reference plate data, a measurement data memory 40A for recording target object data, a correction circuit 42 for correcting the target object data with the reference plate data, and correction data memories 241, 242, and 243 for storing the corrected target object data.

The arrangement of a classification operation section 32 will be described with reference to FIG. 69D.

As shown in FIG. 69D, the classification operation section 32 used in this embodiment comprises a switching unit 251 controlled by a control circuit 26, a class selection circuit 252 connected to one output of the switching unit 251, a classification spectrum operation section 253 connected to the same output of the switching unit 251, two d1 memories 254 and 255 for storing classification spectra calculated in the classification spectrum operation section 253, a switching unit 256 for switching between the two d1 memories 254 and 255 in accordance with a signal from the control circuit 26, and an inner product operation circuit 257 for calculating an inner product between the output data and the other output of the switching unit 251.

Subsequently, the operations of the luminance component extraction section 30 and the classification operation section 32 of this embodiment will be described in each of the learning mode and the classification mode.

In the learning mode, known target object data is to be measured. Before (or at the same time) measurement of a target object, a reference plate is measured. The measured reference plate data is stored as image data in a frame memory 18 as described above. Data of a measurement region is read out from the frame memory 18 in the measurement region extraction section 36, an average value is calculated in all the measurement region in the luminance component averaging section 38, and the calculated value is stored in the illumination data memory 40W.

Data of a measurement region in the known target object data is read out in the measurement region extraction section 36, an average value is calculated for all the measurement region in the luminance component averaging section 38, and the calculated value is stored in the measurement data memory 40A, in the same manner as described above.

The correction circuit 42 corrects the data in the measurement data memory 40A with the data in the illumination data memory 40W, and the corrected data is written in the correction data memory for corresponding class.

Known data are measured by a predetermined number (e.g., N) of samples for each class, and the measured data are stored as corrected learning data in the corresponding correction data memories.

In the classification operation section in the learning mode, the switching unit 251 is set to the b side by the control circuit 26.

The data are read out from the correction data memories 241, 242, and 243 in an order named in the luminance component extraction section 30 in accordance with signals from the control circuit 26. The average spectra of the classes, difference spectra between the classes, and the norms of the difference spectra are calculated by the class selection circuit 252.

The class selection circuit 252 informs the control circuit 26 of a combination of the classes (assume a combination of classes 1 and 3 in this case) corresponding to the maximum norm of the difference spectrum.

The control circuit 26 sends signals to the correction data memories 241 and 243, and data are sequentially read out from the correction data memories 241 and 243. The read data are sent to the classification spectrum operation section 253 through the switching unit 251.

The classification spectrum operation section 253 calculates a classification spectrum using the FS transform, and the obtained classification spectrum is written in the d1 memory 254.

That is, the classification spectrum for maximizing a Fisher ratio between the classes having average spectra having the largest difference is calculated and written in the d1 memory 254.

Next, the class selection circuit 252 informs the control circuit 26 of a combination of the classes (assume a combination of classes 2 and 3 in this case) corresponding to the minimum norm of the difference spectrum.

The control circuit 26 sends signals to the correction data memories 242 and 243, and data in the correction data memories 242 and 243 are sequentially read out. The read data are sent to the classification spectrum operation section 253 through the switching unit 251.

The classification spectrum operation section 253 calculates a classification spectrum using the FS transform, and the obtained classification spectrum is written in the d1 memory 255.

That is, the classification spectrum for maximizing a Fisher ratio between the classes having average spectra closest to each other is calculated and written in the d1 memory 255.

The switching unit 251 is set to the a side. The inner product operation circuit 257 calculates inner products between data of the classes and classification spectra $d1_{1-3}$ and $d1_{2-3}$, and the calculated products are sent to the classification determination section 34.

The classification determination section 34 obtains the distributions of class data to set boundaries between the classes.

Figure 69A:
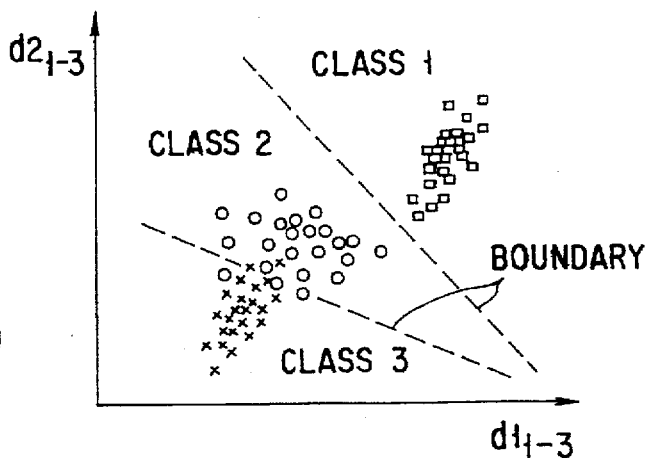
FIG. 69A is a view showing a learning data distribution according to a conventional method.
Figure 69B:
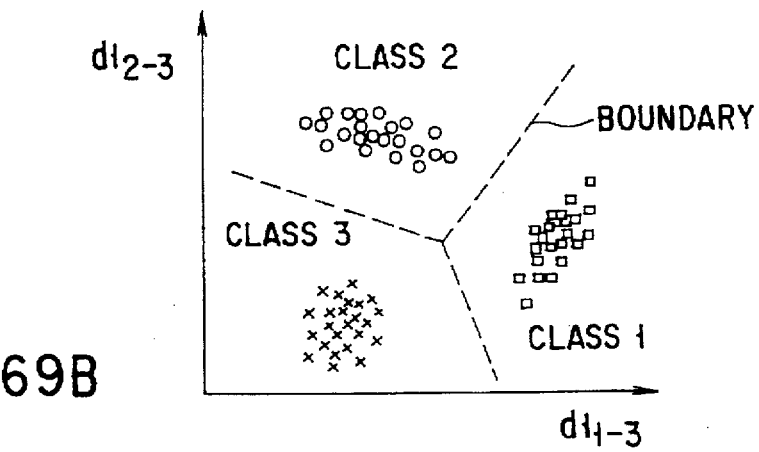
FIG. 69B is a view showing a learning data distribution according to 23rd embodiment of the present invention.
Figure 69:
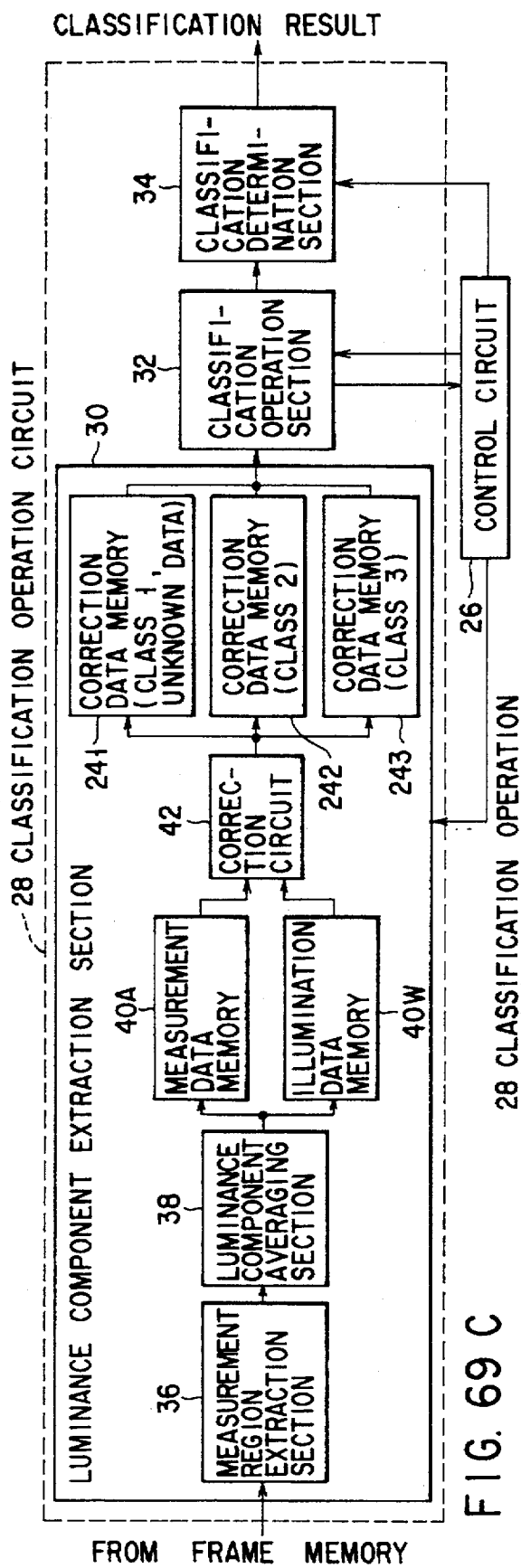
FIG. 69C is a block diagram of a luminance extraction section of the 23rd embodiment.
FIG. 69D is a block diagram of a classification operation section of the 23rd embodiment.
Figure 69:
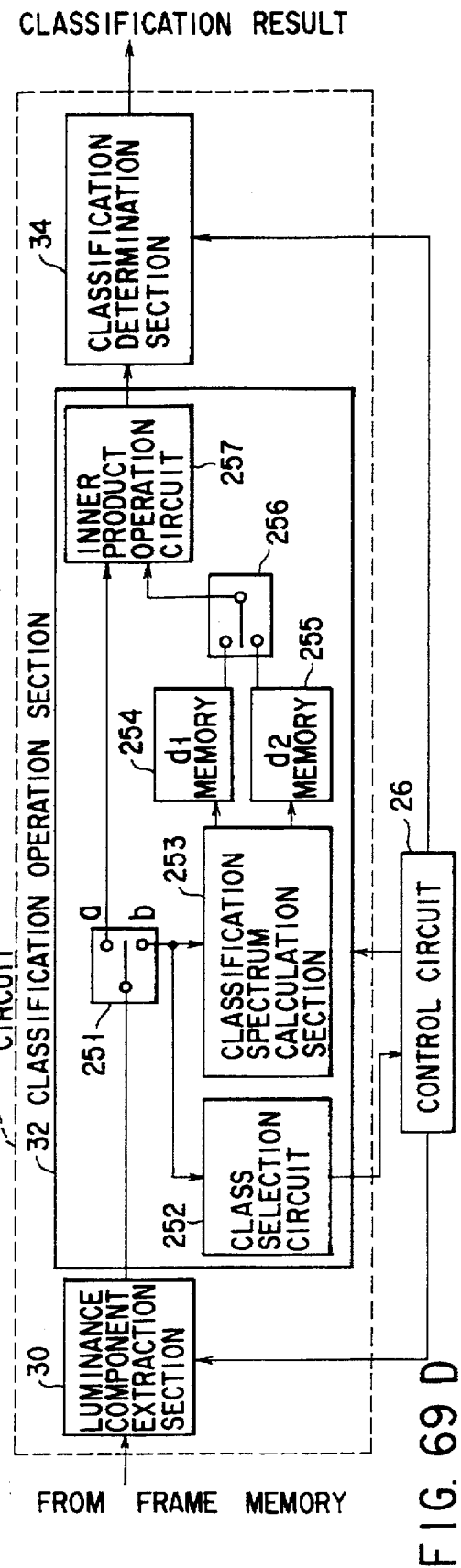

That is, class data are projected into a space constituted by the classification spectra $d1_{1-3}$ and $d1_{2-3}$ to set boundaries as shown in FIG. 69B.

The learning mode has been described above.

The operations of the respective sections in the classification mode will be described.

Also in the classification mode, the reference plate is measured, and stored in the illumination data memory 40W in the luminance component extraction section 30, in the same manner as in the learning mode.

On the other hand, in the same manner as in the learning mode, data of a measurement region of unknown target object data is averaged, stored in the measurement data memory, and corrected by the correction circuit 42 with the reference plate data stored in the illumination data memory 40W. The corrected data is stored in the correction data memory 241.

In the classification operation section 32, the switching unit 251 is set to the a side. The unknown data is sent from the correction data memory 241 in the luminance component extraction section 30 to the inner product operation circuit 257.

At the same time, the switching unit 256 is switched to the d1 memory 254 side.

Therefore, the inner product operation circuit 257 calculates an inner product value between the classification spectrum $d1_{1-3}$ and the unknown data.

The switching unit 256 is switched to the d2 memory 255 side. The inner product operation circuit 257 calculates an inner product value between the classification spectrum $d1_{2-3}$ and the unknown data. The inner products between the classification spectra $d1_{1-3}$ and $d1_{2-3}$ and the unknown data are sent to the classification determination section 34. The unknown data is classified in accordance with the classification boundaries set in the learning mode.

Figure 32:
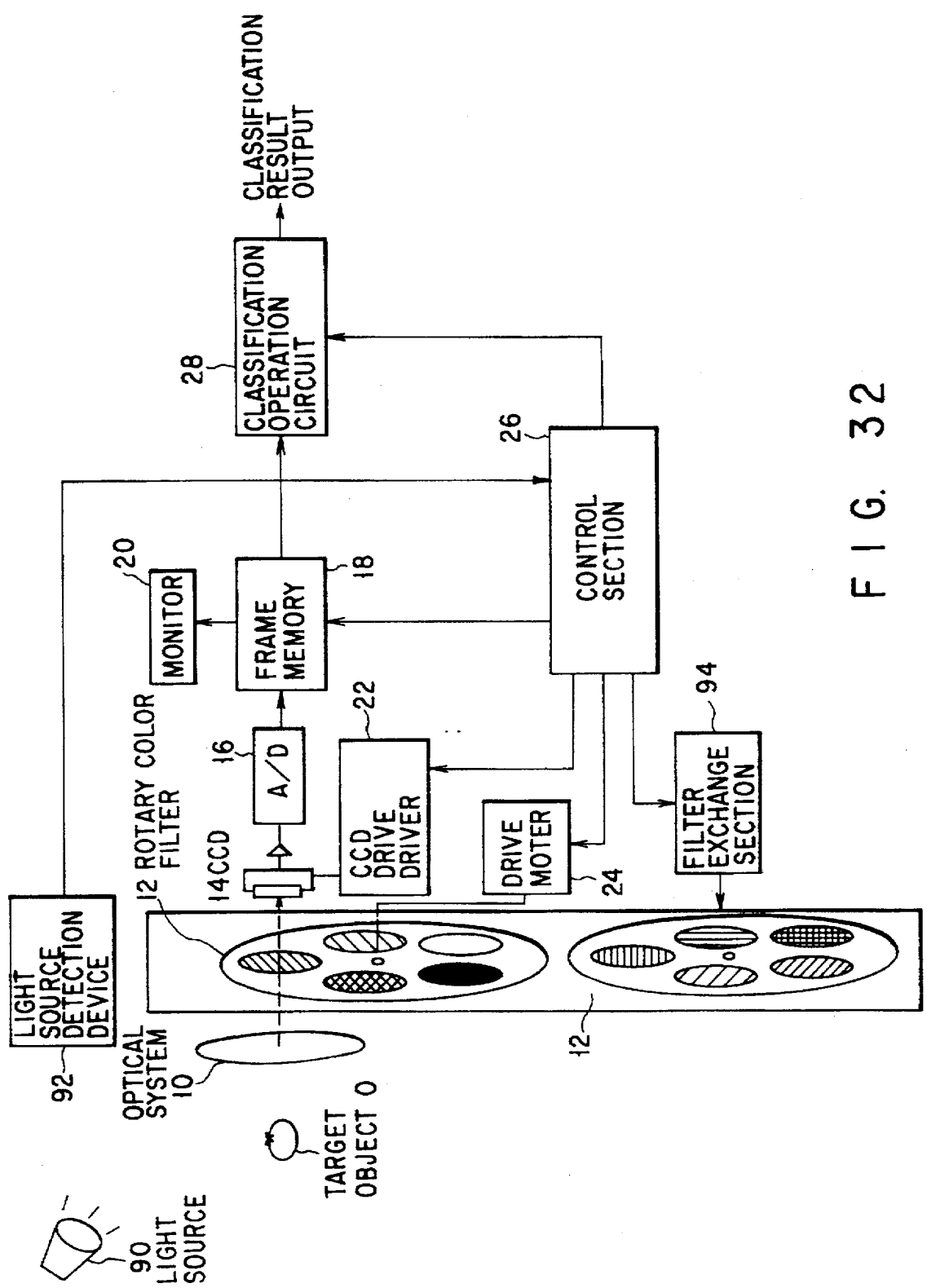
FIG. 32 is a view showing a modification of the color classification apparatus of the ninth embodiment.

According to the 23rd embodiment, classification boundaries used for classification determination are not obtained from a combination of a pair of classes (e.g., $d1_{1-3}$ and $d2_{1-3}$ obtained from classes 1 and 3), but are decided using classification spectra (as in this embodiment, $d1_{1-3}$ obtained from classes 1 and 3 and $d1_{2-3}$ obtained from classes 2 and 3) obtained from a combination of a plurality of pairs of classes. For this reason, as shown in FIG. 69A, the distributions of the classes will not overlap each other with respect to a boundary. As shown in FIG. 32B, boundaries capable of clearly separating the distributions of the classes from each other can be set, and multiclass classification can be performed with higher precision.

This embodiment uses the classification spectrum obtained from the maximum difference spectrum between classes and the classification spectrum obtained from the minimum difference spectrum between the classes. However, a classification spectrum obtained from the maximum difference spectrum and the second largest difference spectrum, and a classification spectrum obtained from the minimum difference spectrum and the second smallest difference spectrum may be used.

In addition, when data is projected on the classification spectrum d1 obtained first, the second classification spectrum may be obtained from a combination of the classes corresponding to the minimum Fisher ratio.

In this embodiment, two classification spectra are used. For example, when the number of classes for classification is large, the number of classification spectra is increased, thereby improving the classification precision.

The 24th embodiment using a classification operation circuit for performing multiclass classification operations in each embodiment described above will be described with reference to FIGS. 70A, 70B, and 70C.

In a multiclass classification operation, e.g., in classification of three classes, i.e., classes 1 to 3, when class 3 is projected into a space of classification spectra calculated by the data of classes 1 and 2, the distribution of class 2 may extend in comparison with the remaining two classes, as shown in FIG. 70A.

In this case, each boundary between the classes is a vertical bisector of a line connecting the centers of the distributions of classes. Even if a sample of class 2 is measured, it is undesirably determined as class 1 or class 2, as shown in FIG. 70A, resulting in degradation in classification precision.

This embodiment can effectively perform classification without degrading the classification precision even in this case.

A classification operation circuit of this embodiment is shown in FIG. 70C.

A classification determination section 34 used in a classification operation circuit 28 of this embodiment comprises a switching unit 280 for switching between data from a classification operation section 32 in accordance with modes (leaning mode, and classification mode), a statistic amount calculation section 281 for calculating average values and variance values of the classes, a boundary calculation section 282 for calculating boundaries from the calculated statistic amounts, a boundary memory 64 for storing the calculated boundaries, and a classification decision section 66 for comparing the data in the boundary memory 64 and measured unknown data to classify the unknown data.

The operation of the classification determination section 34 will be described in each of the learning mode and the classification mode.

In the learning mode, known target object data is to be measured. After the target object data is corrected for illumination in a luminance component extraction section 30, an inner product value between the corrected data and a classification spectrum is calculated in the classification operation section 32, and the calculated inner product value is sent to the classification determination section 34.

An inner product value of known data is a two-dimensional value. Inner product values corresponding to a predetermined number (e.g., N) of samples for each class are sent to the classification determination section 34.

In the classification determination section 34, the switching unit 280 is set to the b side. An average and variances of the sent inner product values of the known data corresponding to N samples are calculated for each class.

In the classification mode, inner product values between unknown data and d1 and d2 and the classification spectra are sent to the classification determination section 34.

In the classification determination section 34, the switching unit 280 is set to the a side. In the boundary calculation section 282, a homoscedastic line is drawn for each class, lines each connecting the intersection points of the homoscedastic lines serve as boundaries, and the obtained boundaries are written in the boundary memory 64.

In this manner, the 24th embodiment uses the statistic amount calculation section 281, and the classification boundaries used for classification determination are decided using variance values of all the classes. With this operation, as shown in FIG. 70A, the distributions of the classes will not overlap each other with respect to a boundary. As shown in FIG. 70B, boundaries capable of clearly separating the distributions of the classes from each other can be set, and multiclass classification can be performed with higher precision.

The 25th embodiment using a luminance component extraction section for setting an optimal measurement region used when a glossy target object is to be measured in each embodiment described above will be described with reference to FIGS. 71A to 70D.

In measurement of a glossy target object, if a glossy portion (regular reflection component) is included in a measurement region, colors of the target object are not accurately measured, and classification precision may be degraded.

Figure 71A:
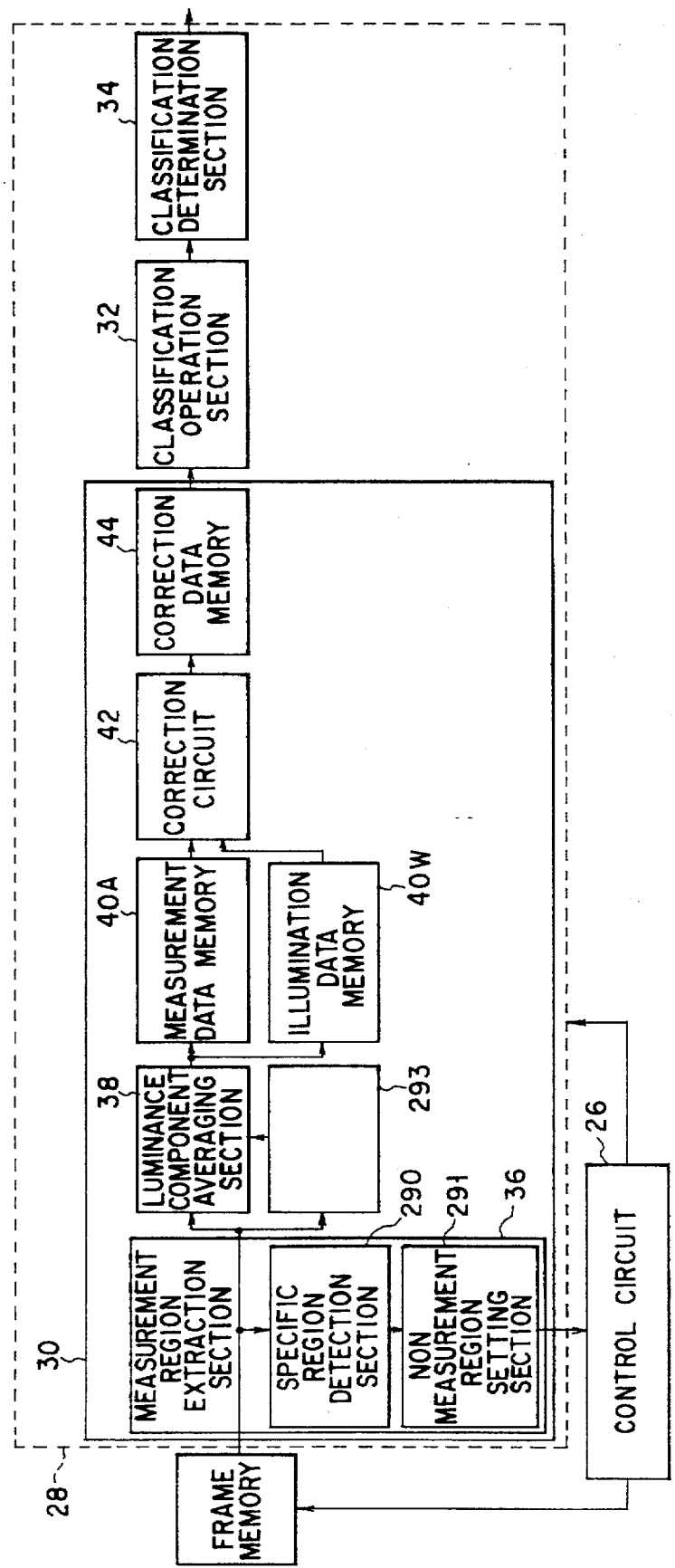
FIG. 71A is a block diagram showing a classification operation circuit of the 25th embodiment of the present invention.

A luminance component extraction section of this embodiment will be described with reference to FIG. 71A.

The luminance component extraction section of this embodiment comprises a measurement region extraction section 36, a luminance component averaging section 38, a pixel counting section 293, a measurement data memory 40A for temporality storing measurement target object data, an illumination data memory 40W for storing measurement reference plate data, a correction circuit 42 for correcting the target object data with the reference plate data, and a correction data memory 44 for storing the corrected target object data corresponding to a plurality of classes.

The measurement region extraction section 36 comprises a specific region detection section 290 and a non-measurement region setting section 291.

Figures 71B, 71C, 71D:
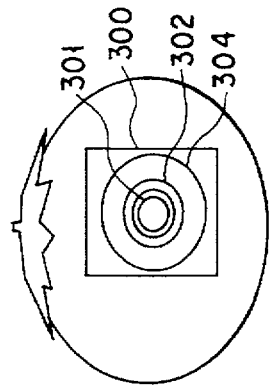
FIG. 71B is a view showing a target measurement object for explaining the operation of the 25th embodiment.
FIG. 71C is a block diagram showing the shape of a measurement region of the 25th embodiment.
FIG. 71D is a block diagram showing the shape of a measurement region of a modification of the 25th embodiment.

FIG. 71B shows a glossy target object.

Data of a predetermined measurement region 300 is loaded from the frame memory to the measurement region extraction section 36 by a control circuit 26.

The loaded data is input to the specific region detection section 290, and an abnormally bright region (regular reflection portion 301) with respect to its surrounding portion is detected.

The non-measurement region setting section 291 sets a range (non-measurement region 302) not used for measurement, with a margin as a predetermined number of pixels around the regular reflection pixels detected by the regular reflection detection section 290. The set range is sent to the control circuit 26 to change the measurement region.

Until regular reflection is not detected within the measurement region, an output from the luminance component averaging section 38 in the subsequent stage is controlled not to be validated in accordance with a signal from the control circuit 26.

The control circuit 26 jumps the pixels designated by the non-measurement region setting section 291 and reads out the data of the predetermined region from the frame memory again.

In this case, the regular reflection detection circuit 290 cannot find any regular reflection pixel, and the non-measurement region setting section 291 informs the control circuit 26 of the absence of any non-measurement region.

In this case, a new measurement region is shown in FIG. 71C.

The data of the target object whose non-measurement region is jumped have a smaller number of pixels than that of the predetermined measurement region. A total number of pixels of this target object data is counted by the pixel counting section 293. The luminance component averaging section 38 calculates an average value from the target object data and the number of pixels thereof. The average value is temporarily stored in the measurement data memory 40A.

The correction circuit 42 corrects the target object data from the measurement data memory 40A with the reference plate data from the illumination data memory 40W and the corrected data is stored in the correction data memory.

According to the 25th embodiment described above, the measurement region extraction section includes the specific region detection section 290 and the non-measurement region setting section 291. For this reason, when a target object is glossy and has a portion subjected to regular reflection, the regular reflection portion can be eliminated from the measurement region. Therefore, a good measurement can be performed without degrading classification precision.

In this embodiment, the measurement region is set prior to the actual measurement. If the regular reflection portion is present in the measurement region, this portion is eliminated. However, a modification for automatically performing all operations from setting of a measurement region will be described below.

If a target object or a measurement portion thereof has a spherical shape or a shape similar thereto, and the surface of the target object or measurement portion is glossy, the specific region detection section 290 detects a regular reflection region from the entire screen, and the non-measurement region setting section 291 sets a range (non-measurement region 302) not to be used for measurement, with a margin as a predetermined number of pixels around the regular reflection pixels detected by the specific region detection section 290, and a measurement region 304 around the non-measurement region 302 with a predetermined gap. The set non-measurement region 302 and the set measurement region 304 are sent to the controller 26.

Until the measurement region is decided, an output from the luminance component averaging section 38 in the subsequent stage is controlled not to be validated.

The control circuit 26 reads out data of the measurement region decided by the non-measurement region setting section 291.

The resultant new measurement region is shown in FIG. 71D.

The number of pixels may vary depending on the size and shape of the regular reflection portion. For this reason, the pixel counting section 293 obtains a total number of pixels. The luminance component averaging section 38 obtains an average value from the target object data and the number of pixels thereof. The average value is temporarily stored in the measurement data memory 40A.

The correction circuit 42 corrects the target object data from the measurement data memory 40A with the reference plate data from the illumination data memory 40W and the corrected data is stored in the correction data memory.

According to this modification, the measurement region extraction section includes the specific region detection section 290 and the non-measurement region setting section 291. A portion around the regular reflection portion of the target object is automatically extracted and measured. For this reason, even if the measurement region of the target object is spherical or has a shape similar thereto, the intensity of reflected light can be stabilized, and a good measurement can be performed. In addition, since the measurement region can be automatically set, the measurement can be facilitated, and the measurement time can be shortened.

The 26th embodiment for realizing high-speed classification operations in each embodiment described above will be described with reference to FIGS. 72A, 72B, 73A, 73B, and 74.

In a color classification apparatus using a plurality of bandpass filters, a certain bandpass filter of the bandpass filters may hardly affect classification depending on measurement target objects. An operation speed can be increased by removing data of this bandpass filter.

FIG. 72A is a view showing the arrangement of a classification operation circuit of this embodiment.

A classification operation circuit 28 of this embodiment comprises a luminance component extraction section 30, a classification operation section 32, and a classification determination section 34. The classification operation section 32 comprises a switching unit 310, a classification spectrum calculation section 311, a Fisher ratio calculation section 312, a classification spectrum inspection section 313, a d1 memory 314 for storing a classification spectrum, a d2 memory 315 for storing a classification spectrum, a switching unit 316, and an inner product operation circuit 317.

Figure 72B:
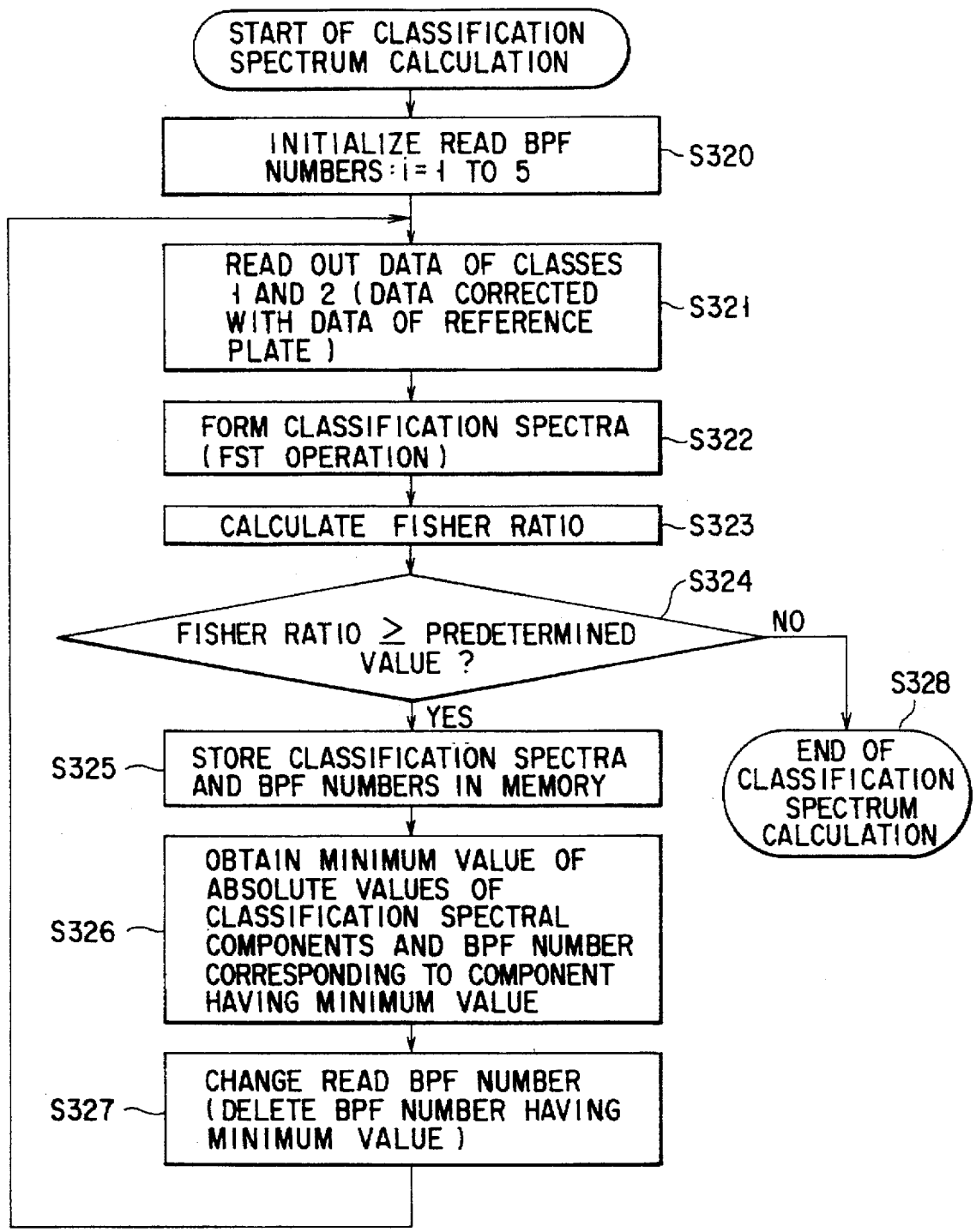
FIG. 72B is a flow chart for explaining the operation of the 26th embodiment.

FIG. 72B shows the flow of processing for calculating classification spectra having a minimum dimensionality by removing an unnecessary bandpass filter.

As a color classification apparatus having five bandpass filters, the operation of the classification calculation circuit of this embodiment shown in FIG. 72A will be described with reference to FIG. 72B.

When data are input using five bandpass filters, the data are processed as 5-dimensional data.

When classification spectra for classes are formed from N 5-dimensional sample data using the FS transform, the obtained classification spectra are also 5-dimensional data. Components of the dimensionality correspond to the five bandpass filters.

FIG. 72B shows a method of calculating classification spectra in the learning mode.

In the learning mode, the switching unit 310 is set to the b side first.

The control circuit 26 is set to read all the 5-dimensional measurement data corrected with reference plate data for classes 1 and 2 (step 320). The data of classes 1 and 2 are read out from the luminance component extraction section 30 (step 321).

In the classification spectrum calculation section 311, classification spectra are calculated with the read data (step 322). In the Fisher ratio calculation section, a Fisher ratio is calculated from the classification spectra and the measurement data from the luminance component extraction section 30 (step 323).

The classification spectrum inspection section 313 checks whether the Fisher ratio is larger than a predetermined value (step 324). If the Fisher ratio is larger than the predetermined value, the Fisher ratio is written in the d1 memory 314 and the d2 memory 315, and at the same time the control circuit is caused to obtain the numbers of the bandpass filters used out of the five bandpass filters (step 325). Sequentially, absolute values of the classification spectral components corresponding to the bandpass filters are checked to obtain the filter number corresponding to the minimum absolute value (step 326). The obtained filter number is sent to the control circuit 26.

When the Fisher ratio is smaller than the predetermined value, the classification spectrum inspection section 313 does not write the classification spectrum in the d1 memory 314 and the d2 memory 315, but sends a signal indicating end of classification spectrum calculation to the control circuit 26 (step 328).

The control circuit 26 is set to read data of the filters except for that of the filter whose number is sent from the classification spectrum inspection section 313 (step 327). Data of the set filters are read out again to form classification spectra, a Fisher ratio is calculated, and the Fisher ratio is compared with the predetermined number (steps 321 to 324).

That is, until the Fisher ratio is larger than the predetermined value, data of the bandpass filter corresponding to the minimum absolute value of the classification spectral component is omitted. When the Fisher ratio is smaller than the predetermined value, the classification spectrum is not saved, and the processing is ended.

On the other hand, in the classification mode, when the control circuit controls such that only data of the required bandpass filters are input, a data amount subjected to input and classification operations is decreased, thereby realizing high-speed classification determination.

When bandpass filter data is to be eliminated, bandpass filter data corresponding to a smaller classification spectral component is eliminated first. That is, the component having a small difference between two classes is eliminated. Therefore, elimination of this component does not greatly affect the classification results.

In the 26th embodiment, the classification spectrum inspection section and the Fisher ratio calculation section are arranged, and the minimum number of bandpass filters is obtained within the range wherein the Fisher ratio in the calculated classification spectrum is not smaller than the predetermined value. With this arrangement, since the dimensionality of the classification spectra used for classification operation can be lowered to the minimum number without degrading the classification precision, higher-speed classification determination can be realized in the classification mode.

In this embodiment, a bandpass filter corresponding to the smallest absolute value of a classification spectral component is eliminated first. Alternatively, a bandpass filter corresponding to the smallest absolute value of a difference spectral component may be eliminated.

Figure 73B:
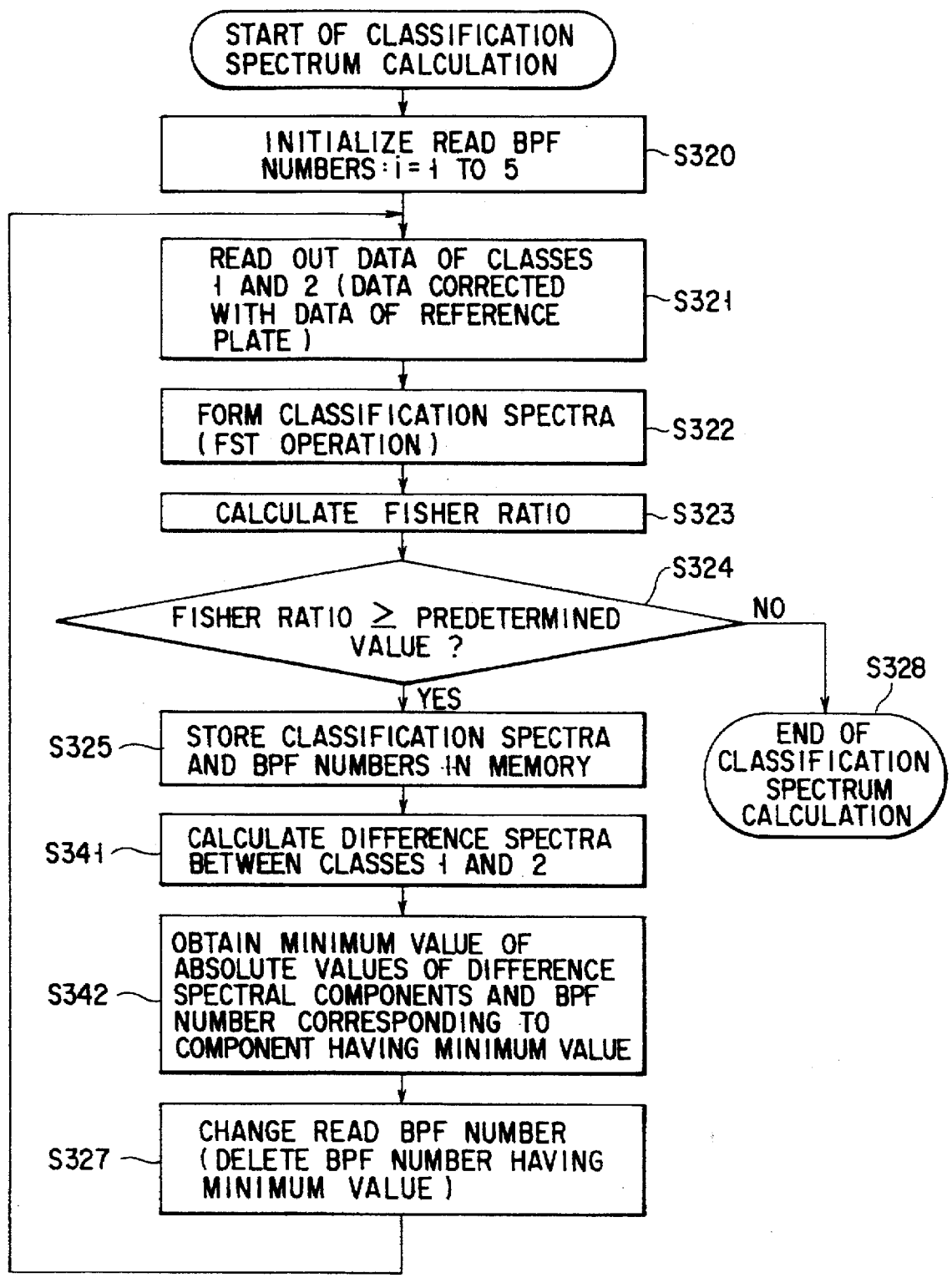
FIG. 73B is a flow chart for explaining the operation of the first modification of the 26th embodiment.

FIGS. 73A and 73B show one of modifications of this embodiment. In a classification operation circuit 28 shown in FIG. 73A, a difference spectrum calculation section 331 is added to the classification operation section 32 in FIG. 72A, and a difference spectrum inspection section 332 is arranged in place of the classification spectrum inspection section 313. A flow chart shown in FIG. 73B employs step 341 of calculating a difference spectrum between two classes, and step 342 of checking difference spectral components and obtaining the number of a bandpass filter corresponding to the minimum absolute value in place of step 326 in FIG. 72B.

In this manner, since the value of the difference spectrum between two classes which is close to 0 is a component having a small difference between the classes, data of a bandpass filter corresponding this component can be omitted.

Similarly, data of a bandpass filter corresponding to a spectral component close to 0 before correction can be eliminated.

Figure 74B:
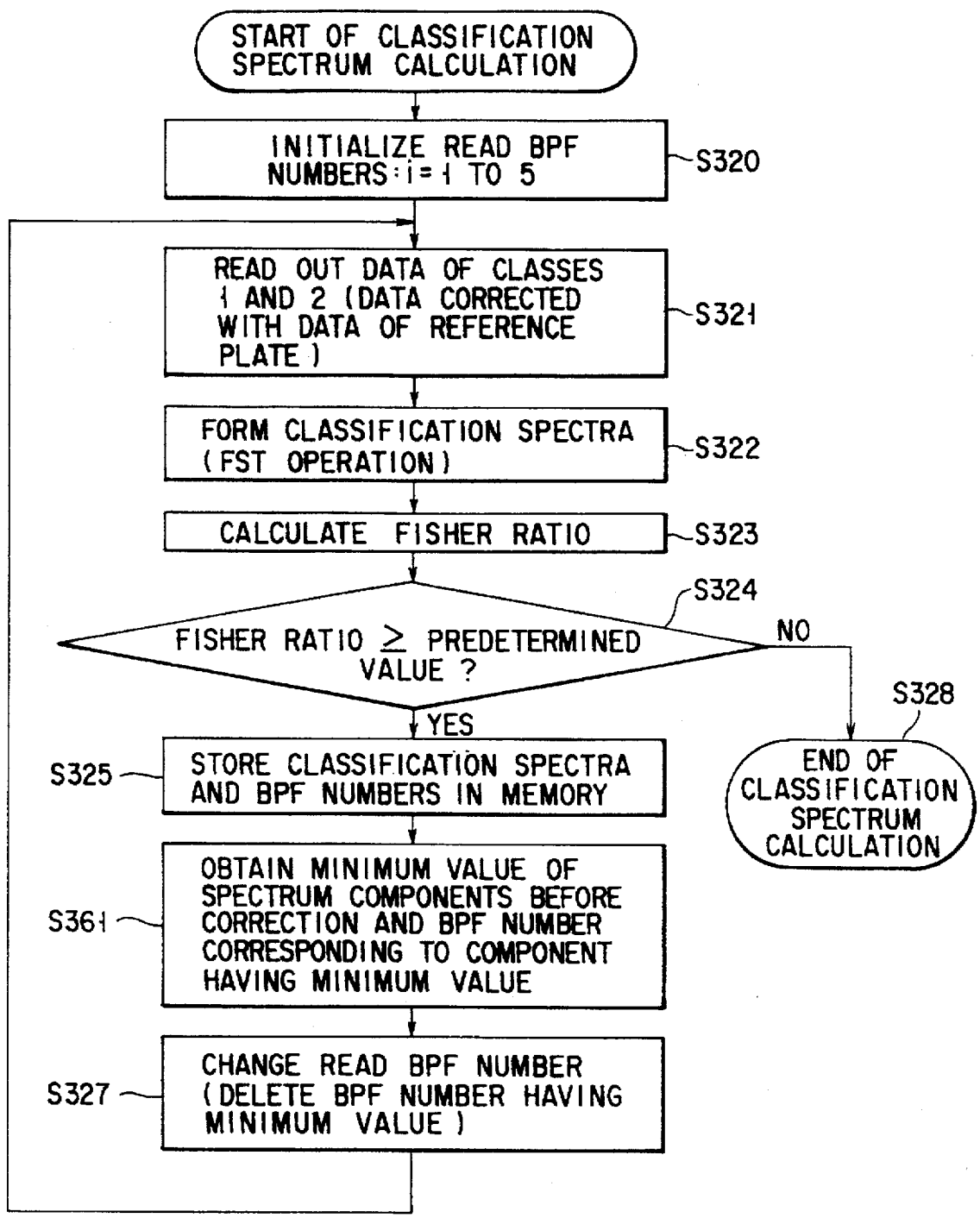
FIG. 74B is a flow chart for explaining the operation of the second modification of the 26th embodiment.

FIGS. 74A and 74B also show a modification of this embodiment. In a classification operation circuit 28 shown in FIG. 74A, a spectrum inspection section 351 is arranged in place of the classification spectrum inspection section 313 of the classification operation section 32, and the input of the spectrum inspection section 351 is connected to the output of a measurement data memory (memory in which reference plate data before correction is stored; not shown) in the luminance component extraction section 30. A flow chart shown in FIG. 74B employs step 361 of obtaining the number of a bandpass filter corresponding to the minimum value of a spectral component before correction, in place of step 326 in FIG. 72B.

Since almost all data of bandpass filters corresponding to spectral components close to 0 are noise from an image pickup element, elimination of these data hardly affects the classification results, and the dimensionality of the classification spectra (i.e., the number of bandpass filters) can be lowered within the range wherein the Fisher ratio is kept higher than the predetermined value.

In this embodiment, data of a bandpass filter corresponding to the minimum absolute value of a classification spectral component is eliminated, or as the modifications of this embodiment, data of a bandpass filter corresponding to the minimum absolute value of a difference spectral component or corresponding to the minimum spectral component before correction is eliminated. These operations need not be separately performed, but the dimensionality of the classification spectra (i.e., the number of bandpass filters) can be lowered in consideration of all the operations, thereby realizing high-speed classification determination without degrading the classification precision.

The 27th embodiment capable of accurately classifying various target objects will be described with reference to FIGS. 75A and 75B.

A color classification apparatus of this embodiment will be described with reference to FIG. 75A.

The color classification apparatus of this embodiment comprises a housing 1, an optical system 10, an image pickup element 14 on which light reflected by a target object is focused by the optical system, a rotary color filter 12 (see FIG. 39) located between the optical system 10 and the image pickup element 14 and having five bandpass filters on its circumference, a motor 24 for driving the rotary color filter 12, a motor drive circuit 124, a filter position sensor 123 for detecting the rotation position of the rotary color filter 12, an image pickup element drive circuit 22, an A/D converter 16 for converting a video signal from the image pickup element 14 into a digital signal through an amplifier 15, a frame memory 18 for storing the digital video signal, an image processing circuit 371 for performing various processing on the image data stored in the frame memory 18 and outputting a feature amount of the image, a classification operation circuit 28 for classifying the target object using data from the frame memory 18 and data from the image processing circuit 371, and a control circuit 26 for controlling these units.

The classification operation circuit 28 of this embodiment comprises a luminance component extraction section 30, a spectrum expansion section 372, a classification operation section 32, and a classification determination section 34, as shown in FIG. 75B.

The control circuit 26 sends a signal to the motor drive circuit 124 such that the rotary color filter 12 is synchronized with exposure of the image pickup element 14 while observing an output from the filter position sensor 123.

The image of the target object focused on the image pickup element 14 is converted into a photoelectric signal, and the photoelectric signal is output as a video signal. The video signal is converted into a digital signal by the A/D converter 16 through the amplifier 15. The digital signal is temporarily stored in the frame memory 18.

The image of the measurement area represented by the image signal stored in the frame memory 18 is subjected to various processing in the image processing circuit 371. A feature amount of the image is extracted and sent to the classification operation circuit 28.

The feature amount of the image can be a differential value, a space frequency component, an orthogonal transform coefficient, each feature amount obtained using a simultaneous incidence matrix, a density histogram, a line or edge, a correlation value with a specific pattern, or the like.

The image signal is input from the frame memory 18 to the classification operation circuit 28, and an average value in the measurement region is obtained for each bandpass filter (a total of five bandpass filters) in the luminance component extraction section 30, thereby obtaining 5-dimensional spectrum data.

In this case, the illumination light is corrected and normalized, as needed.

The spectrum expansion section 372 in the next stage synthesizes the 5-dimensional spectrum data obtained by the five bandpass filters and P-dimensional data as the feature amount of the image from the image processing circuit 371. The resultant data are sent as 5+P-dimensional expanded spectra to the classification operation section 32.

In the learning mode, the classification operation section 32 forms 5+P-dimensional classification spectra from the transferred data of the samples having the number N for each of the two classes and sends them to the classification determination section 34 together with data.

In this case, the data are normalized, as needed, so as to obtain a predetermined weighting value between the feature amounts of the image obtained from the bandpass filters through the spectrum image processing circuit.

The classification determination section 34 decides classification boundaries and stores them.

In the classification mode, the classification operation section 32 calculates inner products between 5+P-dimensional data of a target object sent as described above and the classification spectra calculated in the learning mode, and sends the results to the classification determination section 34.

The classification determination section 34 classifies the target object on the basis of the classification boundaries stored in the learning mode, and outputs the determination result.

According to the 27th embodiment, the image processing circuit 371 is arranged in the next stage of the frame memory 18, and the spectrum expansion section 372 is located in the classification operation circuit 28. With this arrangement, not only colors but also the surface shape and texture of a target object are reflected, thereby performing a good measurement with a high precision.

The 28th embodiment capable of visually recognizing classification results displayed by a monitor display will be described with reference to FIGS. 76A and 76B.

A color classification apparatus of this embodiment will be described with reference to FIG. 76A.

The color classification apparatus of this embodiment comprises a housing 1, an optical system 10, an image pickup element 14 on which light reflected by a target object is focused by the optical system, a rotary color filter 12 (see FIG. 39) located between the optical system 10 and the CCD 14 and having five bandpass filters on its circumference, a drive motor 24 for driving the rotary color filter 12, a motor drive circuit 124, a filter position sensor 123 for detecting the rotation position of the rotary color filter 12, an image pickup element drive circuit 22, an A/D converter 16 for converting a video signal from the image pickup element 14 into a digital signal through an amplifier 15, a frame memory 18 for temporarily storing the digital video signal, a color synthesis circuit 381 for synthesizing image data to be output to a monitor from image data stored in the frame memory 18, a frame memory 382 for a monitor output, a classification operation circuit 28 for classifying the target object using data from the frame memory 18, and a control circuit 26 for controlling these units.

Figure 76B:
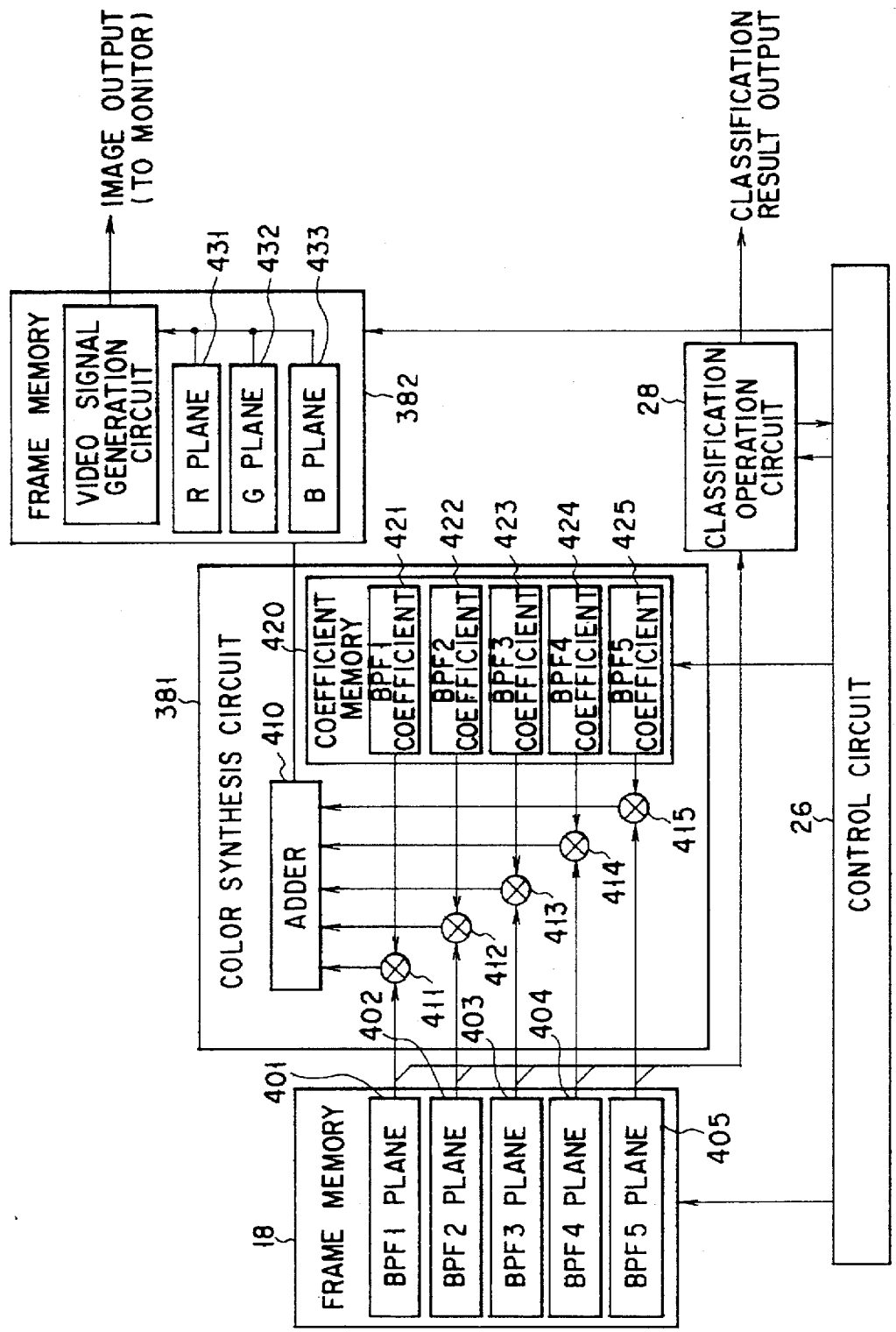
FIG. 76B is a block diagram showing a color synthesis circuit of the 28th embodiment.
Figure 77:
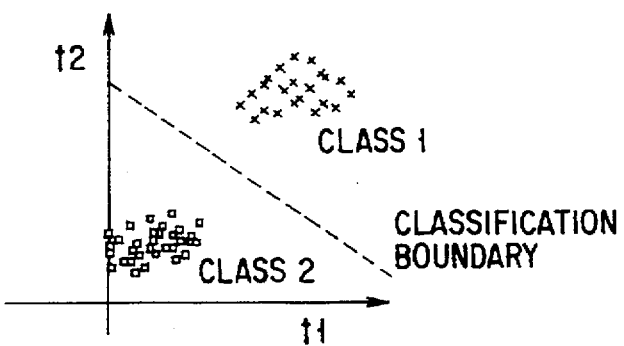
FIG. 77 is a view for explaining a classification boundary.
Figure 78:
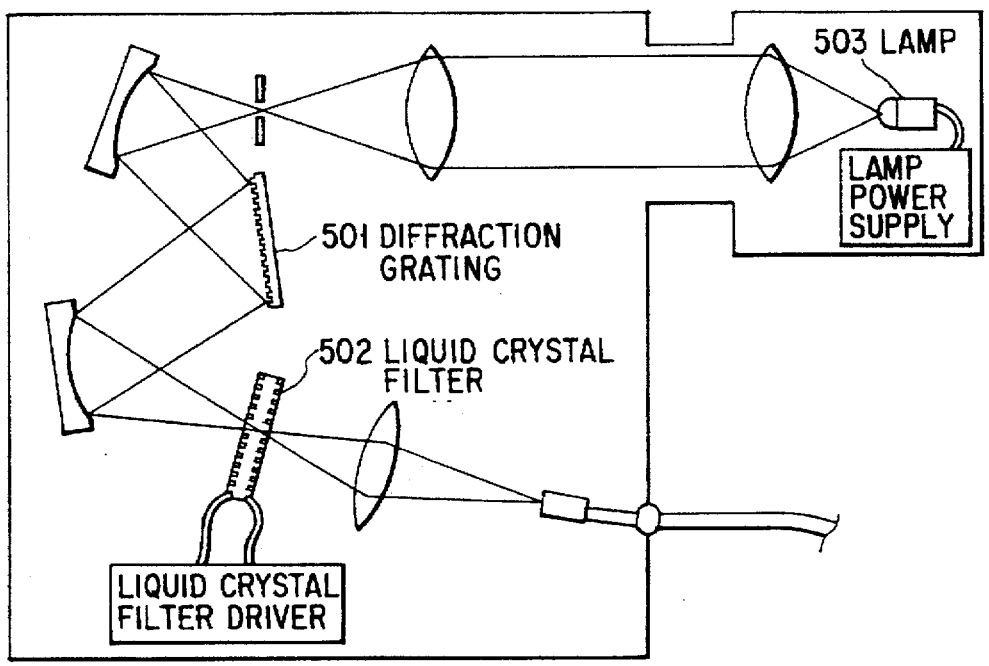
FIG. 78 is a view showing the arrangement of a conventional color identification apparatus.
Figure 79:
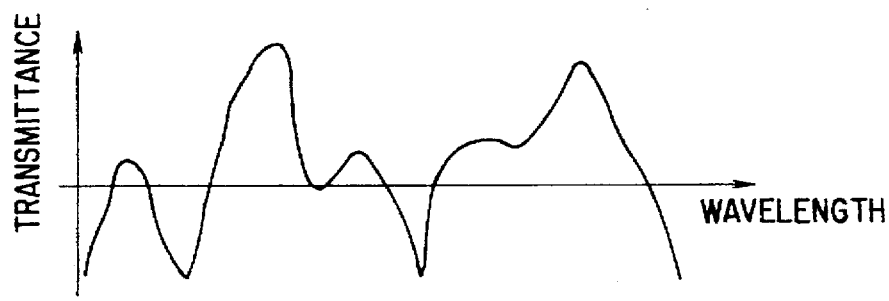
FIG. 79 is a view showing a classification spectrum.

The arrangement of the frame memory 18, the color synthesis circuit 381, and the frame memory 382 of this embodiment is shown in FIG. 76B.

The frame memory 18 comprises a BPF 1 plane 401, a BPF 2 plane 402, a BPF 3 plane 403, a BPF 4 plane 404, and a BPF 5 plane 405 corresponding to the respective bandpass filters.

The color synthesis circuit 381 comprises a coefficient memory 420 storing coefficients (BPS coefficients 421 to 425) for being multiplied with outputs from the BPF 1 planes 401 to 405 of the frame memory 18, multipliers 411 to 415 which receive corresponding pairs of the outputs from the BPF planes 401 to 405 and the BPS coefficients 421 to 425 stored in the coefficient memory 420, and an adder 410 for adding the outputs from the multipliers 411 to 415.

The frame memory 382 is for outputting data to a TV monitor, and comprises planes 431 to 433 corresponding to R, G, and B components, and a video signal generation circuit 434 for reading data from the memory and converting it into a video signal which can be input to the TV monitor.

The operation of the color classification apparatus of this embodiment will be described.

The control circuit 26 sends a signal to the motor drive circuit 124 such that the rotary color filter 12 is synchronized with exposure of the image pickup element 14 while observing an output from the filter position sensor 123.

The image of the target object focused on the image pickup element 14 is converted into a photoelectric signal, and the photoelectric signal is output as a video signal. The video signal is converted into a digital signal by the A/D converter 16 through the amplifier 15. The digital signal is temporarily stored in the frame memory 18.

The color synthesis circuit 381 converts image data from the frame memory 18 into data having another form which can be input to the TV monitor. The converted data is written in the frame memory 382 for the TV monitor display, and further converted into a video signal which can be input to the TV monitor by the video signal generation circuit 434 to be output to the TV monitor.

The image signal is input from the frame memory 18 to the classification operation circuit 28, and an average value in the measurement region is obtained for each bandpass filter (a total of five bandpass filters) in a luminance component extraction section 30, thereby obtaining 5-dimensional spectrum data.

In this case, the illumination light is corrected and normalized, as needed.

In the learning mode, a classification operation section 32 forms 5-dimensional classification spectra from the transferred data of the samples having the number N for each of the two classes and sends them to a classification determination section 34 together with data.

The classification determination section 34 decides classification boundaries and stores them.

In the classification mode, the classification operation section 32 calculates inner products between 5-dimensional data of a target object sent as described above and the classification spectra calculated in the learning mode, and sends the results to the classification determination section 34.

The classification determination section 34 classifies the target object on the basis of the classification boundaries stored in the learning mode, and outputs the determination result.

The operation of the color synthesis circuit 381 as a feature of this embodiment will be described in detail.

Data of the five bandpass filters are stored in the BPF planes 401 to 405 in the frame memory 18 in an order named.

The coefficients (BPS coefficients 421 to 425) for being multiplied with data of the BPF planes are stored in the coefficient memory 420.

The BPS coefficients 421 to 425 are multiplied with the corresponding data of the BPF planes by the multipliers 411 to 415.

The plane data multiplied with the coefficients by the multipliers 411 to 415 are added each other by the adder 410.

The resultant data is written in one, indicated by the control circuit 26, of the R plane 431, the G plane 432, and the B plane 433 in the frame memory 382.

The video signal generation circuit 434 converts data in each plane into a signal which can be input to the TV monitor, and the converted signal is output on the TV monitor.

In the learning mode, coefficients approximating a spectral characteristic of an R component of the monitor are written in the coefficient memory 420 from spectral transmission characteristics of the bandpass filters. The obtained coefficients are multiplied with the data in the planes by the multipliers 411 to 415, and the products are added each other by the adder 410. The sum is written in the R plane in the frame memory 382.

Coefficients approximating a spectral characteristic of a G component of the monitor are written in the coefficient memory 420. An output from the adder 410 is written in the G plane 432.

Coefficients approximating a spectral characteristic of a B component of the monitor are written in the coefficient memory 420. An output from the adder 410 is written in the B plane 433.

The video signal generation circuit 434 converts the data in each plane into a signal which can be input to the TV monitor, and the converted signal is output on the TV monitor.

As a result, the target object during measurement is displayed on the monitor with a good reproducibility.

In the classification mode, the classification operation circuit 28 sends classification spectrum data to the control circuit 26. The control circuit 26 normalizes classification spectral components corresponding to the bandpass filters to 0 to 1, and the obtained data are written in the coefficient memory 420. An output from the adder 410 is written in the R plane 431.

The coefficients written in the coefficient memory 420 are subtracted by 1, and the resultant coefficients are written in the coefficient memory 420.

An output from the adder 410 is written in the G plane 432.

The video signal generation circuit 434 converts the data in each plane into a signal which can be input to the TV monitor, and the converted data is output on the TV monitor.

A video signal of a target object to be classified into class 1 is displayed reddish on the monitor, a video signal of a target object to be classified into class 2 is displayed greenish, and a video signal of a target object between classes 1 and 2 is displayed yellowish.

According to the 28th embodiment, the planes corresponding to the bandpass filters are formed in the frame memory 18, and a product obtained by multiplying a coefficient with data of each plane by the color synthesis circuit 381 is written in the corresponding plane in the TV monitor display frame memory 382. For this reason, the classification results can be displayed in different colors on the monitor and can be visually recognized.

According to this embodiment, a color display of a normal TV image or the like can also be performed, and the target object can be naturally checked.

In this embodiment, the R plane 431 and the G plane 432 are used in the frame memory 382 in the classification mode. However, the present invention is not limited to this. When any of planes is used, the same effect can be obtained, as a matter of course.

As has been described above, according to the 12th to 28th embodiments, a plurality of bandpass filters having different bands are prepared, and arranged between the target object and the image pickup means. In addition, classification spectra for classification using a statistic technique are calculated by the classification means from light spectra reflected by the target object picked up by the image pickup means, and the target object is classified using the classification spectra. With this arrangement, there is provided a simple, low-cost color classification apparatus having a high resistance to mechanical vibrations and capable of properly performing color classification even if a light source is not specified and its spectrum changes.

What is claim is:

1. A color classification apparatus comprising:

image pickup means for picking up a target object;

filter means for changing band characteristics, said filter means being arranged between the target object and said image pickup means; and classification means for calculating a classification spectrum for classifying a spectrum of light reflected by the target object and picked up by said image pickup means, said classification means classifying the target object using the classification spectrum, wherein said classification means comprises normalization means for normalizing both a spectral characteristic and a luminance of a light source which illuminates the target object so as to account for different light sources.

2. A color classification apparatus according to claim 1, wherein said classification means comprises reference plate data storage means for storing data obtained when a predetermined reference plate is picked up by said image pickup means, and wherein said normalization means normalizes the spectral characteristic and the luminance of the light source based on data stored in the reference plate storage means.

3. A color classification apparatus according to claim 2, wherein:

said image pickup means picks up light reflected by the target object;

said filter means comprises a plurality of bandpass filters having different bands and arranged between the target object and said image pickup means; and said classification means calculates a classification spectrum for classification using a statistic technique from a spectrum of the light reflected by the target object and picked up by said image pickup means.

4. A color classification apparatus according to claim 3, wherein said classification means comprises:

storage means for storing a spectrum of light reflected by a known-class target object picked up by said image pickup means;

classification spectrum calculation means for calculating the classification spectrum from the spectrum of light reflected by the known-class target object stored in said storage means; and means for classifying an unknown-class target object picked up by said image pickup means using the classification spectrum calculated by said calculation means.

5. A color classification apparatus according to claim 4, wherein said classification spectrum calculation means comprises Foley Sammon transform operation means.

6. A color classification apparatus according to claim 4, wherein said classification spectrum calculation means comprises Hotelling Trace Criterion operation means.

7. A color classification apparatus according to claim 4, wherein said classification spectrum calculation means comprises difference spectrum calculation means.

8. A color classification apparatus according to claim 4, wherein said classification spectrum calculation means comprises orthogonal complement calculation means.

9. A color classification apparatus according to claim 3, wherein said classification means comprises:
 a plurality of storage means which store, in advance, spectra of light components reflected by known-class target objects having different classes;
 selective output means for outputting the stored spectrum of reflected light by properly selecting said storage means; calculation means for calculating the classification spectrum from the spectrum of reflected light output by said selective output means; and
 means for classifying an unknown-class target object picked up by said image pickup means using the classification spectrum calculated by said calculation means.

10. A color classification apparatus according to claim 3, wherein said plurality of bandpass filters have bands and amplitudes calculated from data obtained by picking up a spectrum of light reflected by a target object at a predetermined wavelength interval.

11. A color classification apparatus according to claim 3, further comprising means for controlling a transmittance or an exposure time of each of said plurality of bandpass filters.

12. A color classification apparatus according to claim 3, wherein said plurality of bandpass filters are arranged such that a spectrum of light reflected by a known-class target object is picked up in advance, statistic processing is performed using Foley Sammon transform to calculate a classification spectrum, and the classification spectrum is approximated when a light source for illuminating the target object is specified.

13. A color classification apparatus according to claim 3, wherein said image pickup means comprises image pickup elements having the number corresponding to said plurality of bandpass filters.

14. A color classification apparatus according to claim 3, wherein said plurality of bandpass filters comprise filter means having a predetermined number of bandpass filters and bandpass filter switching means for sequentially inserting and arranging each bandpass filter between the target object and said image pickup means.

15. A color classification apparatus according to claim 3, wherein said plurality of bandpass filters are constituted by a plurality of pairs of filter means each having a predetermined number of bandpass filters, and
 said color classification apparatus comprises:
  a light source for illuminating the target object;
  light source detection means for detecting a type of said light source; and
  second switching means for selectively and properly inserting and arranging one of said plurality of pairs of filter means between the target object and said image pickup means in accordance with the type of said light source detected by said light source detection means.

16. A color classification apparatus according to claims 14 or 15, wherein said filter means is constituted by filter means having a rotary color filter obtained by arranging a predetermined number of bandpass filters on a circumference.

17. A color classification apparatus according to claim 3, wherein said classification means comprises:
 classification operation means for calculating the classification spectrum for classification using the statistic technique from the spectrum of light reflected by the target object picked up by said image pickup means, and calculating an inner product value between the classification spectrum and the spectrum of light reflected by the target object; and
 classification determination means, including a neural network, for classifying the target object using the inner product value from said classification operation means.

18. A color classification apparatus according to claim 17, wherein said classification determination means comprises:
 table forming means for forming a classification table using the neural network obtained by learning upon picking up a known-class target object by said image pickup means; and
 means for classifying an unknown-class target object picked up by said image pickup means using the classification table formed by said table forming means.

19. A color classification apparatus according to claim 3, further comprising a mask filter or an image shift correction circuit for correcting a shift between images picked up by said plurality of bandpass filters.

20. A color classification apparatus according to claim 3, wherein, in classification of a plurality of classes, said classification means comprises means for obtaining a classification spectrum utilizing Foley Sammon transform, Hotelling Trace Criterion, a difference spectrum, or an orthogonal complement using arbitrary two of the plurality of classes.

21. A color classification apparatus according to claim 2, wherein:
 said image pickup means picks up a light component reflected by the target object;
 optical means is provided for focusing the light component reflected by the target object on said image pickup means;
 said filter means comprises a plurality of bandpass filters having different bands and arranged between the target object and said image pickup means; and
 said classification means calculates a classification spectrum for classification using a statistic technique from a spectrum of the light component reflected by the target object and picked up by said image pickup means, and performs said classification for a plurality of classes on the target object using the classification spectrum.

22. A color classification apparatus according to claim 2, wherein:
 said image pickup means picks up a light component reflected by the target object;
 optical means is provided for focusing the light component reflected by the target object on said image pickup means;
 said filter means comprises a band variable bandpass filter capable of changing band characteristics and arranged between the target object and said image pickup means; and
 said classification means calculates a classification spectrum for classification using a statistic technique from a spectrum of the light component reflected by the target object and picked up by said image pickup means, and performs said classification for a plurality of classes on the target object using the classification spectrum.

23. A color classification apparatus according to claim 21, wherein said optical means comprises optical path division means for splitting the light component reflected by the target object into a plurality of components.

24. A color classification apparatus according to claim 23, wherein said optical path division means is constituted by an optical fiber.

25. A color classification apparatus according to claim 23, wherein said optical path division means is constituted by a prism and a mirror.

26. A color classification apparatus according to claim 21 or 22, wherein said classification means comprises, in the classification for the plurality of classes;
means for obtaining a classification spectrum using arbitrary two of the plurality of classes;
inner product operation means for obtaining an inner product value between data of each class and the classification spectrum;
statistic amount calculation means for obtaining an average value of the inner product values and a variance value for the each class; and
boundary decision means for deciding a boundary of each class,
wherein the boundary is decided by said boundary decision means from an output from said statistic amount calculation means.

27. A color classification apparatus according to claim 21 or 22, wherein said classification means is constituted by a plurality of classification determination sections.

28. A color classification apparatus according to claim 27, wherein a first classification determination section of said plurality of classification determination sections receives spectrum data of a picked target object, and is constituted by:
first classification spectrum storage means for storing a classification spectrum obtained in advance; and
first operation means for performing an operation for classification from a spectrum of the target object and the spectrum stored in said first classification spectrum storage means, and
second and subsequent classification determination sections of said plurality of classification determination sections are connected in series, subsequently receive calculation results of previous stages and the spectrum data of the target object, and are constituted by:
a plurality of classification spectrum storage means for storing a plurality of classification spectra obtained in advance;
selection means for selecting said plurality of classification spectrum storage means in which classification spectra to be used are stored in accordance with the operation results of the previous stages, and outputting the classification spectra; and
operation means for outputting operation results from a spectrum of an unknown target object and the classification spectra output from said selection means.

29. A color classification apparatus according to claim 21 or 22, wherein said classification means comprises:
a plurality of spectrum storage means for storing known class data of the plurality of classes;
class selection means for selecting two spectrum storage means as a pair from said plurality of spectrum storage means;
classification spectrum operation means for operating a classification spectrum from spectrum data stored in said two spectrum storage means;
a plurality of classification spectrum storage means for storing a plurality of classification spectra calculated and output by said classification spectra calculation means from a plurality of pairs of spectrum data sequentially selected by said class selection means; and
classification determination means for performing classification determination from the plurality of classification spectra stored in said plurality of classification spectrum storage means and spectrum data of an unknown target object.

30. A color classification apparatus according to claim 21 or 22, wherein said classification means comprises a measurement region setting section,
said measurement region setting section comprising a specific region detection section for detecting a specific portion of the target object, and
a non-measurement region setting section for setting a non-measurement region including a region detected by said specific region detection section.

31. A color classification apparatus according to claim 21 or 22, wherein said classification means comprises:
a Fisher ratio calculation section for calculating a Fisher ratio of a formed classification spectrum;
dimension reducing means for reducing dimensionality of spectrum data used for an operation; and
means for forming a classification spectrum having a minimum dimensionality when the Fisher ratio of the formed classification spectrum is not less than a predetermined value.

32. A color classification apparatus according to claim 31, wherein said dimension reducing means eliminates a dimension having a small absolute value in the classification spectrum.

33. A color classification apparatus according to claim 31, wherein said dimension reducing means comprises difference spectrum calculation means for obtaining a difference spectrum between spectra of two classes used when the classification spectra are obtained; and
means for eliminating a dimension having a small absolute value in the difference spectrum.

34. A color classification apparatus according to claim 31, wherein said dimension reducing means eliminates a dimension having a small value in a spectrum of a target object picked up when the classification spectra are obtained.

35. A color classification apparatus according to claim 21 or 22, wherein said classification means comprises:
image processing means for obtaining a feature amount of image data; and
spectrum expansion means for synthesizing a multi-dimensional spectrum of the target object and the feature amount obtained by said image processing means, and generating an expanded spectrum.

36. A color classification apparatus according to claim 21 or 22, further comprising storage means for storing image data picked up by said image pickup means.

37. A color classification apparatus according to claim 36, wherein said storage means comprises:
a first frame memory for temporarily storing the image data obtained by said image pickup means corresponding to an entire frame;
data conversion means for converting the data stored in said first frame memory into image data to be output to a TV monitor; and
a second frame memory for storing a TV monitor output image.

38. A color classification apparatus according to claim 37, wherein said first frame memory has a plurality of planes corresponding to said plurality of bandpass filters, and said second frame memory has a plurality of planes corresponding to R, G, and B colors of a color monitor.

39. A color classification apparatus according to claim 38, wherein said data conversion means comprises:

a coefficient memory for storing a plurality of coefficients to be multiplied with outputs from the plurality of planes of said first frame memory;

a plurality of multipliers for multiplying the plurality of coefficients with the outputs from the plurality of planes of said first frame memory; and an adder for adding outputs from said plurality of multipliers, wherein an output from said adder can be separately written in the plurality of planes of said second frame memory.

40. A color classification apparatus according to claim 39, wherein the plurality of coefficients are sequentially set so as to approximate R, G, and B emission spectra of said color monitor, wherein data multiplied with R, G, and B coefficients are respectively written in R, G, and B planes of said second frame memory.

41. A color classification apparatus according to claim 39, wherein the plurality of coefficients are set so as to approximate the classification spectra obtained by said classification means.

42. A color classification apparatus according to claim 41, wherein, in said second frame memory, the output from said adder is directly written in one plane and data obtained by inverting a magnitude of the output from said adder is written in another plane.

43. A color classification apparatus according to claim 2, wherein:

said image pickup means picks up light reflected by the target object;

optical means is provided for focusing the light reflected by the target object on said image pickup means;

said filter means comprises a plurality of bandpass filters having different bands and arranged between the target object and said image pickup means;

said classification means calculates a classification spectrum for classification using a statistic technique from a spectrum of the light reflected by the target object picked up by said image pickup means; and exposure condition control means is provided for controlling exposure conditions for image pickup operations of said plurality of bandpass filters, said exposure condition control means having exposure limiting means for limiting exposure amounts corresponding to said plurality of bandpass filters.

44. A color classification apparatus according to claim 43, wherein said exposure control means is arranged to be detachable and exchangeable.

45. A color classification apparatus according to claim 43, wherein said exposure condition control means comprises exposure condition storage means for storing the exposure conditions for the image pickup operations of said plurality of bandpass filters.

46. A color classification apparatus according to claim 45, wherein said exposure condition control means comprises exposure condition correction means for correcting data picked up on the basis of the exposure conditions.

47. A color classification apparatus according to any one of claims 43 to 46, wherein said exposure control means comprises a plurality of openings corresponding to said plurality of bandpass filters, and a stop plate which can be switched in synchronism with said plurality of bandpass filters.

48. A color classification apparatus according to any one of claims 43 to 46, wherein said exposure control means comprises a plurality of filters having different transmittances corresponding to said plurality of bandpass filters, and filter means which can be switched in synchronism with said plurality of bandpass filters.

49. A color classification apparatus according to any one of claims 43 to 46, wherein said exposure control means comprises a light-shielding plate with a plurality of non-light-shielding portions having different sizes corresponding to said plurality of bandpass filters, and light-shielding means which can be switched in synchronism with said plurality of bandpass filters.

50. A color classification apparatus according to claim 2, wherein:

said image pickup means picks up light reflected by the target object;

optical means is provided for focusing the light reflected by the target object on said image pickup means;

said filter means comprises a plurality of bandpass filters having different bands and arranged between the target object and said image pickup means;

said classification means calculates a classification spectrum for classification using a statistic technique from a spectrum of the light reflected by the target object and picked up by said image pickup means; and exposure condition control means is provided for controlling exposure conditions for image pickup operations of said plurality of bandpass filters, said exposure condition control means having exposure condition storage means for storing the exposure conditions for the image pickup operations of said plurality of bandpass filters.

51. A color classification apparatus according to claim 50, wherein said exposure condition control means comprises exposure condition correction means for correcting data picked up on the basis of the exposure conditions.

52. A color classification apparatus according to claim 2, wherein:

said image pickup means picks up light reflected by the target object;

optical means is provided for focusing the light reflected by the target object on said image pickup means;

said filter means comprises a band variable bandpass filter capable of changing band characteristics and arranged between the target object and said image pickup means;

said classification means calculates a classification spectrum for classification using a statistic technique from a spectrum of the light reflected by the target object and picked up by said image pickup means;

exposure condition control means is provided for controlling exposure conditions when said plurality of bandpass filters are to be picked up; and exposure condition control means is provided for separately controlling exposure conditions for image pickup operations for the different band characteristics set in said band variable bandpass filter.

53. A color classification apparatus according to claim 52, wherein said exposure condition control means comprises exposure condition storage means for storing the exposure conditions for the image pickup operations for the band characteristics of said band variable bandpass filter.

54. A color classification apparatus according to claim 51, wherein said exposure condition control means comprises exposure condition correction means for correcting data picked up on the basis of the exposure conditions.

55. A color classification apparatus according to any one of claims 50, 51, 53, and 54, wherein said exposure condition control means comprises stop control means for controlling stop adjustment means of said image pickup means on the basis of data from said exposure condition storage means.

56. A color classification apparatus according to any one of claims 50, 51, 53, and 54, wherein said exposure condition control means comprises:

a transmittance variable filter capable of changing a transmittance and arranged between the target object and said image pickup means; and transmittance control means for controlling the transmittance of said transmittance variable filter on the basis of data from said exposure condition storage means.

57. A color classification apparatus according to any one of claims 50, 51, 53, and 54, wherein an exposure time of said image pickup means can be controlled in accordance with a drive pulse, and said exposure condition control means has means for controlling the exposure time of said image pickup means on the basis of data stored in said exposure condition storage means in image pickup operations of said plurality of bandpass filters.

58. A color classification apparatus according to claim 2, wherein:

said image pickup means picks up light reflected by the target object;

optical means is provided for focusing the light reflected by the target object on said image pickup means;

said filter means comprises a plurality of bandpass filters having different bands and arranged between the target object and said image pickup means;

said classification means calculates a classification spectrum for classification using a statistic technique from a spectrum of the light reflected by the target object and picked up by said image pickup means; and normalization means is provided for normalizing at least one or a spectrum characteristic and a luminance of a light source which illuminates the target object, said normalization means having light source observation means for obtaining data of said light source.

59. A color classification apparatus according to claim 2, wherein:

said image pickup means picks up light reflected by the target object;

optical means is provided for focusing the light reflected by the target object on said image pickup means;

said filter means comprises a band variable bandpass filter capable of changing band characteristics and arranged between the target object and said image pickup means;

said classification means calculates a classification spectrum for classification using a statistic technique from a spectrum of the light reflected by the target object and picked up by said image pickup means; and normalization means is provided for normalizing at least one or a spectrum characteristic and a luminance of a light source which illuminates the target object, said normalization means having light source observation means for obtaining data of said light source.

60. A color classification apparatus according to claim 58 or 59, wherein said light source observation means comprises:

a reference plate for reflecting or transmitting light from said light source, and scattering the light; and second optical means for guiding light reflected by said reference plate to said image pickup means.

61. A color classification apparatus according to claim 59, wherein said reference plate is arranged on an upper portion of a housing, and said second optical means comprises an optical system for focusing said reference plate on said image pickup means, and a mirror for guiding an optical axis of said optical system to said image pickup means, and a position of said mirror is displaceable.

62. A color classification apparatus according to claim 60, wherein said reference plate is arranged on an upper portion of a housing, and said second optical means has a mirror for guiding an optical image of said reference plate to a visual field of said image pickup means.

63. A color classification apparatus according to claim 58, wherein said light source observation means comprises:

a reference plate, arranged at a front portion of a housing, for causing irregular reflection of light from said light source;

an optical sensor for detecting an intensity of light reflected by said reference plate;

a plurality of bandpass filters arranged between said reference plate and said optical sensor; and optical means for focusing the light reflected by said reference plate on said optical sensor.

64. A color classification apparatus according to claim 63, wherein said plurality of bandpass filters arranged between said reference plate and said optical sensor also serve as said plurality of bandpass filters arranged between the target object and said image pickup means.

65. A color classification apparatus according to claim 63, wherein said optical sensor uses an image pickup element.

66. A color classification apparatus according to any one of claims 61, 62, and 65, wherein said light source observation means comprises light source direction detection means for detecting a direction of said light source.

67. A color classification apparatus according to claim 66, wherein said light source direction detection means comprises:

a rod- or plate-like member arranged on said reference plate such that a shadow shape or position of said member is changed in accordance with a change in the direction of said light source; and illumination condition detection means for processing image data of said reference plate obtained by said image pickup means, and obtaining the direction, an intensity, and a spectrum of said light source.

68. A color classification apparatus according to claim 60, wherein said second optical means is constituted by an optical fiber.

69. A color classification apparatus according to claim 68, wherein said reference plate can be used detachably from said housing.

70. A color classification apparatus according to claim 57 or 58, wherein said light source observation means comprises light source spectral sensor means for detecting a spectrum of light from said light source.

71. A color classification apparatus according to claim 70, wherein said light source spectral sensor means comprises:

a transmittance variable filter capable of changing a transmittance;

a plurality of bandpass filters having same characteristics as those of said plurality of bandpass filters;

optical sensors, having the same number as that of said bandpass filters, for detecting an intensity of light transmitting through each bandpass filter;

a transmittance control circuit for monitoring outputs from said optical sensors, and controlling the transmittance of said transmittance variable filter; and an illumination condition detection circuit for receiving signals from said plurality of optical sensors and said transmittance control circuit, and outputting a brightness and spectrum of said light source.

72. A color classification apparatus according to claim 70, wherein said light source spectral sensor means can be used detachably from said housing.

\* \* \* \* \*